US011656660B2

(12) United States Patent
Silvanto et al.

(10) Patent No.: US 11,656,660 B2
(45) Date of Patent: May 23, 2023

(54) MANDREL FLEX CIRCUIT ROUTING

(71) Applicant: Apple Inc., Cupertino, CA (US)

(72) Inventors: Mikael M. Silvanto, San Francisco, CA (US); Bartley K. Andre, Menlo Park, CA (US); Adam T. Garelli, Santa Clara, CA (US); Simon Regis Louis Lancaster-Larocque, San Jose, CA (US); Robert Y. Cao, San Francisco, CA (US); Dinesh C. Mathew, Fremont, CA (US); Jacob S. Kononiuk, Allenford (CA); Robert J. Lockwood, San Carlos, CA (US); Bryan W. Posner, La Selva Beach, CA (US); Kevin M. Keeler, Saratoga, CA (US); Bruce E. Berg, Encinitas, CA (US); Yi-Chen Kuo, Santa Clara, CA (US); Kevin M. Robinson, Sunnyvale, CA (US); Houtan R. Farahani, San Ramon, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 17/338,973

(22) Filed: Jun. 4, 2021

(65) Prior Publication Data
US 2021/0294391 A1 Sep. 23, 2021

Related U.S. Application Data

(63) Continuation of application No. 16/808,075, filed on Mar. 3, 2020, now Pat. No. 11,029,735, which is a
(Continued)

(51) Int. Cl.
G06F 1/16 (2006.01)
E05D 11/00 (2006.01)
E05D 11/10 (2006.01)

(52) U.S. Cl.
CPC ........ *G06F 1/1683* (2013.01); *E05D 11/0054* (2013.01); *E05D 11/0081* (2013.01);
(Continued)

(58) Field of Classification Search
CPC ......... E05D 2011/0072; E05D 11/0081; E05D 11/0054; G06F 1/1683; G06F 1/1616;
(Continued)

(56) References Cited

U.S. PATENT DOCUMENTS 4,959,887 A 10/1990 Gruenberg et al.
4,996,522 A * 2/1991 Sunano ............... G06F 15/0216
345/905

(Continued)

FOREIGN PATENT DOCUMENTS

CN 101534331 A 9/2009
CN 102467170 A 5/2012
(Continued)

OTHER PUBLICATIONS

Chinese Patent Application No. ZL201620401881.2—Evaluation Report for Utility Model Patentability dated Feb. 24, 2017.
(Continued)

Primary Examiner — Nidhi Thaker
(74) Attorney, Agent, or Firm — Dorsey & Whitney LLP

(57) ABSTRACT

Cable assemblies for providing electrical communication between hinged sections of an electronic device are described. The cable assemblies can include a cover that covers one or more cables that run through a hinge region of the electronic device. The cable and cover can be drawn over a mandrel of the hinge region. The cover and the portions of the mandrel can be visible to a user at the hinge region of the electronic device. The cover can be sufficiently rigid to guide a path of the cable and protect the cable from bending beyond a prescribed angle during rotation of the electronic
(Continued)

device at the hinge region. The cover can also be sufficiently rigid to prevent ceasing or folding of the cover and the cable during rotation of the electronic device at the hinge region.

17 Claims, 36 Drawing Sheets

Related U.S. Application Data continuation of application No. 15/567,932, filed as application No. PCT/US2016/030816 on May 4, 2016, now Pat. No. 10,635,141, which is a continuation-in-part of application No. 14/704,447, filed on May 5, 2015, now Pat. No. 9,513,672.

(60) Provisional application No. 62/167,848, filed on May 28, 2015.

(52) U.S. Cl.
CPC .. *E05D 11/1028* (2013.01); *E05D 2011/0072* (2013.01); *G06F 1/1616* (2013.01); *G06F 1/1656* (2013.01); *G06F 1/1681* (2013.01)

(58) Field of Classification Search
CPC .... G06F 1/1681; G06F 1/1656; G06F 1/1613; E05Y 2900/606
See application file for complete search history.

(56) References Cited

U.S. PATENT DOCUMENTS

| | | | |
|---|---|---|---|
| 5,027,394 A | 6/1991 | Ono et al. | |
| 5,177,672 A * | 1/1993 | Ito | G06F 15/0216 439/31 |
| 5,390,075 A | 2/1995 | English et al. | |
| 5,394,297 A * | 2/1995 | Toedter | G06F 1/1616 174/136 |
| 5,428,350 A | 6/1995 | Kurcbart et al. | |
| 5,581,440 A * | 12/1996 | Toedter | G06F 1/1616 174/136 |
| 5,799,079 A | 8/1998 | Inoue | |
| 5,927,997 A | 7/1999 | Ruland et al. | |
| 6,212,069 B1 | 4/2001 | Janik et al. | |
| 6,754,507 B2 | 6/2004 | Takagi | |
| 7,417,863 B2 | 8/2008 | Park | |
| 7,637,745 B1 | 12/2009 | Dai et al. | |
| 7,907,415 B2 | 3/2011 | Ueyama | |
| 8,014,139 B2 | 9/2011 | Maeda et al. | |
| 8,379,378 B2 * | 2/2013 | Visser | H04M 1/0268 16/385 |
| 8,593,800 B2 | 11/2013 | Asakura et al. | |
| 8,648,415 B2 | 2/2014 | Taniguchi | |
| 8,773,849 B2 | 7/2014 | Bohn et al. | |
| 8,912,454 B2 | 12/2014 | Sasaki | |
| 8,994,597 B2 | 3/2015 | Hill et al. | |
| 9,513,672 B2 | 12/2016 | Garelli et al. | |
| 9,535,465 B2 | 1/2017 | Bohn et al. | |
| 2004/0264118 A1 * | 12/2004 | Karidis | G06F 1/1616 361/679.55 |
| 2006/0279942 A1 * | 12/2006 | Yasuda | H04M 1/0216 361/801 |
| 2007/0123179 A1 | 5/2007 | Lim | |
| 2008/0013265 A1 | 1/2008 | Kim | |
| 2008/0019085 A1 | 1/2008 | Nakajima | |
| 2008/0297991 A1 | 12/2008 | Ou | |
| 2009/0002931 A1 | 1/2009 | Iijima et al. | |
| 2012/0092820 A1 * | 4/2012 | Hautamaki | H04M 1/0237 361/679.01 |
| 2013/0058048 A1 * | 3/2013 | Choi | G06F 1/1681 361/727 |
| 2013/0219663 A1 * | 8/2013 | Cai | G06F 1/1681 16/371 |
| 2013/0321216 A1 | 12/2013 | Jervis et al. | |
| 2013/0328741 A1 | 12/2013 | Degner et al. | |
| 2014/0043748 A1 | 2/2014 | Sartee et al. | |
| 2014/0213324 A1 | 7/2014 | Tan et al. | |
| 2014/0226272 A1 | 8/2014 | Imamura et al. | |
| 2014/0292646 A1 | 10/2014 | Kawamoto et al. | |
| 2014/0293519 A1 | 10/2014 | Wang | |
| 2015/0049275 A1 | 2/2015 | Posner et al. | |
| 2016/0014915 A1 | 1/2016 | Posner et al. | |
| 2016/0054759 A1 | 2/2016 | Lee et al. | |
| 2016/0327993 A1 | 11/2016 | Garelli et al. | |
| 2017/0010637 A1 | 1/2017 | Garelli et al. | |
| 2018/0049336 A1 | 2/2018 | Manuel et al. | |

FOREIGN PATENT DOCUMENTS

| | | |
|---|---|---|
| CN | 203465630 U | 3/2014 |
| CN | 104076919 A | 10/2014 |
| EP | 1313358 A2 | 5/2003 |
| JP | H04079296 A | 3/1992 |
| JP | H05046561 U | 2/1993 |
| JP | H06310874 A | 11/1994 |
| JP | H09148760 A | 6/1997 |
| JP | 2003024595 A | 1/2003 |
| JP | 2010066905 A | 3/2010 |

OTHER PUBLICATIONS

Chinese Patent Application No. ZL201620401881.2—Office Action dated Aug. 22, 2016.
European Patent Application No. 16790031.5—Extended European Search Report dated Nov. 26, 2018.
International Patent Application No. PCT/US2016/030816—International Search Report and Written Opinion dated Aug. 19, 2016.
Japanese Patent Application No. 2017-558000—Office Action dated Oct. 29, 2018.

* cited by examiner

MANDREL FLEX CIRCUIT ROUTING

CROSS-REFERENCE TO RELATED APPLICATIONS

This is a continuation of U.S. patent application Ser. No. 16/808,075, entitled "MANDREL FLEX CIRCUIT ROUTING," filed 3 Mar. 2020, which is a continuation of U.S. patent application Ser. No. 15/567,932, entitled "MANDREL FLEX CIRCUIT ROUTING," filed 19 Oct. 2017, now U.S. Pat. No. 10,635,141, issued 28 Apr. 2020, which is a national phase application claiming the benefit of International Application PCT/US2016/030816 with an international filing date of 4 May 2016, entitled "MANDREL FLEX CIRCUIT ROUTING", which claims the benefit of priority (1) to U.S. Provisional Application No. 62/167,848, entitled "MANDREL FLEX CIRCUIT ROUTING", filed 28 May 2015, (2) to U.S. Non-Provisional application Ser. No. 14/704,447, entitled "ELECTRONIC DEVICE WITH DYNAMIC HINGE GAP COVER," filed 5 May 2015, now U.S. Pat. No. 9,513,672, issued 6 Dec. 2016, as a Continuation-in-Part thereof. The contents of all of these applications are incorporated herein by reference in their entirety for all purposes.

FIELD

The described embodiments relate generally to covers as part of cable assemblies for electronic devices. More particularly, the present embodiments relate to routing cable assemblies over hinged sections of electronic devices.

BACKGROUND

Many consumer electronic devices have multiple housing sections. Often, signals must be sent from one housing section to another housing section. Electronic devices may have electronics in one housing section that receives a signal from another housing section. For example, a laptop computing device may have a display mounted in a display housing section that receives signals from a timing controller mounted in another housing section. The display housing section may also rotate or be movable in relation to another housing section through a hinge. For example, many laptop computers have a display housing section that rotates around a hinge assembly to facilitate viewing of the display and to allow access to user input controls located on a main housing assembly.

One challenge associated with a hinged electronic device enclosure is securely routing a signal from one housing section to another housing section. Some electronic devices route a signal transfer mechanism, such as a flex cable, around the hinge mechanism or through a center hole in a clutch assembly of the hinge. However, methods must be implemented to assure that the cables are protected from exposure to potential damage by clutch assembly and hinge mechanism. As electronic devices get smaller and thinner, the amount of space available for clutch assemblies, hinges and cables is constrained, making it more difficult to provide room for and properly protect the cables.

SUMMARY

This paper describes various embodiments that relate to securely routing a signal between hinged sections of an electronic device. In particular embodiments, a flex cable is routed between housing sections of an electronic device. Further, a cover moves with the flex cable to provide physical protection to the exposed flex cable.

According to one embodiment, a laptop computer is described. The laptop computer includes a first portion having a first electrical component. The laptop computer also includes a second portion pivotally coupled to the first portion along a pivot axis. The second portion has a second electrical component. The laptop computer further includes a flex circuit configured to electrically couple the first and second electrical components. The laptop computer additionally includes a flex circuit cover at least partially in contact with a first surface of the flex circuit and having a first end secured to the first portion and a second end that is free to move along the first surface of the flex circuit when the first and second portions rotate about the pivot axis. The flex circuit cover prevents the flex circuit from being seen when the first portion and the second portion are pivoted with respect to each other in an open configuration.

According to another embodiment, a cover for a mandrel as part of a hinge assembly for an electronic device is described. The cover covers a cable that would otherwise be exposed to a user of the electronic device. The cover includes a first side positioned proximate to the cable. The cable electrically connects a first portion of the electronic device pivotally coupled to a second portion of the electronic device. The cable is drawn over a curved surface of the mandrel that guides the cable though a hinge region of the electronic device. The cover also includes a second side opposite the first side. The second side is exposed at the hinge region of the electronic device when the electronic device is in an open state.

According to a further embodiment, a method of covering a cable routed between a first portion and a second portion of an electronic device is described. The first portion is pivotally coupled with the second portion at a hinge region of the electronic device. The method includes electrically coupling the first portion and the second portion with a cable. The cable drawn is over a mandrel within the hinge region when the electronic device is rotated from a closed state to an open state. A surface of the cable is exposed at the hinge region when the electronic device is in an open state. The method further includes covering the exposed surface of the cable with a cover. The cover is drawn over the cable and the mandrel when the electronic device is rotated from the closed state to the open state.

According to another embodiment, a laptop computer is described. The laptop computer can be provided with upper and lower housing portions that are separated by a gap. Hinge structures can allow the upper housing portion to rotate between a closed position in which a display in the upper housing portion is adjacent to the lower housing portion and an open position in which the display is visible to a user.

According to another embodiment, an electronic device is described. The electronic device can include a flexible printed circuit in the electronic device that can be coupled between components in the upper housing portion such as the display and components in the lower housing portion. The flexible printed circuit can bridge the gap. A hinge gap cover can cover the gap and can overlap the flexible printed circuit to block the flexible printed circuit from view when the upper housing portion is in the closed position.

According to another embodiment, a hinge gap cover for a laptop computer is described. The hinge gap cover can be formed from a radio-transparent material that is coupled to the upper housing portion with springs. An antenna in an interior portion of the housing can transmit and receive antenna signals that pass through the hinge gap housing.

According to another embodiment, a housing for a laptop computer is described. The housing can include an upper housing portion that can form a stop surface. When the upper housing portion is in the closed position, the stop surface can be separated from the hinge gap cover and the springs can hold the hinge gap cover in place over the gap. An inner surface in the lower housing portion can contact an edge of the hinge gap cover to prevent the hinge gap cover from rotating. When the upper housing is moved into the open position, the stop surface can contact the hinge gap cover and can push the hinge gap cover away from the lower housing and the gap.

According to yet another embodiment, a housing for a laptop computer is described. A hinge gap cover can be bowed inwardly towards the interior of the housing when the upper housing portion is in the closed position. The flexible printed circuit can have a surface that is adjacent to the bowed surface of the hinge gap cover when the upper housing portion is in the closed position.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

Figure 1:
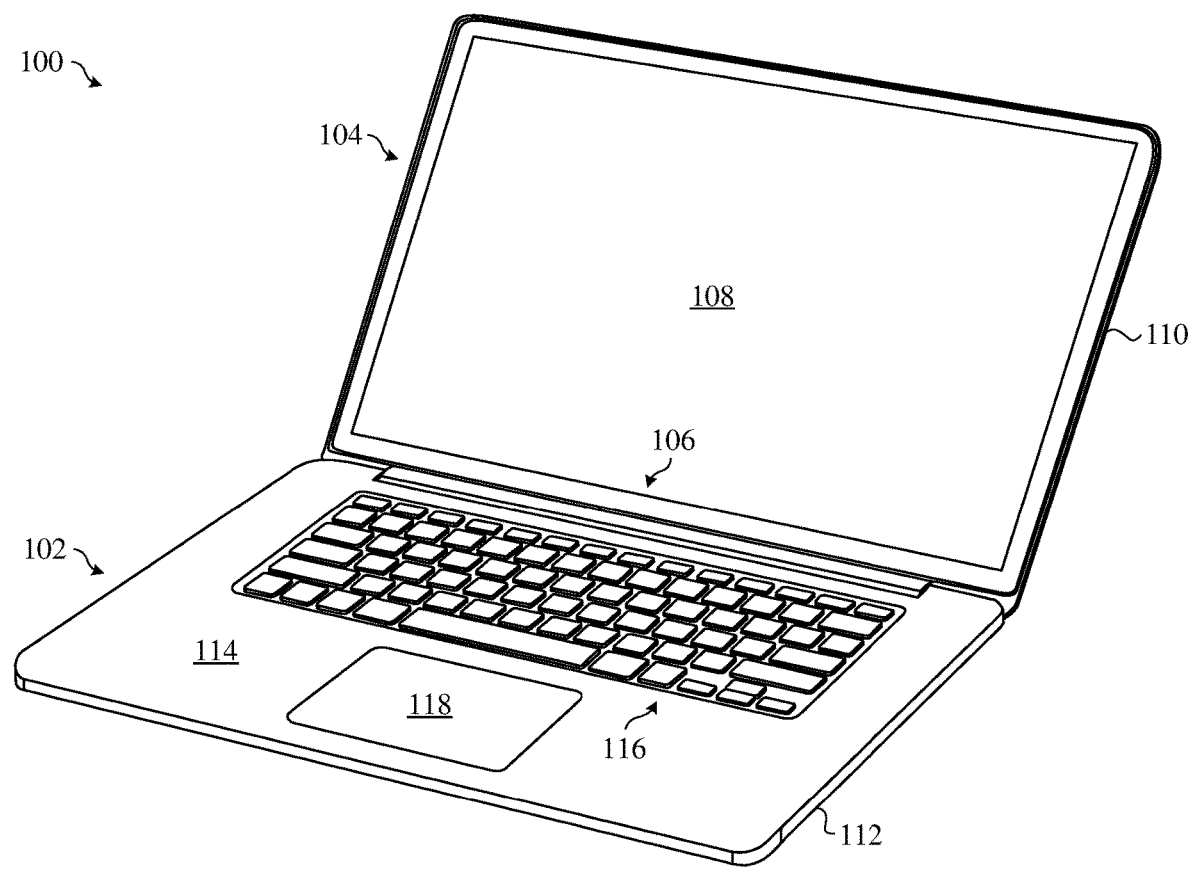
FIG. 1 shows a front facing perspective view of portable computing device, in accordance with some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to covers for covering one or more cables of a hinged electronic device. In particular embodiments, the cables include a flex cable and/or a flexible printed circuit board appropriate for transmitting a signal between portions of an electronic device that are connected by a hinge. In the case of a portable computing device (e.g., laptop computer), one portion of the electronic device may correspond to a lid portion having a display and another portion may correspond to a base portion that includes electronics in communication with the display via the cable(s). The cable(s) can be routed through a hinge region to transmit signal between components within the lid and base portions.

In some embodiments, the cable is drawn over a section of the lid portion referred to as a mandrel. The mandrel can be configured to guide the path of the cable and protect the cable from bending beyond a prescribed angle. In particular embodiments, the mandrel has a curved surface to provide smooth movement of the cable. In some embodiments, the mandrel has a constant radius over which the cable is drawn. In some embodiments, the radius varies as the cable is drawn over the mandrel, while in other embodiments the radius is constant.

In further embodiments, a cover is drawn over the cable in order to prevent the cable from being directly exposed to a user of the electronic device. In some embodiments, the cover is a sheet of material or materials having particular physical properties, such as a certain rigidity and resilience that allows for a prescribed movement of the cover and the cable when the electronic device moves between open and closed positions. The cover should also be sufficient durability to withstand wear and tear during the service life of the electronic device. The cover can have multiple layers of material in order achieve these and other desirable physical properties. The cover may include a structural layer, such as a fiberglass and polyurethane layer, giving the cover lateral rigidity. In other examples, the cover may include polyurethane infused para-aramid fibers or polyurethane infused fiberglass. The rigidity of the cover allows the lid portion to drive the cover into a cavity defined by the base portion of the electronic device. In some embodiments, the cover is visible to a user of the electronic device. Thus, one layer of the cover can be a decorative layer suitable for presentation to the user.

In some embodiments, the rigidity of the cover may provide some resistance to bending and thereby provide a restoring force for returning the cover to an original shape. The restoring force can cooperate with constraining elements of the housing to resist folding or creasing of the cover and/or the cable when the electronic device is moved from an open to a closed position. A cavity within the base portion of the electronic device can define an inner surface that constrains the cover during movement of the electronic device from an open position to a closed position. The rigidity of the cover and the forces constraining the cover can cooperate to control movement of the cover as it is drawn over the mandrel, thereby preventing the cover from buckling or folding. The cover can also constrain and control movement of the cable where the cover is in contact with the cable, thereby preventing the cable from being damaged due to bending or twisting.

In some embodiments, the cable is coupled to an electronic component within the base portion of the electronic device. The cable can be attach to electronics, such as an integrated circuit or printed circuit board with timing control suitable for driving a display assembly. The cable may be circumferentially routed around a support member located within the base portion in a wrapped configuration. A clip located on the guiding member can secure the cable, isolating one or more sections of the cable that attaches to the electronic component and preventing movement of portions of the cable when the lid portion is rotated relative to the base portion. The other end of the cable can be coupled to an electronic component, such as a display assembly, within the lid portion.

In the description below, the term "mandrel" can refer to a hinge mechanism, a cover for a hinge mechanism, a layer for a hinge mechanism, a lid for a hinge mechanism, a cylindrical shaft, a tubular shaft, a pivot and/or swivel mechanism, or a slider mechanism. The term "mandrel" can be interchangeable with the term "hinge mechanism" or a "cover (or lid) for a hinge mechanism."

The cable assemblies and structures described herein are well suited for integration into consumer products. For example, the cable assemblies and structures described herein can be used in electronic devices, such as computers, portable electronic devices, wearable electronic devices and electronic device accessories, such as those manufactured by Apple Inc., based in Cupertino, Calif.

In the description below, the terms "first portion" and "upper housing portion" can both refer to a lid of a computing device. In the description below, the terms "second portion" and "lower housing portion" can both refer to a base of a computing device. Furthermore, in the description below, the terms "lower housing portion" can be interchangeable with the terms "base housing" or "main housing."

These and other embodiments are discussed below with reference to FIGS. 1-35. However, those skilled in the art will readily appreciate that the detailed description given herein with respect to these Figures is for explanatory purposes only and should not be construed as limiting.

Flex Cable Cover

FIG. 1 shows a front facing perspective view of electronic device 100 in accordance with some embodiments. Electronic device 100 can be a laptop computer. Electronic device 100 can include base portion 102, which can be pivotally connected to lid portion 104 by way of hinge assembly within hinge region 106. Lid portion 104 and base portion 102 can be referred to as different sections of electronic device 100. Lid portion 104 can pivot with respect to base portion 102 with the aid of a hinge assembly within hinge region 106 from a closed position to remain in an open position and back again. Lid portion 104 can include display 108 and rear cover 110. Base portion 102 can include bottom case 112 that is fastened to top case 114. Top case 114 can be configured to accommodate various user input devices such as keyboard 116 and touchpad 118, which can be configured to receive finger gesturing input from a user. Base portion 102 and lid portion 104 can each define internal chambers or cavities that house internal components of electronic device 100. Thus, lid portion 104 and base portion 102 can function as housings for internal components. Cables, such as flex cables (hidden from view), can electrically couple internal components within base portion 102 and lid portion 104. The cables can provide communication between the internal components within base portion 102 and lid portion 104 and/or provide power to internal components within base portion 102 and/or lid portion 104.

Figure 2:
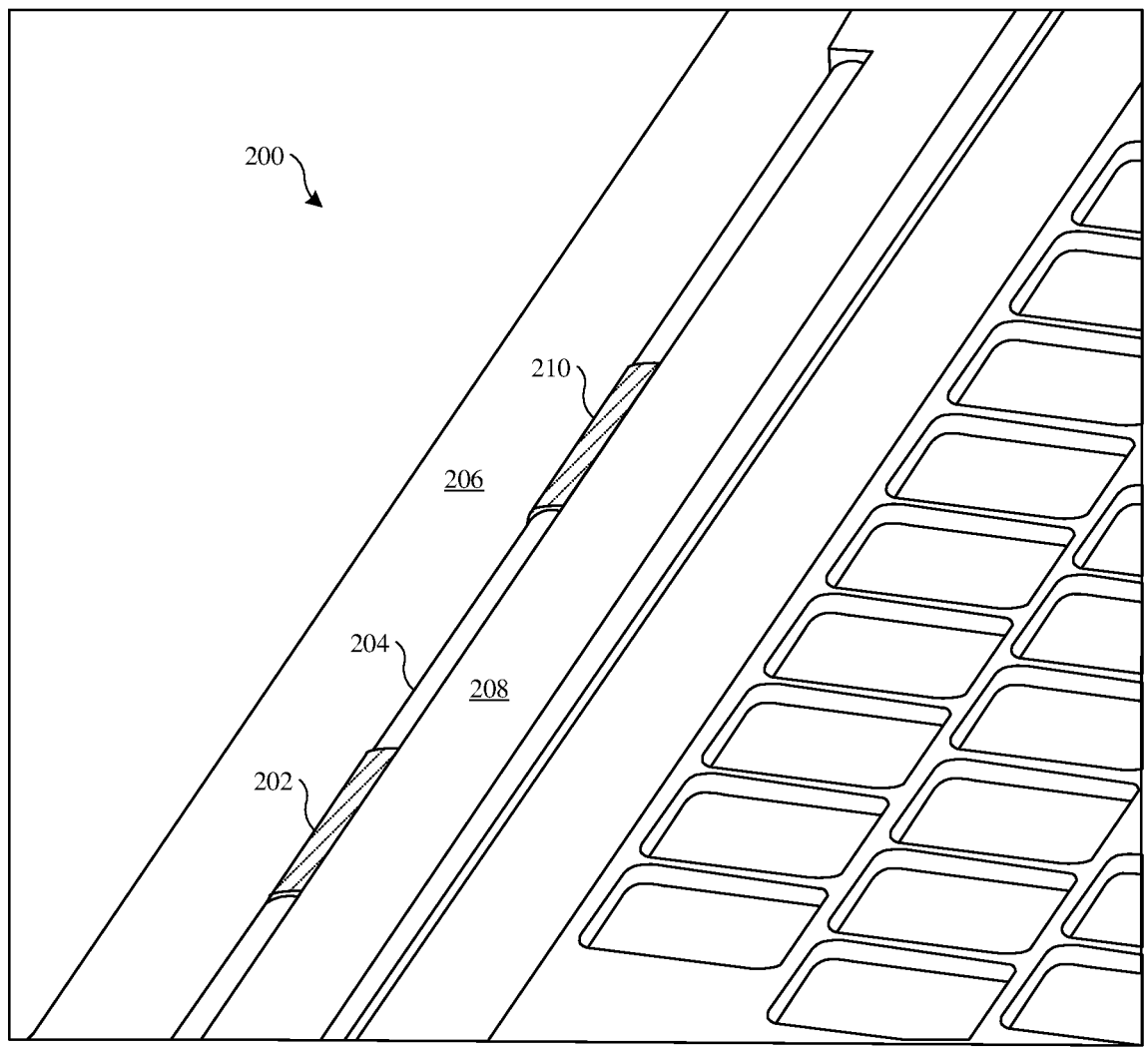
FIG. 2 shows a perspective view of a hinge portion of an electronic device with cover concealing a cable drawn over a mandrel of the electronic device, in accordance with some embodiments.

Descried herein are cable assemblies that can be used in conjunction with hinged electronic devices, such as electronic device 100. The cable assemblies can include covers that protect and guide the cables during movement of the hinged electronic devices. In some embodiments, the covers are visible to a user of the electronic device. To illustrate, FIG. 2 shows a perspective view of a portion of electronic device 200 having a first portion 206 and second portion 208. In some embodiments, first portion 206 corresponds to a lid portion and second portion 208 corresponds to a base portion of a portable computer. First portion 206 includes mandrel 204, which can be part of a hinge assembly of electronic device 200. Covers 202 and 210 can be used to cover underlying cables, such as flex cables, that electrically connect first portion 206 and second portion 208. In some embodiments, covers 202 and 210 are in the form of sheets of material or laminated material. Covers 202 and 210 and the underlying cables are drawn over a surface of mandrel 204 as first portion 206 pivots with respect to second portion 208.

Covers 202 and 210 can be visible to a user of electronic device 200 and hide the underlying cables from view. Thus, covers 202 and 210 should be aesthetically pleasing as well as durable enough to withstand wear from exposure to external environmental conditions and from opening/closing of electronic device 200. In some embodiments, covers 202 and 210 are the same color as mandrel 204, which can also be visible to a user. For example, covers 202/210 and mandrel 204 can have a matching black color such that covers 202/210 and mandrel appear as one piece. In other embodiments, covers 202 and 210 have a different color than mandrel 204, providing an aesthetically pleasing contrasting effect. Any suitable color combination can be used as dictated by design requirements.

In the embodiment shown in FIG. 2, two covers 202 and 210 are shown. However, any suitable number of covers can be used to cover any suitable number of cables. For example, covers 202 and 210 can each cover a single cable or multiple cables. In other embodiments, only one cover is used, or more than two covers are used. In some embodiments, only one of covers 202 and 210 covers cable(s) while the other of covers 202 and 210 does not cover any cable(s). In some embodiments, covers 202 and 210 are wider than the underlying cables. In some embodiments, a single cover spans an entire visible surface of mandrel 204, presenting a continuous cover over the surface of mandrel 204 to a user.

Figure 3A:
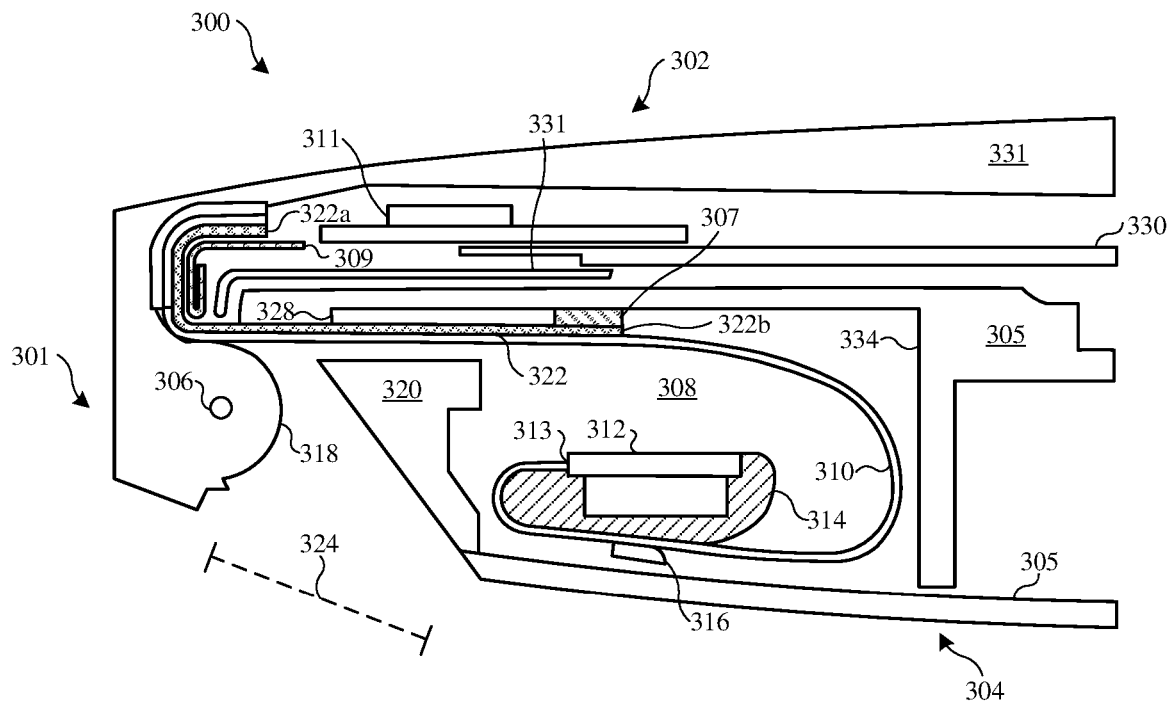
FIGS. 3A and 3B show cross-sectional views of a hinged electronic device in open and closed states, in accordance with some embodiments.
Figure 3B:
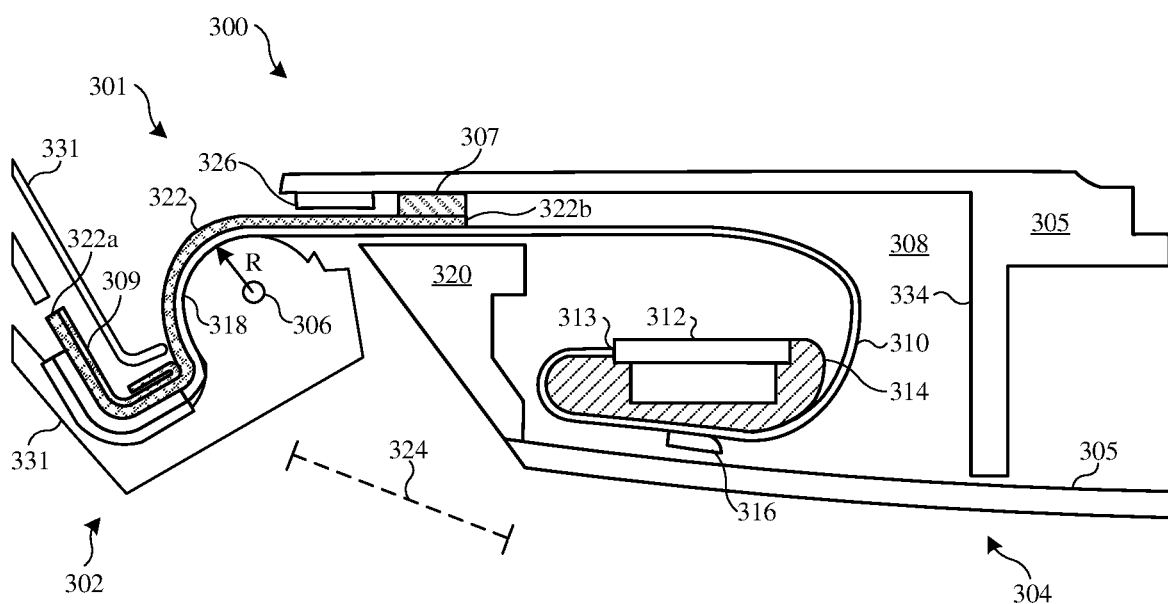

FIGS. 3A and 3B show cross sectional views of a hinged electronic device 300, in accordance with some embodiments. FIG. 3A shows a cross sectional view of electronic device 300 in a closed state and FIG. 3B shows a cross sectional view of electronic device 300 in an open state. Electronic device 300 includes a first portion 302 coupled to a second portion 304. First portion 302 can correspond to a lid portion (or upper housing portion) and second portion 304 can correspond to a base portion (or lower housing portion) of electronic device 300. First portion 302 and second portion 304 can share a common axis of rotation with respect to pivot line or pivot axis 306. First portion 302 and second portion 304 can be pivotally coupled to each other via a suitable hinge mechanism. For example, the hinge mechanism can include one or more clutch mechanisms that provide a predetermined resistance to opening and closing forces applied by a user. The exact hinge mechanism may vary depending on design requirements. However the general region around pivot axis 306 can be referred to as a hinge region 301 of electronic device 300.

Electronic device 300 includes cable 310, which provides electrical communication between first portion 302 and second portion 304. For example, cable 310 can provide electrical connection between electronic component 311 of first portion 302 and electronic component 312 of second portion 304. Electronic component 311 can be in electrically communication with display assembly 330, which is mounted on first housing 331. Display assembly 330 can include any suitable type of display for use in electronic device 300, such as a liquid crystal display (LCD) and/or organic light-emitting diode (OLED) screen. Electronic component 312 can include an integrated circuit and/or a printed circuit board, and can include a timing control mechanism configured to drive display assembly 330. Electronic component 312 is housed within cavity 308 defined by second housing 305. In some embodiments, cable 310 provides power from a battery (not shown) within second housing 305 to display assembly 330. Cable 310 can be any suitable type of cable, including a flex cable, a flexible printed circuit board, or any suitable mechanism for transmitting an electrical signal between the portions 302 and 304. In some embodiments the cable 310 is a single layer flex cable, however a multiple layered flex cable may be used. A single layer flex cable 310 can be used in some cases in order to reduce the stack height of the cable 310. Electronic device 300 can include any suitable number of cables 310. In a particular embodiment, electronic device 300 includes two cables 310.

It should be noted that cable 310 could be directly routed between first portion 302 and second portion 304 without passing through a clutch mechanism. Thus, a number of mechanisms can be used to guide the movement of cable 310 when first portion 302 is pivoted with respect to second portion 304. For example, hinge region 301 can include mandrel 318, which can be in the form of a cylinder-like portion of first portion 302. As shown, when electronic device 300 is moved from a closed state in FIG. 3A to an open state in FIG. 3B, cable 310 is drawn over a curved surface of mandrel 318 to keep cable 310 from bucking or folding. That is, a portion of cable 310 can take on a curved shape in accordance with the curved surface of mandrel 318 when electronic device 300 is rotated to an open configuration shown in FIG. 3B. The curved surface of mandrel 318 has a radius R, defined with respect to a pivot axis 306, which can be constant where cable 310 is drawn over mandrel 318. Alternatively, the surface of mandrel 318 may have a variable radius where the cable 310 is drawn. In some embodiments, the surface of mandrel 318 is segmented to correspond to sections of the flex cable 310. In some embodiments, mandrel 318 runs along a full width of electronic device 300. In some embodiments, mandrel 318 has a continuous curved surface, while in other embodiments, mandrel 318 includes substantially flat segments that maintain cable 310 in a substantially flat configuration in corresponding sections of cable 310.

Referring to FIG. 3B, since cable 310 is drawn over mandrel 318, cable 310 would be exposed at hinge region 301 to a user when electronic device 300 is in an open state. Thus, cover 322 can be used to cover and protect a side of cable 310 at hinge region 301 that would otherwise be exposed to a user. Cover 322 can be flexible, and therefore, like cable 310, can take on a curved shape in accordance with the curved surface of mandrel 318 when electronic device 300 is rotated to an open configuration shown in FIG. 3B.

In some embodiments, the radial or curved nature of the surface of mandrel 318 can impart benefits to the flex cable 310 while the electronic device 300 is rotated between the open configuration and the closed configuration. The radial/curved surface design of the mandrel 318 leverages unidirectional bending in the flex cable 310 which can promote maximizing flex cable 310 cycle life and minimize bending stresses imposed on the flex cable 310. The flex cable 310 always bends in one direction and does not invert backwards (i.e., the flex cable 310 furls and unfurls in a coiled configuration with the curved surface of mandrel 318 helping to prescribe a minimum bend radius in the hinge region 301). In some embodiments, unidirectional bending can be an optimal configuration for cycle life of the flex cable 310 as opposed to bidirectional or inverse cyclical bending. A similar principal is found in effective torsion spring design where the coils of the springs always bend in only a single direction. Furthermore, the curved surface design of mandrel 318 can promote condensing the flex service loop motion into a volumetrically efficient space. Accordingly, the curved surface of mandrel 318 can exert on the flex cable 310 to be condensed into the cavity 308 of the second portion 304 while avoiding straining the flex cable 310 or imparting minimal bending stress on the flex cable 310 as it is looped in the cavity 308.

In some embodiments, as the electronic device 300 is rotated between an open state (see FIG. 3B) and a closed state (see FIG. 3A), the flex cable 310 can be imparted to bend in only a single direction. In contrast, a flex cable that is designed to bend in multiple directions and is condensed into a volumetrically efficient space (e.g., cavity 308) can impose a greater amount of stress on the furled section of the flex cable 310. Unidirectional bending significantly reduces the amount of stress on the flex cable 310 and promotes greater cycle life and packaging.

In some embodiments, the flex cable 310 is described as bending along a single direction. In some embodiments, the direction can refer to the relative position of one point with respect to another point. In some embodiments, direction can refer to translation of motion where a point (or section) of the flex cable 310 changes position in a three-dimensional space according to an x-coordinate, y-coordinate, and z-coordinate. In some embodiments, while the electronic device transitions from the open state (see FIG. 3B) to closed state (see FIG. 3A), a point or section of the flex cable 310 can be positioned even further away from the curved surface along a similar direction or vector.

In some embodiments, curvature can refer to an amount by which a point (or a section) of the flex cable deviates from a flat or linear line. For example, while the electronic device transitions from the open state to closed state, an amount of curvature formed along a furled section of the flex cable 310 can increase such that the curvature further deviates from a flat or linear line (as shown in FIG. 3A). Similarly, while the electronic device transitions from the closed state to the open state, an amount of curvature formed along the furled section of the flex cable 310 can decrease (as shown in FIG. 3B).

In some embodiments, an amount by which the flex cable 310 bends can be inversely related with the present angle between the first portion 302 and the second portion 304. In some examples, the curved surface of mandrel 318 can exert a greater amount of a bend (in a single direction) on the flex cable 310 when the first portion 302 is pivoted relative to the second portion 304 by an angle of less than 90° degrees in contrast to when the angle between the first portion 302 and the second portion 304 is pivoted to greater than 90° degrees. In other words, as the angle between the first portion 302 and second portion 304 decreases and the electronic device 300 becomes progressively closer to being characterized as having a closed configuration, the amount of bend in a furled section of the flex cable 310 can increase.

In some embodiments, the first portion 302 and the second portion 304 can be pivoted relative to each other according to an angle between about 0° degrees to about 300° degrees.

In some embodiments, a section of the flex cable 310 is mechanically captured by the second portion 304. In some embodiments, a section of the flex cable 310 is mechanically captured by the first portion 302. The term mechanically captured can refer to enclosing or containing the section of the flex cable 310 by at least one of an enclosure, a tensioning mechanism, a hook, or a castellation of either the first portion 302 or the second portion 304.

In some embodiments, when the electronic device transitions from the open state to the closed state, the furled section of flex cable 310 mechanically captured by the second portion 304 can furl even more into a coiled configuration. In some embodiments, the amount of bend exerted on a section of the flex cable 310 that is mechanically captured by the first portion 302 can be independent of the amount of bend exerted on a section of the flex cable 310 that is mechanically captured by the second portion 304.

In some embodiments, a section of the flex cable 310 that is mechanically captured by the first portion 302 can be drawn over the curved surface of mandrel 318. As shown in FIG. 3A, the section of the flex cable 310 that is mechanically captured by the first portion 302 can have a generally linear shape. In some embodiments, subsequent to the electronic device 300 rotating from a closed configuration (see FIG. 3A) to an open configuration (see FIG. 3B), the curved surface of mandrel 318 can exert tension on the flex cable 310 so that an increased amount of bend or curvature on this section of the flex cable 310 is formed as the flex cable 310 is drawn over the curved surface of mandrel 318. The flex cable 310 can be imparted to bend in a single direction so that the curve or bend of the flex cable 310 corresponds to the curvature of the curved surface. The curved surface of mandrel 318 has a radius R, defined with respect to a pivot axis 306. In some embodiments, the curved surface of mandrel 318 can prescribe a minimal bend radius of the flex cable 310. For example, the mandrel 318 can have a curved surface with a radius of 10 millimeters from the pivot axis 306. Accordingly, the curved surface of mandrel 318 can dictate that the flex cable 310 has a minimum bend radius of at least 10 millimeters or greater while the electronic device 300 is in the open configuration.

Referring to FIG. 3B, a furled section of the flex cable 310 can be mechanically captured by the second portion 304. As the electronic device 300 transitions from the closed configuration to the open configuration, the amount by which the furled section of the flex cable 310 bends within the second portion 304 can decrease such that the flex cable becomes progressively unfurled. In the open configuration, the curved surface of mandrel 318 and the structural member 314 can cooperate to exert a greater amount of tension on the flex cable 310 such that the amount of bend decreases. For example, one side of the flex cable 310 can be exerted against a curved surface of the structural member 314 in the open configuration. This is in contrast to the closed configuration (see FIG. 3A) having the furled section of the flex cable 310 free of contact from the curved surface of the structural member 314. In some embodiments, the curved surface of support member 314 can reduce an amount of abrasion exerted against the flex cable 310 when the two components come into contact to each other.

Furthermore, FIG. 3B shows that the curved surface design of mandrel 318 can promote condensing the flex service loop motion into the cavity 308. Accordingly, the curved surface of mandrel 318 can exert on the flex cable 310 to be condensed into the cavity 308 of the second portion 304 while avoiding straining the flex cable 310 or imparting minimal bending stress on the flex cable 310 as it is looped into the cavity 308.

In some embodiments, the benefits imposed upon by the curved surface of mandrel 318 on the flex cable 310 can be similarly imposed upon the cover 322, which covers and protects a side of the cable 310 at the hinge region 301.

First end 322a of cover 322 can be positioned within first portion 302 of electronic device 300 and second end 322b of cover 322 can be positioned within second portion 304 of electronic device. Since cover 322 can be exposed, cover 322 should be made a material that is durable enough to withstand wear and tear that can be accompanied with direct exposure to a user. For example, cover 322 may be encounter by objects inserted or dropped within hinge region 301. Cover 322 should also be flexible enough to bend with cable 310 when electronic device 300 transitions between open and closed states. Cover 322 and mandrel 318 can be designed to have a particular aesthetic appeal, such as having the same or different colors, as described above with reference to FIG. 2.

Another consideration in choosing a material for cover 322 is how cover 322 moves during the opening and closing of electronic device 300. For example, cover 322 can have an inherent rigidity and resilience that generates a resistance force when cover 322 is bent over mandrel 318 when electronic device 300 moves from closed (FIG. 3A) to open (FIG. 3B) position. This resistance force can cause cover 322 to return to its original shape when electronic device 300 is returned to a closed (FIG. 3A) position. This way, cover 322 will not crease or buckle at hinge region 301. That is, if cover 322 is made of a material that is not sufficiently rigid, it could crease or crinkle at hinge region 301.

The rigidity of cover 322 can also at least partially dictate the movement of cable 310. For example, the side of cover 322 that is exposed to a user can be constrained near first end 322a by retention rib 307 and near second end 322b by anchor 309. Retention rib 307 and anchor 309 act as retention features that keep cover 322 from shifting out of place and keep cover 322 over cable 310 when electronic device 300 rotates between closed (FIG. 3A) and open (FIG. 3B) positions. In some embodiments, anchor 309 is made of a stiff material, such as a metal material (e.g., stainless steel). First end 322a can be coupled to anchor 309 using, for example, adhesive and/or fastener(s) such as one or more screws. In some embodiments, retention rib 307 includes a low friction material, such as a fluoropolymer material (e.g., polytetrafluoroethylene, Teflon™), that allows cover 322 to slide freely along retention rib 307 during opening and closing of electronic device 300. That is, second end 322b can be untethered and free to move with respect to cable 310 and retention rib 307. Retention rib 307 can cooperate with lip 328 at an inner surface of cavity 308 to retain second end 322b within cavity 308. Lip 328 can be an integrally formed portion of second housing 305, or can be a separate piece that is coupled to the inner surface of cavity 308.

A common problem with consumer electronic devices is protecting elements within housings from user accidents such as liquid spills. Therefore, in some embodiments, seal 326 (shown in FIG. 3B) can be positioned at an inner surface of an opening of the cavity 308. Seal 326 can prevent debris such as dirt, dust and liquids from entering cavity 308. Seal 326 can be in contact with or proximate to cover 322. Seal 326 can be made of a material having a low surface tension to prevent liquids from entering the cavity 308, as well as low friction such that cover 322 can freely move against seal 326. Suitable materials for seal 326 can include materials such as a fluoropolymer material (e.g., polytetrafluoroethylene). In some embodiments, seal 326 may be coupled to the lip 328, while in other embodiments the seal 326 acts as the lip 328. In some embodiments the seal 326 is rubber or other suitable material with a low friction layer.

The movement of cable 310 with respect to electronic component 312 can also be important. For example, during rotation of first portion 302 with respect to second portion 304, movement of cable 310 at connection point 313 to electronic component 312 should be minimized in order to prevent fatiguing of cable 310. This is because over bending and fatiguing of cable 310 can cause cable 310 to fail, and connection point 313 can be especially susceptible to such fatiguing. Thus, isolating features can be used to isolation portions of cable 310 proximate to connection point 313. Such isolating features can include support member 314, which can support cable 310. In some cases, support member 314 is attached to a board that is part of or proximate to electronic component 312. Cable 310 can be routed around support member 314 and clip 316 can be used to secure cable 310 to support member 314 and isolate the length of cable from movement between clip 316 and connection point 313. Support member 314 can have a curved surface that guides the cable 310 as cable 310 is drawn out of the cavity 308.

The non-isolated section of cable 310 between clip 316 and retention rib 307 may be free to move when first portion 302 is rotated with respect to second portion 304. However, since cable 310 is routed around support member 314, cable 310 maintains a concave curvature, which prevents cable 310 from bending between concave and convex curvatures, and prevents cable 310 from bending below a prescribed radius, thereby reducing fatiguing of cable 310. This wrapped configuration can allow for a relatively large length of the cable 310 for uptake during rotation of electronic device 300 while reducing the stress placed on cable 310. That is, cable 310 can be free to "float" in the cavity 308. Another advantage of this wrapped configuration is that this also reduces a distance between retention rib 307 and wall 334 of second housing 305 required to house cable 310.

In some embodiments, electronic device 300 has ventilation gap 324 suitable for providing air flow in and out of cavity 308 and cooling electronic component 312 and other components housed within cavity 308. Ventilation gap 324 is positioned near hinge region 301 between first portion 302 and second portion 304 of electronic device 300. Depending on cooling requirements, ventilation gap 324 may be large enough to allow access to components within cavity 308, including the cable 310, particularly when electronic device 300 is in a closed position (FIG. 3A). Thus, blocking member 320 can be used to restrict access to cavity 308. Blocking member 320 can an integral part of second housing 305, or a separate piece that is coupled to second housing 305. In some embodiments, blocking member 320 is coupled to an inner surface within cavity 308 proximate ventilation gap 324. Blocking member 320 may have provisions such as holes to allow for further ventilation of cavity 308. As shown, cable 310 can be routed between blocking member 320 and retention rib 307 as cable 310 exits second housing portion 304.

As described above, cover 322 should be made of a sufficiently flexible material to allow bending of cover 322 over cable 310 and mandrel 318 during opening of electronic device 300. However, cover 322 should also be rigid and resilient enough to provide a resistance force to the bending such that cover 322 returns to its original configuration when electronic device 300 is closed again. For example, the section of cover 322 between pivot axis 306 and retention rib 307 can return to substantially flat when electronic device 300 is returned to a closed state (FIG. 3A). Cover 322 should also be rigid enough to resist creasing when opposing forces act laterally on the cover 322. In addition, since cover 322 can form an external surface of electronic device 300, cover 322 should be resistant to cutting and abrasion forces. In some embodiments, cover 322 is non-electrically conductive to prevent cover 322 from electrically interfering with internal components of electronic device 300. In some embodiments, cover 322 is made of a single sheet of material, such as a composite fiber material. For example, cover 322 can be made of a single sheet of glass and/or carbon fiber material embedded within or infused with a polymer, such as polyurethane. In some embodiments, cover 322 is a laminated sheet that includes layers of different materials.

Figure 4:
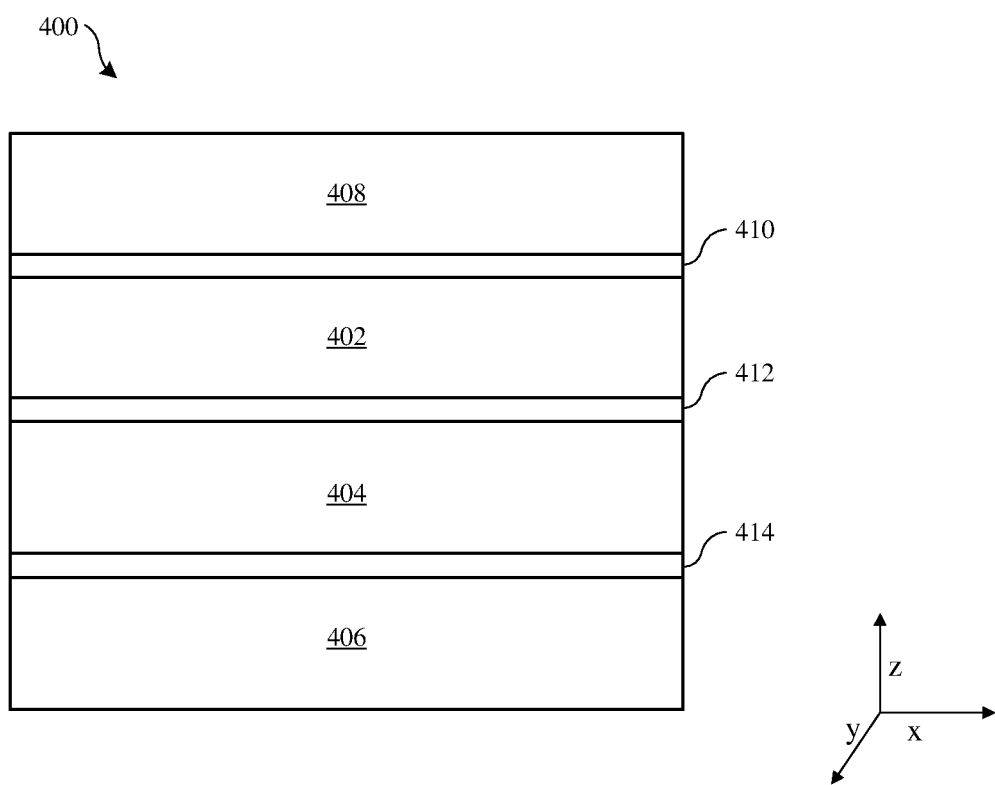
FIG. 4 shows a cross sectional view of a laminated cover, in accordance with some embodiments.

FIG. 4 shows a cross sectional view of a laminated cover 400, in accordance with some embodiments. Cover 400 includes abrasion resistant layer 402 and structural layer 404, which are flanked on opposing sides by optional outer layers 406 and 408. Layers 402, 404, 406 and 408 can be directly adjacent each other, or one or more adhesive layers, such as adhesive layers 410, 412 and 414 can be used to couple layers 402, 404, 406 and 408 together. Cover 400 can be arranged within an electronic device such that outer layer 406 covers an underlying cable and outer layer 408 is viewable to a user.

Abrasion resistant layer 402 can be configured to resist cutting, puncturing, and gouging forces that may be encountered by cover 400 from direct exposure to a user. Abrasion resistant layer 402 may also have sufficient structural rigidity and resilience to create the return force necessary to return to an original configuration, as described above. In some embodiments, abrasion resistant layer 402 includes an abrasion resistant material interweaved within a base material. Interweaving an abrasion resistant material with a base material can reduce the z-height of the cover 400. In some embodiments, abrasion resistant layer 402 includes a para-aramid synthetic fiber such as Kevlar™.

Structural layer 404 can be used to provide an extra rigidity to cover 400 in case abrasion resistance layer 402 is not rigid enough. Structural layer 404 can be used in conjunction with abrasion resistant layer 402 to reduce the z-height of the cover 400. Structural layer 404 can be made of any suitable material that imparts structural rigidity to the cover 400. For example, abrasion resistant material can be glass and/or carbon fiber material embedded within a base polymer material such as polyurethane. In some embodiments, the cover 400 includes of a number of structurally rigid layers 404.

In some embodiments, the abrasion resistant layer 402 can also be sufficiently rigid to impart structural rigidity to the cover 400. In such instances, the cover 400 can include only an abrasion resistant layer 402 that sufficiently provides structural rigidity as a cover 400. In such an instance, both surfaces of the abrasion resistant layer 402 functions as an upper and lower layer for the cover 400. In some embodiments, where the abrasion resistant layer 402 is combined with another layer (e.g., structural layer 404), the abrasion resistant layer 402 can function as an outer (upper) layer that corresponds to a visible part of the cover 400. In some embodiments, the abrasion resistant layer 402 can function as an outer (bottom) layer that corresponds to a non-visible part of cover 400.

In some embodiments, the structural layer 404 can also be made of abrasion resistant materials, such as glass and/or carbon fiber material embedded within a base polymer material. In some instances, the cover 400 can include only a structural layer 404 that imparts the flex cable (see ref. 310, FIG. 3) with puncture-resistance from foreign particles. In such an instance, both surfaces of the structural layer 404 functions as an upper and lower layer for the cover 400. In some embodiments, where the structural layer 404 is combined with another layer (e.g., abrasion resistant layer 402), the structural layer can function as an outer (upper) layer that corresponds to a visible part of the cover 400. In some embodiments, the structural layer 404 can function as an outer (bottom) layer that corresponds to a non-visible part of cover 400.

In some embodiments, the abrasion resistant layer 402 and the structural layer 404 can be combined into a single layer to form the cover 400. For example, the single layer of the cover 400 can be composed of glass and/or carbon fiber material embedded within a base polymer material and including an abrasion resistant base material such as a para-aramid synthetic fiber to reinforce the cover 400.

In some embodiments, cover 400 includes outer layers 406 and 408. Outer layer 408 can correspond to a visible part of cover 400, and thus can be a cosmetic layer. In some embodiments, outer layer 408 has a color that matches or contrasts with a color of a corresponding mandrel surface, imparting an aesthetically pleasing finish to the mandrel/cover assembly. Outer layer 408 can also have a predetermined texture, such as a specific smoothness, roughness, or shininess. Outer layer 406 can be used to seal and protect structural layer 404. Outer layers 406 and 408 can be integrally formed with respective structural layer 404 and/or the abrasion resistant layer 402. Alternatively, outer layers 406 and 408 can be adhered to the structural layer 404 and/or abrasion resistant layer 402 with adhesive layers 410 and 414, respectively. Note that in some embodiments cover 400 includes outer layer 406 and not outer layer 408; while in other embodiments cover 400 includes outer layer 408 and not outer layer 406. In particular embodiments, outer layers 406 and 408 are made of a polymer material, such as polyurethane.

Figure 5A:
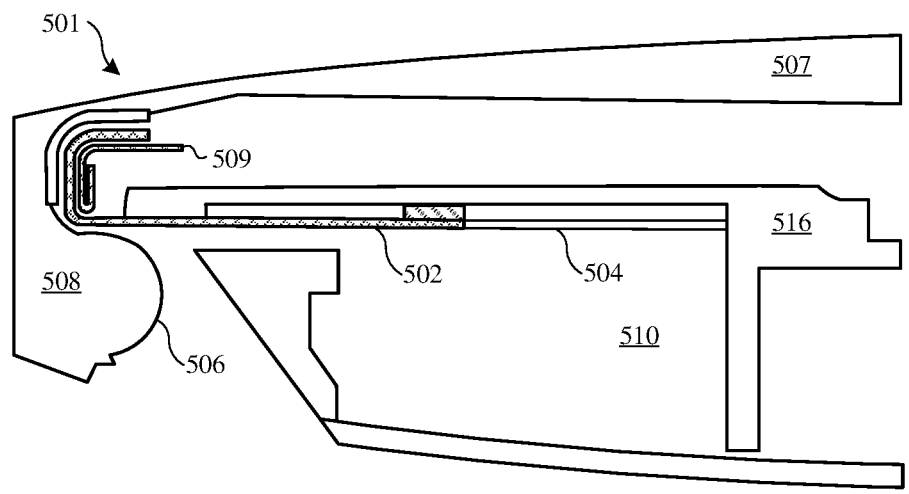
FIGS. 5A-5E show various views of a hinged electronic device having various spring mechanisms for providing a returning force to a cover, in accordance with some embodiments.
Figure 5B:
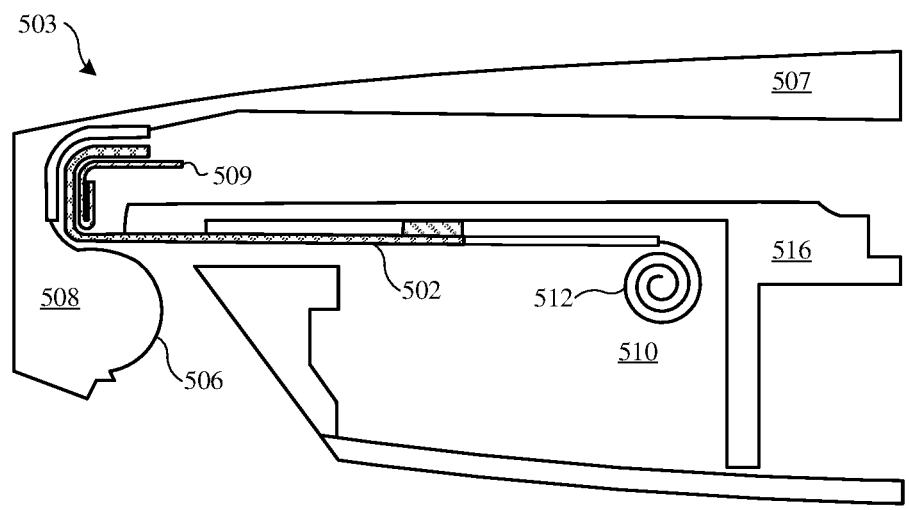
Figure 5C:
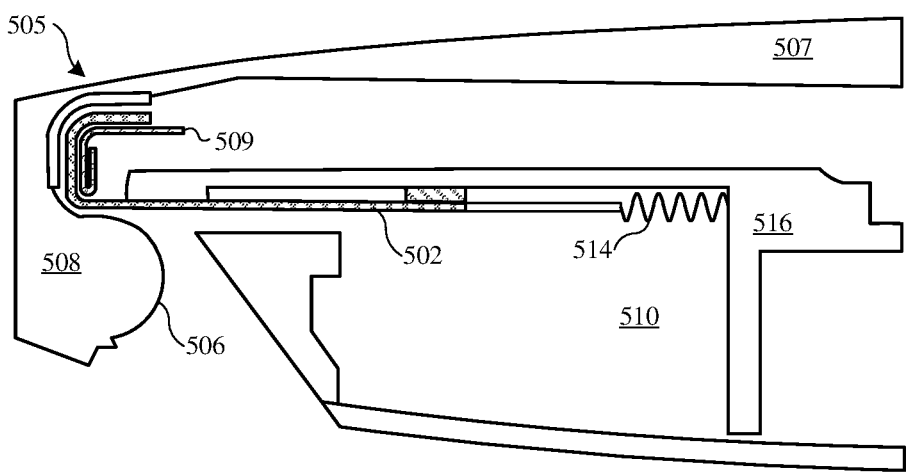

A tensioning mechanism may be used to replace or supplement a return force of a cover. The tension provided by the tensioning mechanism may be constant or they may vary with movement of the cover. The tensioning mechanism can be used to pull the cover in a particular direction or directions. Some of these embodiments are shown at FIGS. 5A-5C. For simplicity, the cross sectional views of FIGS. 5A-5C do not include cables that are covered by the covers. However, it should be understood that such cables can be included, as described above with reference to FIGS. 3A-3B.

FIG. 5A shows a cross sectional view of electronic device 501 with cover 502 having an elastic section 504 acting as a tensioning mechanism. Elastic section 504 can be coupled with second housing 516 such that when cover 502 is bent over curved surface 506 of mandrel 508, a return force is exerted on cover 502. The return force pulls cover 502 toward cavity 510 when the display housing 507 is rotated from an open to a closed position.

FIG. 5B shows a cross sectional view of electronic device 503 with cover 502 coupled to a spiral torsion spring 512. Spiral torsion spring 512 can be coupled to second housing 516 using one or more fasteners or adhesive. Spiral torsion spring 512 can exert a return force on the cover 502 proportional to a distance cover 502 is away from the spiral torsion spring 512.

FIG. 5C shows a cross sectional view of electronic device 505 with cover 502 coupled to coil spring 514. Coil spring 514 can be coupled to second housing 516 such that when cover 502 is bent over curved surface 506 of mandrel 508, a return force is exerted on cover 502, returning cover 502 toward cavity 510 when the display housing 507 is rotated from an open to a closed position.

Figure 5D:
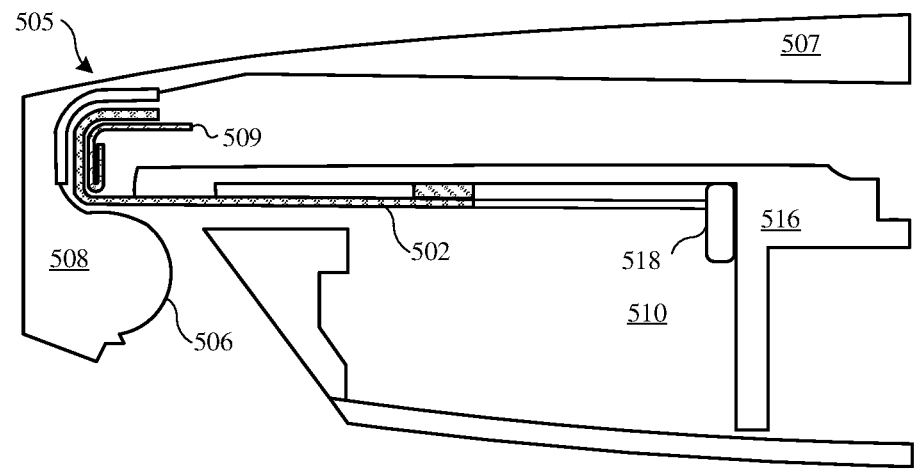

FIG. 5D shows a cross sectional view of electronic device 505 in a closed position, and where the electronic device 505 includes a cover 502 coupled to a leaf spring 518. Leaf spring 518 can be coupled to second housing 516 such that when cover 502 is bent over curved surface 506 of mandrel 508, a return force is exerted on cover 502, returning cover 502 toward cavity 510 when the display housing 507 is rotated from an open to a closed position.

Figure 5E:
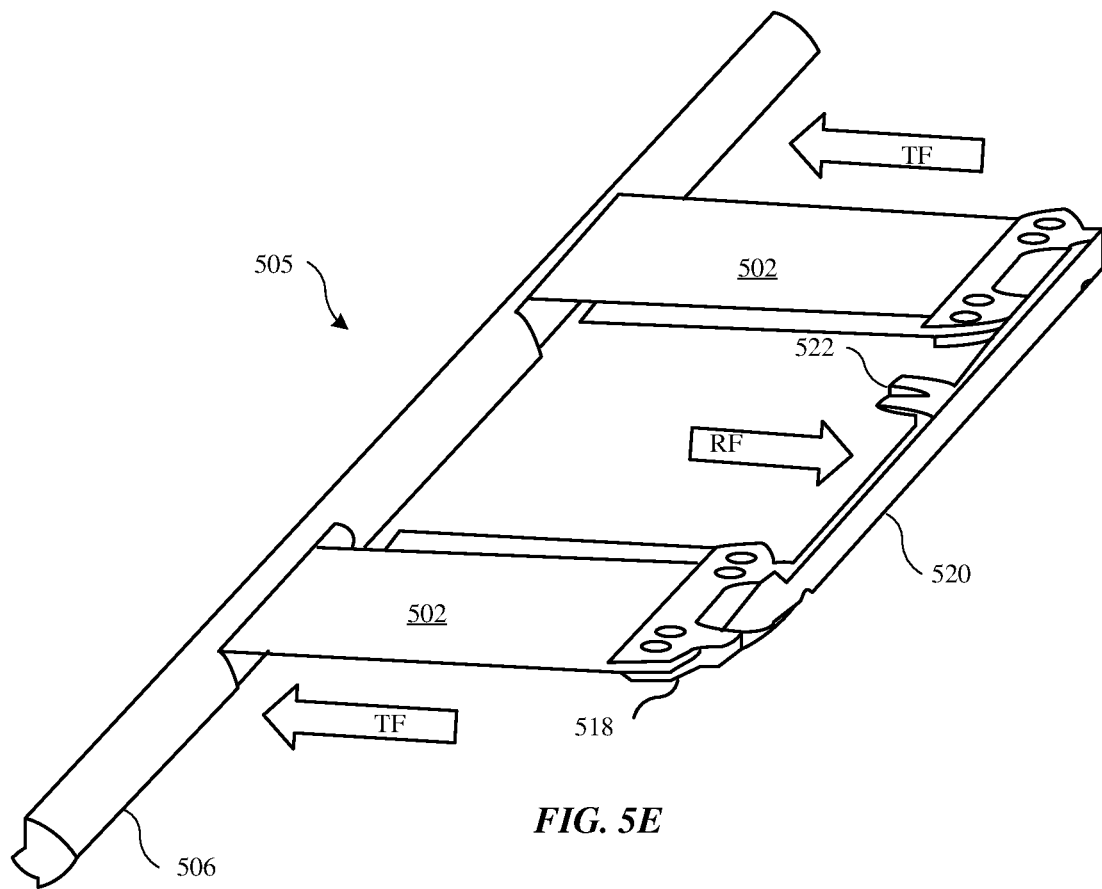

The leaf spring 518 can refer to a spring structure having a substantially cantilevered beam as shown in FIG. 5E. FIG. 5E shows a perspective view of the electronic device 505 with cover 502 coupled to the leaf spring 518 of FIG. 5D. FIG. 5E shows that each end of a cover 502 is coupled to the leaf spring 518. The leaf spring 518 can include leaf spring arms 520 and a fixed point 522. The fixed point 522 can be positioned at a length that is halfway along the length of the leaf spring arms 520. The leaf spring arms 520 can refer to a double leaf spring arm. As shown in FIG. 5E, the double leaf spring arm 520 is balanced by a load on both ends of the arms 520. The double leaf spring arm 520 can provide an amount of tension force (TF) on the cover 502 as the cover 502 is returned towards the cavity 510 when the display housing 507 is rotated from an open to a closed position. Contrarily, the leaf spring arms 520 can provide a reactionary force (RF) on the electronic device 505, which opposes the direction of the tension force (TF). Implementation of a leaf spring tensioning mechanism in the electronic device can impart more balance in loading on the structure of the electronic device. In addition, the leaf spring tensioning mechanism can impart little to zero moment/rotation loads that would be imparted on the structure of the electronic device.

FIG. 5E shows that the leaf spring arm 520 can include a single linear metal strip arm that includes two ends. Each end of the arm 520 is attached to an end of a cover 502. In some embodiments, the leaf spring arms 520 can include a plurality of strips of linear or slightly curved metal strips that are attached or clamped together to form the leaf spring arms 520.

The arms of the leaf spring 518 can be manufactured from spring steel, according to some embodiments. Spring steel refers to steel or steel alloys having a high yield strength. When spring steel is subjected to twisting or deflection forces that cause the spring steel to deviate from its original shape, the high yield strength imparts the spring steel with the capability to substantially return to its original shape. Accordingly, the spring steel can impart a return force on the cover 502 as the cover 502 is returned towards the cavity 510 when the display housing 507 is rotated from an open to a closed position. In some examples, the spring steel can have a yield strength between about 60 ksi to about 150 ksi. KSI refers to the ultimate tensile strength of any material. 1 KSI can refer to one thousand pounds per square inch. In some embodiments, the spring steel can have a high spring constant.

Although FIG. 5E illustrates that the leaf spring arm 520 can have a substantially linear configuration, in some embodiments, the arms of the leaf spring 518 can have a substantially elliptical configuration.

The tensioning mechanisms of FIGS. 5A-5E can provide a number of benefits. For example, the tensioning mechanism can keep cover 502 substantially flatly over mandrel 508 so as to provide controlled movement of cover 502 during pivotal movement of electronic device 501. In addition, the tensioning mechanism can prevent or mitigate jamming of cover 502 from contamination material (e.g., particles, fluid, etc.) during pivotal movement of electronic device 300. Furthermore, the tensioning mechanism can act as a retention mechanism for cover 502 by retaining cover 502 within the stepped channel that cover 502 traverses proximate to anchor 509. It should be noted that the tensioning mechanism configurations shown in FIGS. 5A-5E are exemplary and any suitable mechanism or combination of tensioning mechanisms for exerting a return force to cover 502 can be used. For example, one or more extension spring, torsion spring, constant force spring, metallic spring or flexure, elastic material (e.g., woven or monolithic) and/or magnetic mechanism can be used.

Figure 6:
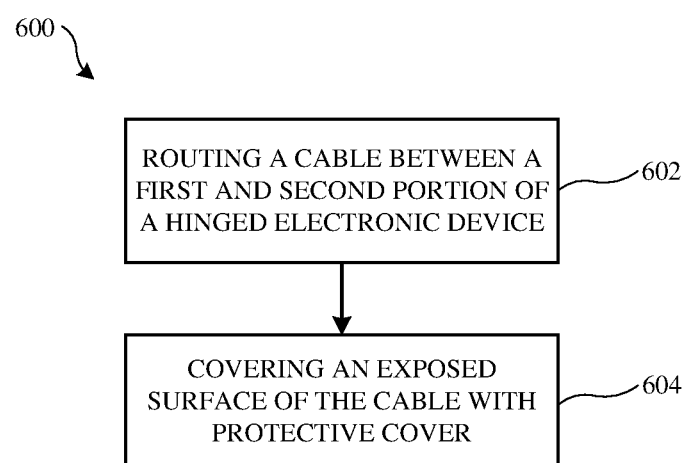
FIG. 6 shows a flowchart indicating a process for protecting a cable routed between hinged portions of an electronic device, in accordance with some embodiments.

FIG. 6 shows flowchart 600 indicating a process for protecting a cable routed between hinged portions of an electronic device, in accordance with some embodiments. At 602, a cable is routed between a first portion and a second portion through a hinge region of the electronic device. The first portion can correspond to a lid portion having a display and the second portion can correspond to base portion of a laptop computer. The cable may electrically couple an electronic component within the first portion with an electronic component within the second portion. The hinge region can include a mandrel having a curved surface. The cable can be positioned such that the cable is drawn over a surface of the mandrel when the electronic device rotates from a closed state to an open state. A surface of the cable can be exposed at the hinge region of the electronic device when the electronic device is in an open state. The cable can include one or more flex cables.

At 604, the exposed surface of the cable is covered with a cover. The cover can be positioned over the cable such that the cover is drawn over the cable and the mandrel when the electronic device is rotated from the closed state to the open state. The cover can be characterized as having a flexibility sufficient to bend with the cable over the mandrel when the electronic device is rotated from a closed to an open position, and a rigidity sufficient to provide a restoring force that returns the cover to an original configuration when the electronic device is rotated back to the closed position. The cover can cover a side of the cable that would otherwise be exposed when the electronic device is in the open state. In this way, the cover can be visible to a user of the electronic device and be exposed to external forces such as cutting and abrasive forces. Thus, the cover can also be made of a durable material that is resistant to cutting and/or abrasion. In some embodiments, the cover has multiple layers of material in order to accomplish these and other desired functionalities. In some embodiments, the cover includes a cosmetic layer that corresponds to a visible portion of the cover and that has a desired aesthetic characteristic, such as a predetermined color and/or texture.

Mandrel Cover

Figure 7:
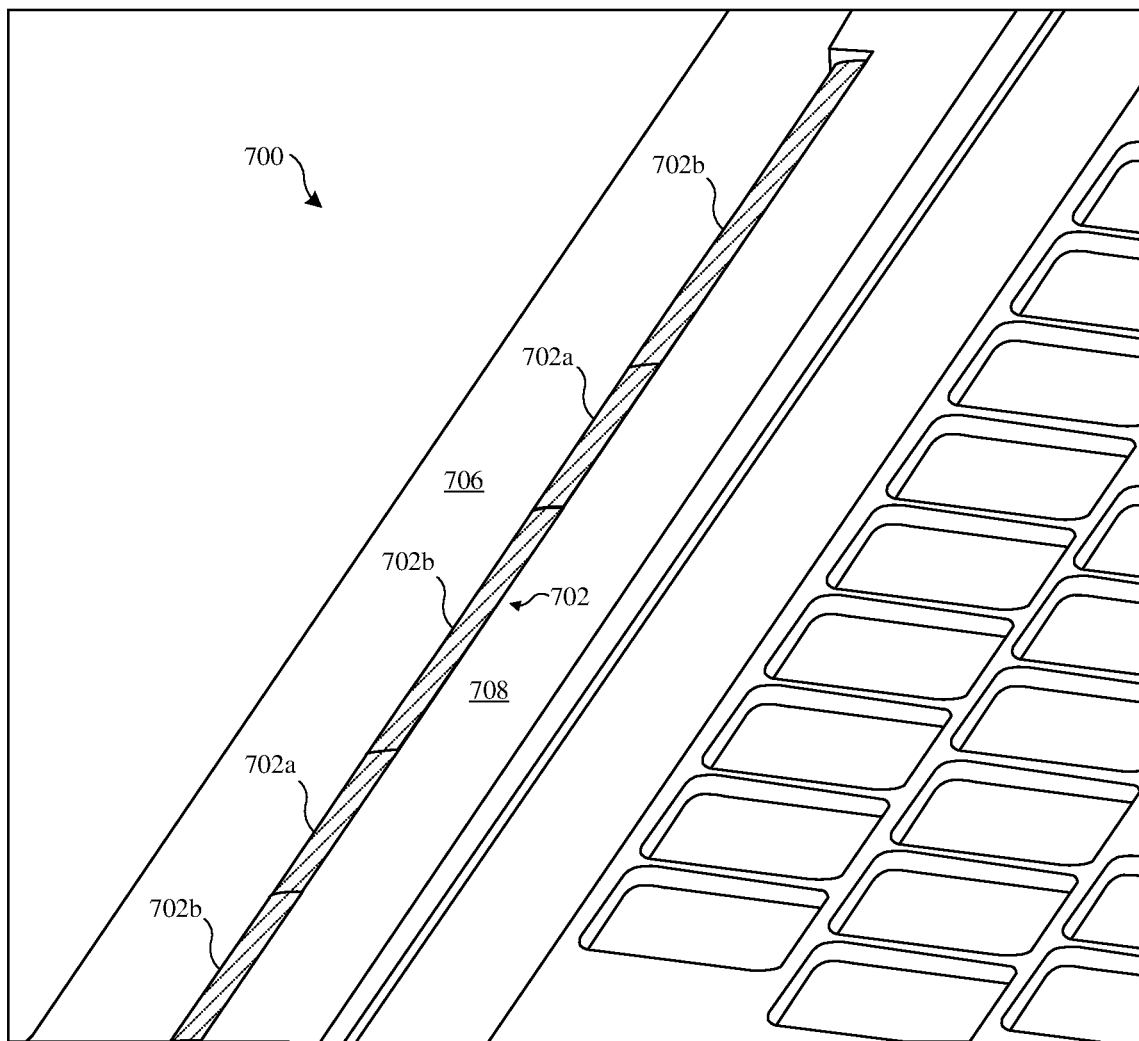
FIGS. 7-9 show various views of another embodiment of a cover that is designed to conceal a cable and a mandrel of the electronic device, in accordance with some embodiments.
Figure 8A:
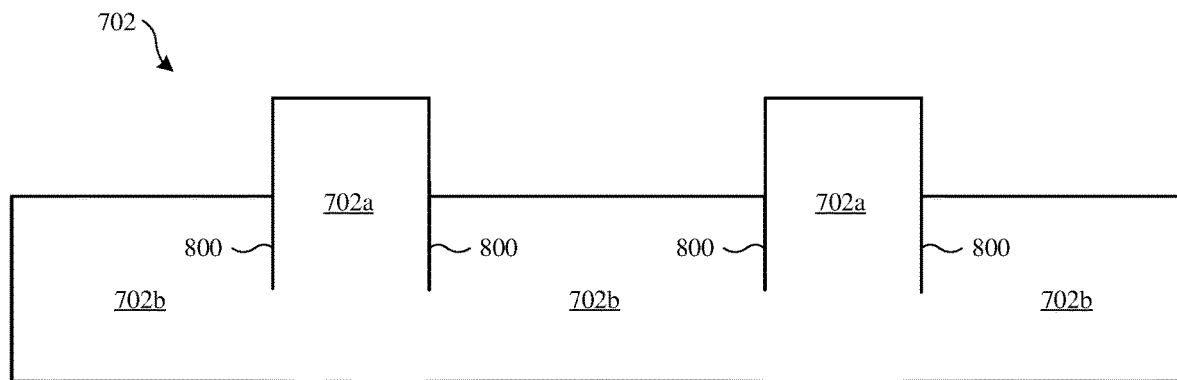
Figure 8B:
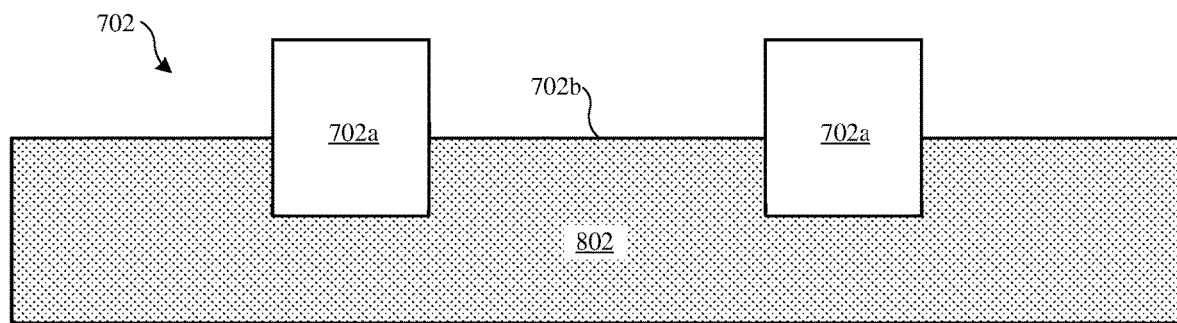
Figure 9:
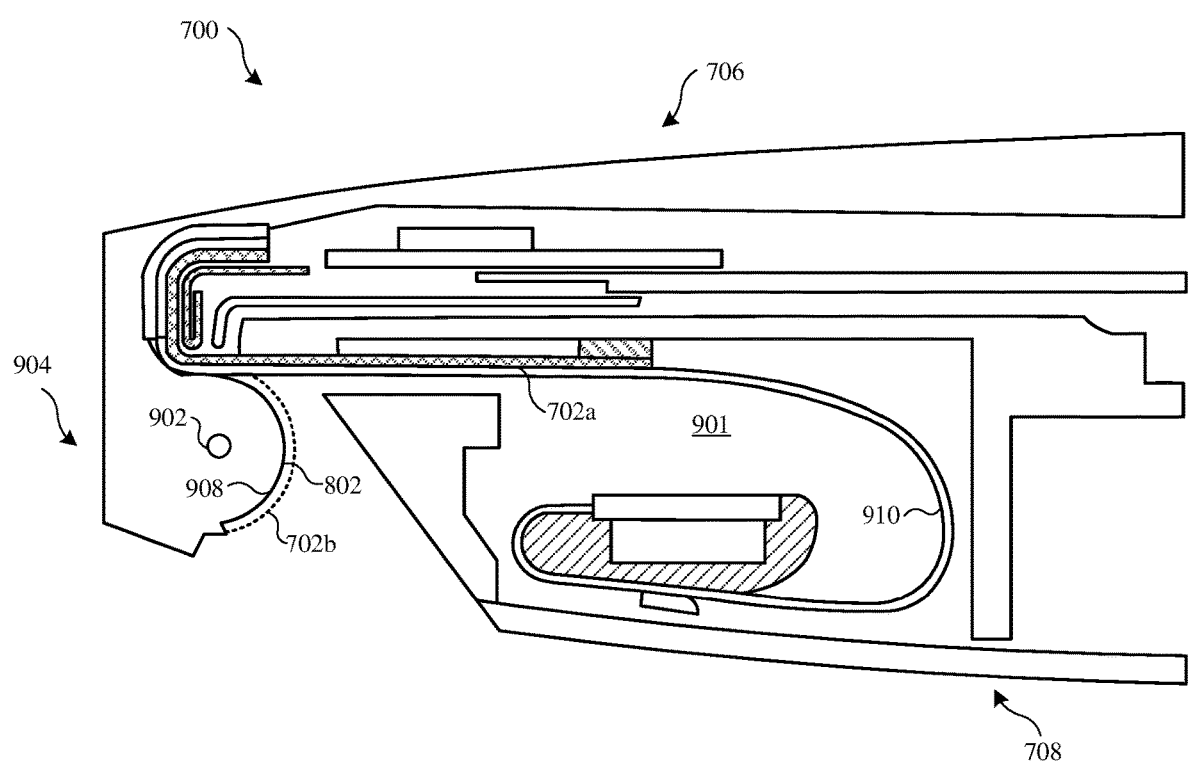

FIGS. 7-9 show another embodiment of a cover that is designed to conceal not only cables but also portions of the mandrel that would otherwise be exposed to a user. FIG. 7 shows a perspective view of a hinge portion of electronic device 700 having a cover 702 that conceals underlying cables (e.g., flex circuits) and a mandrel from view of a user of electronic device 700. Electronic device 700 includes first portion 706 that is pivotally coupled to second portion 708 of electronic device 700. Cover includes cable-covering section 702a, which is drawn over underlying cables, and mandrel-covering section 702b, which is drawn over remaining portions of the mandrel. That is, mandrel-covering section 702b prevents the mandrel from being exposed when electronic device 700 is in the open state. In this way, cable-covering section 702a and mandrel-covering section 702b can cover substantially all portions of the underlying mandrel and cables, resulting in a cosmically consistent and appealing appearance. In some embodiments, mandrel-covering section 702b is coupled to and does not move with respect to the mandrel during the pivoting opening and closing action of electronic device 700.

FIGS. 8A and 8B shows plan views of cover 702 prior to assembly into electronic device 700, in accordance with some embodiments. FIG. 8A shows cover 702 prior to application of adhesive 802, and FIG. 8B shows cover 702 with adhesive 802 applied thereon. As shown cover 702 can include a single piece of material where cable-covering section 702a extends off of mandrel-covering section 702b. Mandrel-covering section 702b fully or partially wraps around the mandrel while cable-covering section 702a extends within second portion 708 of electronic device 700. Adhesive 802 can be used to adhere mandrel-covering section 702b to the mandrel. Slits 800 are cut within cover 702 to allow cable-covering section 702a to freely move with respect to mandrel-covering section 702b during pivoting movement of first portion 706 with respect second portion 708 of electronic device 700.

As described above, cover 702 can be made of a flexible material (or layers of materials) that is not susceptible to creasing or crinkling during pivoting of first portion 706 relative to second portion 708 of electronic device. In addition, cover 702 can be made of a durable enough material to withstand wear and tear that can be accompanied with direct exposure to a user of electronic device 700. One of the advantages of cover 702, including cable-covering section 702a and mandrel-covering section 702b, being made of continuous sheet of material (or layers of material) is to reduce any alignment errors that can occur compared to if cable-covering section 702a and cover 702 were made of separate pieces of material. In some embodiments, slits 800 are cut using a laser to assure that cable-covering section 702a remains tightly adjacent to mandrel-covering section 702b and that any gap formed between cable-covering section 702a and mandrel-covering section 702b is not visible to a user. In addition, the precision of laser cutting can assure that material of cover 702 does not fray along edge of slits 800.

Note that FIGS. 8A and 8B show an embodiment where cable-covering section 702a includes two extending portions of material. It should be noted, however, that in other embodiments the cable-covering section 702a can include one extending portion, or more than two extending portions, as dictated by design requirements. In addition, in other embodiments, cable-covering section 702a is completely separated from mandrel-covering section 702b.

FIG. 9 shows a cross sectional view of a portion of electronic device 700 in a closed state with cover 702 assembled therein, in accordance with some embodiments. First portion 706 of electronic device 700 is configured to pivot with respect to second portion 708 of electronic device 700 about pivot axis 902 of hinge region 904. Cover 702 is positioned over and hides cable 910, which enters into cavity 901 of second portion 708. The cable 910 can provide electrical communication between first portion 706 and second portion 708. Cable-covering section 702a of cover 702 covers cable 910, while mandrel-covering section 702b (dashed line) covers mandrel 908 such that mandrel 908 is not visible to a user of electronic device 700 when in an open position. Mandrel-covering section 702b can be coupled to mandrel 908 using, for example, adhesive 802.

Tensioning Mechanism for Flex Cable Cover

Figure 10:
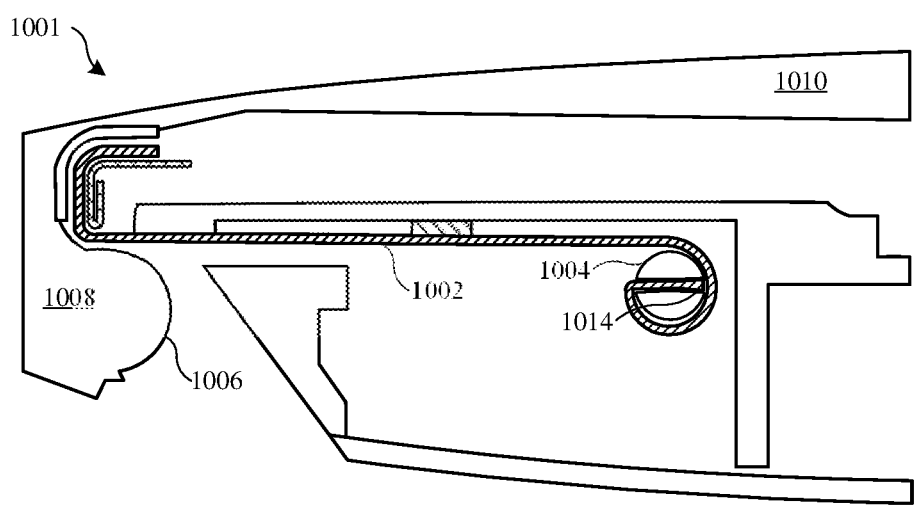
FIG. 10 shows a cross sectional view of a hinged electronic device, according to some embodiments.

As discussed above with reference to FIGS. 5A-5E, a tensioning mechanism, such as a spring, can exert a return force to a cover to control movement of the cover when a display housing is rotated from an open to a closed position. In some embodiments, the spring can be combined with a shaft forming tensioning mechanism 1004. FIG. 10 shows a cross sectional view of electronic device 1001 having a cover 1002 engaged with rotating tensioning mechanism 1004. Tensioning mechanism 1004 can include a cylindrical shaft coupled to a retraction spring. The cylindrical shaft can be located perpendicular to cover 1002 such that cover 1002 can be drawn over an outer surface of the cylindrical shaft. The retraction spring can be designed to exert a rotational torque on the shaft, drawing cover 1002 over the surface of the cylindrical shaft and providing tension in cover 1002. In some embodiments, the retraction spring can be a constant force spring, exerting a substantially constant rotational force on the cylindrical shaft, and thus cover 1002. The spring can be a coil spring, or a pre-stressed flat strip of spring material which is formed into virtually constant radius coils around itself or on a drum. As display housing 1010 is rotated from an open to a closed position, tensioning mechanism 1004 can draw cover 1002 over a curved outer surface of tensioning mechanism 1004, allowing for a compact and isolated tensioning mechanism 1004.

Cover 1002 can be coupled to tensioning mechanism 1004 by engagement feature 1014 located at an end of cover 1002. Engagement feature 1014 can be recessed into tensioning mechanism 1004 such that cover 1002 can be drawn fully around the outer surface of tensioning mechanism 1004. In some embodiments, engagement feature 1014 can include an expanded section of cover 1002. The expanded section of cover 1002 can retain cover 1002 within a slot in tensioning mechanism 1004.

Tensioning Mechanism Assembly

Figure 11A:
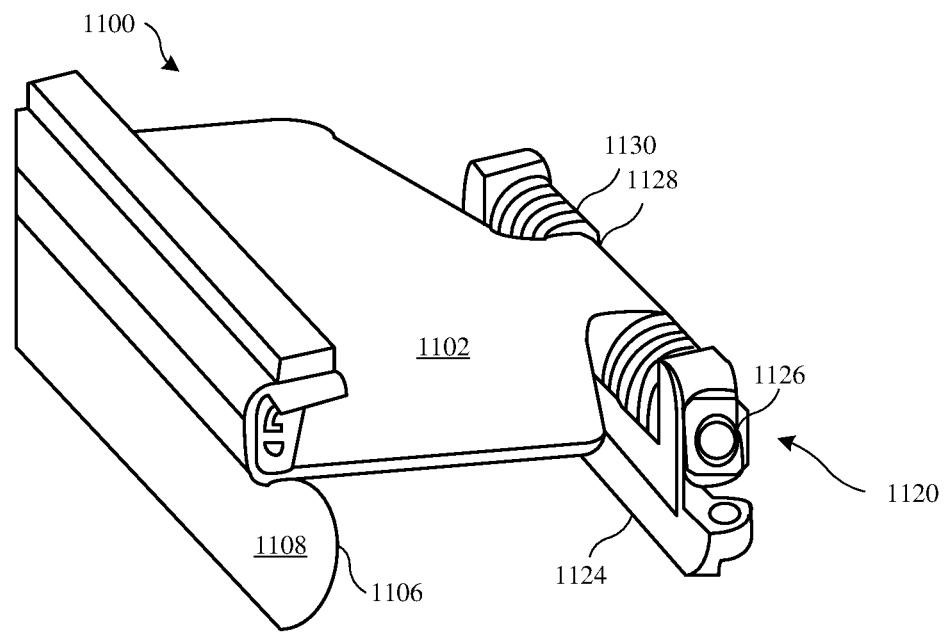
FIGS. 11A-11D show various views of an exemplary tensioning mechanism assembly, according to some embodiments
Figure 11B:
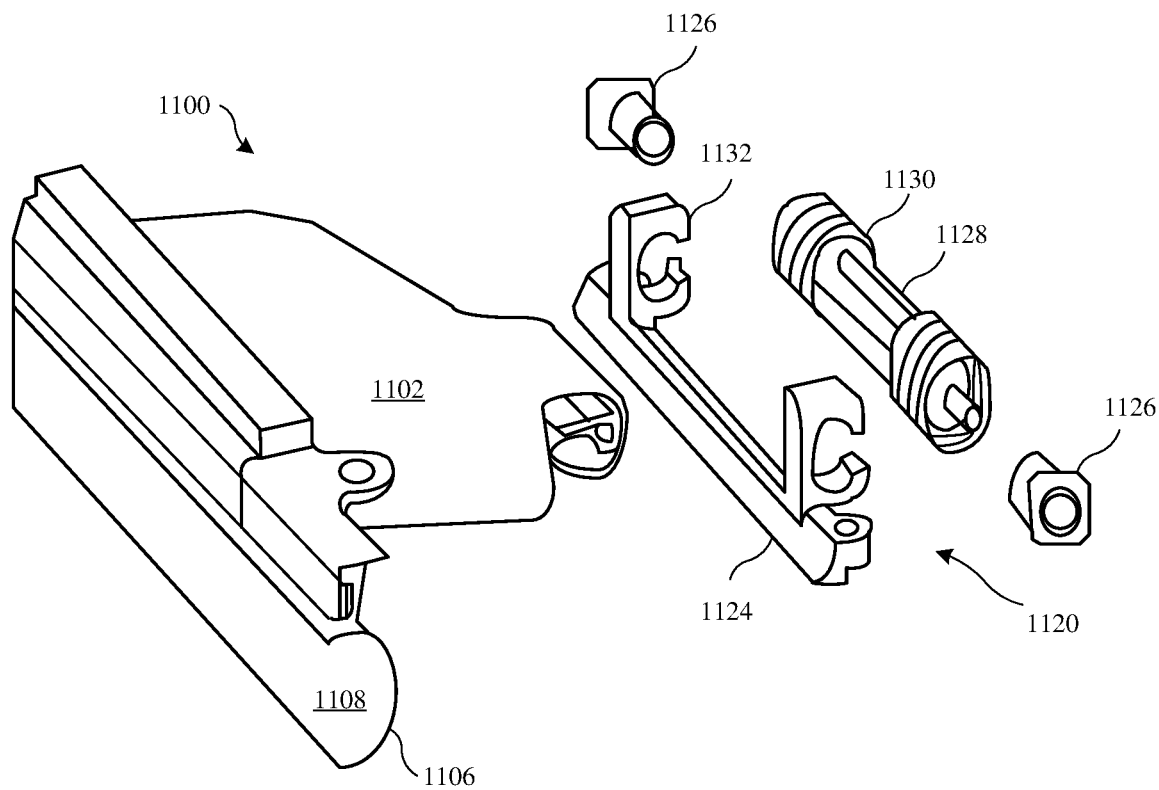

FIGS. 11A-11B illustrate perspective views of an electronic device 1100 having a tensioning mechanism assembly 1120. FIG. 11A shows the tensioning mechanism assembly 1120 can be mechanically coupled to an end of the cover 1102. The cover 1102 can be drawn over a curved surface 1106 of the mandrel 1108. The tensioning mechanism assembly 1120 can include a frame 1124, a shaft 1128, a spring 1130, and large diameter bushings 1126. The large diameter bushings 1126 can capture the shaft 1128 and spring 1130 in a position within the frame 1124.

In some embodiments, the spring 1130 can refer to a coil spring, or a pre-stressed flat strip of spring material which is formed into virtually constant radius coils around itself or on a drum. In some embodiments, the spring 1130 can refer to two independently-joined spring coils that are coupled to each other at their respective ends. One example of a coil spring which can be implemented as spring 1130 within the tensioning mechanism assembly 1120 is a spiral torsion spring 512 (see FIG. 5B).

FIG. 11B shows a perspective view of the individual components (e.g., 1124, 1126, 1128, 1130, 1132) of the tensioning mechanism assembly 1120 prior to being assembled. FIG. 11B shows the tensioning mechanism assembly 1120 can be mechanically coupled to an end of the cover 1102. The cover 1102 can be drawn over a curved surface 1106 of the mandrel 1108. FIG. 11B shows that the tensioning mechanism assembly 1120 can include a frame 1124 having c-cutouts 1132. The c-cutouts 1132 can be machined from the frame 1124. The tensioning mechanism assembly 1120 can further include a spring 1130 and a shaft 1128. Furthermore, the tensioning mechanism assembly 1120 can include large diameter bushings 1126. The shaft 1128 can have a small diameter (or shape and size) which is sufficient to be fitted within the dimensions of the openings of the c-cutout 1132. Once the shaft 1128 is fitted within the openings of the c-cutout 1132, the shaft 1128 can be capped off and secured with a large diameter bushing 1126. Accordingly, FIG. 11B illustrates that the components of the tensioning mechanism assembly 1120 can be assembled outside of the cavity of the electronic device. Thereafter, the tensioning mechanism assembly 1120 can be installed into a cavity (see ref. 510, FIG. 5) of the electronic device 1100. The large diameter bushings 1126 can capture (or lock) in place the shaft 1128 and spring 1130 within the c-cutouts 1132 of the frame 1124. Accordingly, the shaft 1128 also becomes captured (or locked) into position. In some embodiments, the large diameter bushings 1126 can be captured in place of the shaft 1128 by using spring edges, snaps, light interference fits, or other retaining features.

By using a structural frame 1124 to include the various components of the tensioning mechanism assembly 1120, the tensioning mechanism assembly 1120 can be assembled independently of the electronic device. At least one or more of the various components (e.g., 1124, 1126, 1128, 1130, 1132) of the tensioning mechanism assembly 1120) can be small and complex such that assembling in an assembly can permit testing of the tensioning mechanism assembly 1120 prior to being fitted within the electronic device 1100. In this manner, any defects or complications regarding the tensioning mechanism assembly 1120 can be detected in an isolated environment.

Figure 11C:
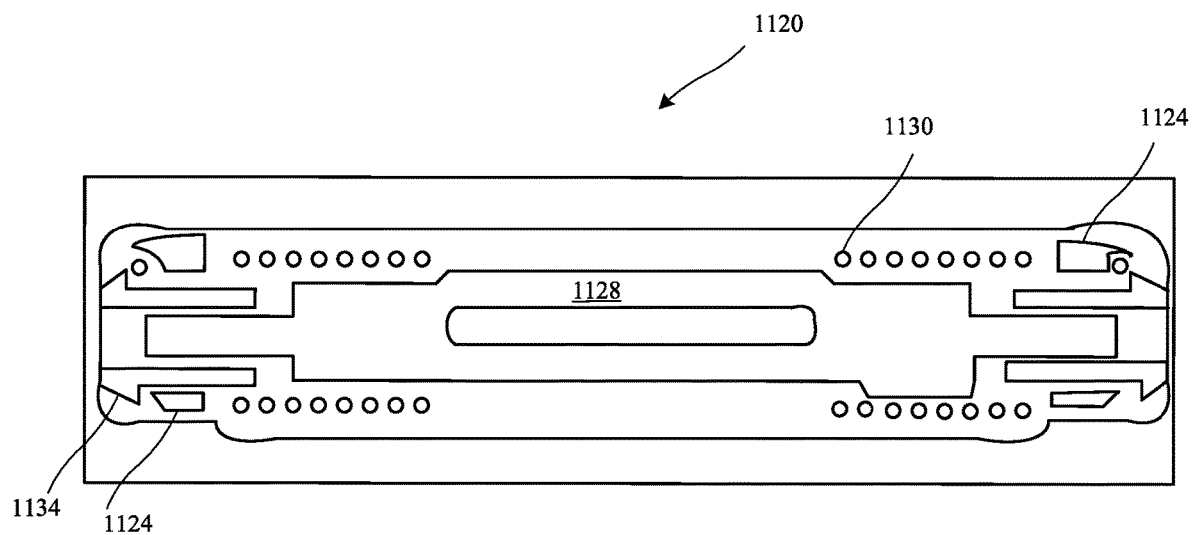

FIG. 11C illustrates a cross sectional view of the tensioning mechanism assembly 1120. FIG. 11C illustrates that once the various components (e.g., 1124, 1126, 1128, 1130, 1132) of the tensioning mechanism assembly 1120 are assembled, the large diameter bushings 1126 can be captured within the frame 1124 such that the large diameter bushings 1126 cannot move outside of the structure of the electronic device 1100.

Figure 11D:
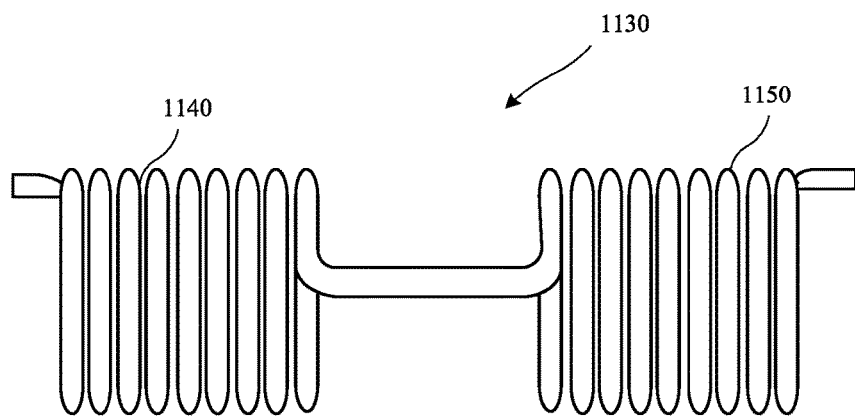

FIG. 11D illustrates a perspective view of tensioning mechanism assembly 1120 having a torsion spring tensioner implementation 1130, according to some embodiments. The torsion spring tensioner implementation 1130 can refer to a double torsion spring. In conventional techniques, two individual springs, which are not connected, can rotate perpendicular to their coil axis as they are loaded. However, such a configuration can induce inner shaft rubbing and induce stress on the individual springs. FIG. 11D illustrates that the double torsion spring refers to two oppositely wound springs 1140, 1150 can be coupled to each other. By connecting an end of spring 1140 to an end of spring 1150, the spring mechanism becomes more balanced and more stable by minimizing or eliminating stress on the individual springs and inner shaft rubbing.

Tensioning Mechanism for Flex Cable Cover

Figure 12A:
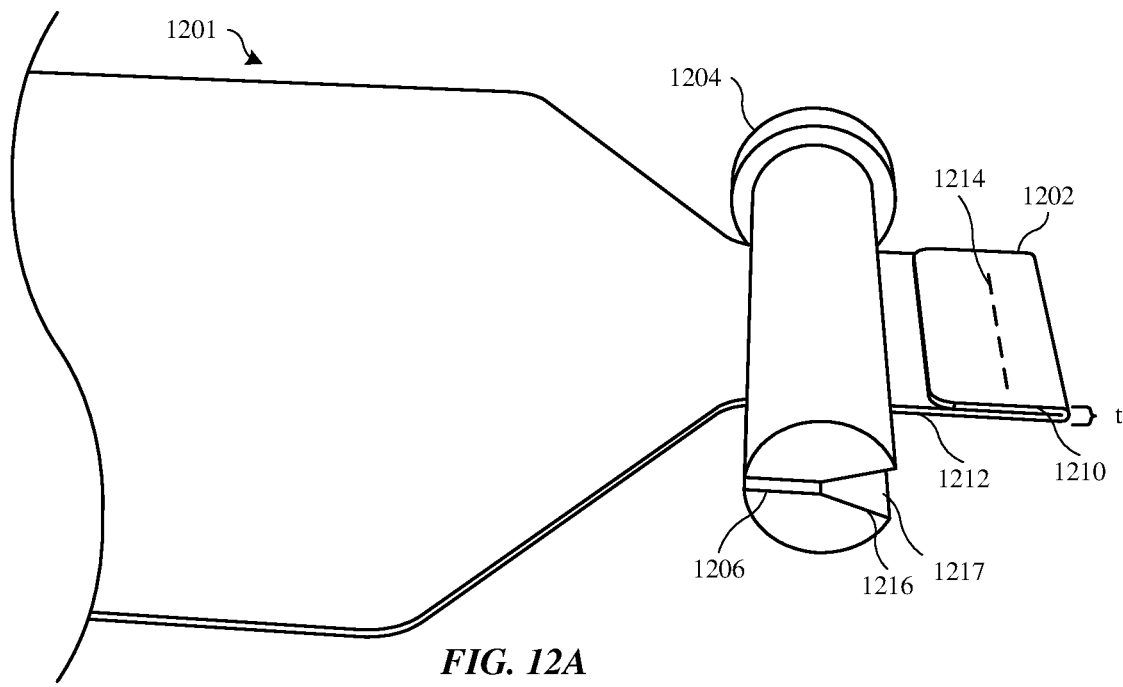
FIGS. 12A-12C show perspective views of exemplary retaining features of a cover, according to various embodiments.
Figure 12B:
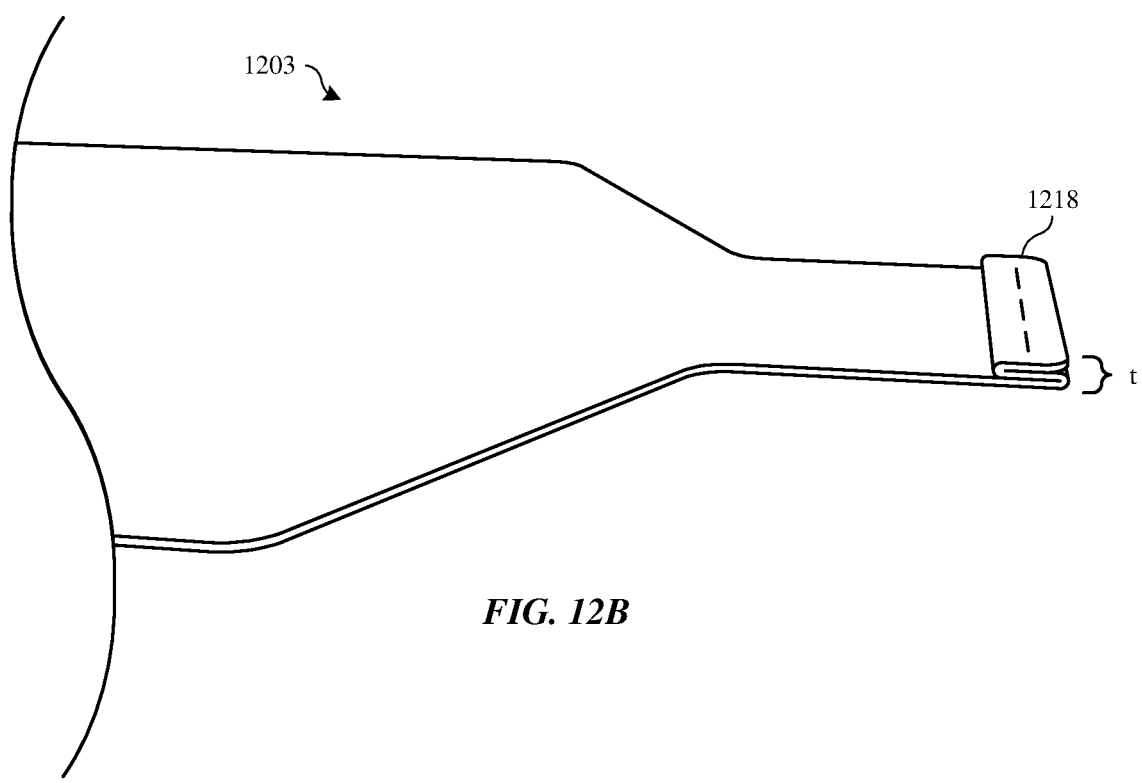
Figure 12C:
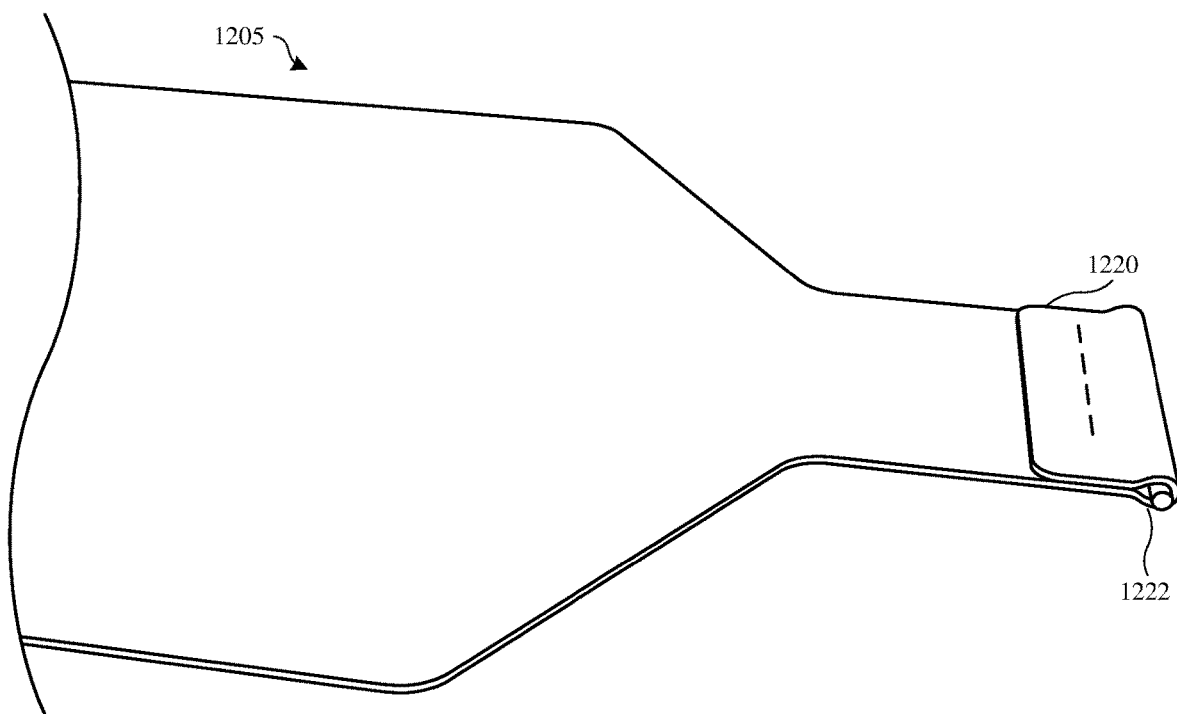

FIGS. 12A thru 12C show perspective views of exemplary retaining features of a cover. FIG. 12A shows cover 1201 having retaining feature 1202 that is configured to engage with tensioning mechanism 1204. The retaining feature 1202 includes a portion having a sufficient thickness "t" such that retaining feature 1202 cannot be pulled through slot 1206 of tensioning mechanism 1204. In some embodiments, cover 1201, prior to the formation of retaining feature 1202, is passed through slot 1206 in tensioning mechanism 1204. Retaining feature 1202 having a thickness "t" is formed on a portion of cover 1201 such that cover 1201 cannot be retracted from slot 1206. Cover 1201, and retaining feature 1202 can be pulled back into slot 1206, engaging retaining feature 1202 and slot 1206.

Retaining feature 1202 can include first section 1210 folded over and secured to remaining section 1212 of cover 1201 forming a hem. The increased thickness "t" created of the hem prevents cover 1201 from disengaging from slot 1206 in tensioning mechanism 1204. In some embodiments, first section 1210 can be secured to remaining section 1212 using adhesive. The adhesive can be a heat activated adhesive that is located between the stacked layers of cover material forming the hem, or retaining feature 1202. The heat activated adhesive can be placed on the cover material and heat can be applied to the folded over section during assembly of the cover. In some embodiments, first section 1210 is secured to remaining section 1212 through stitches 1214 sewn through the stacked layers of cover material that form retaining feature 1202. Stitches 1214 can provide increased shear strength over adhesive, particularly when surface area available for adhesive is minimal. In further embodiments, both stitches 1214 and an adhesive can be used to secure the layers of cover material.

Additionally, slot 1206 can include a wedged area 1217 that produces a compressive force on retaining feature 1202 when cover 1201 is pulled back through slot 1206. This compressive force can increase shear strength between adhered layers of cover material, decreasing a likelihood of retaining feature 1202 from separating. The width of slot 1206 can be chosen to allow cover 1201, without retaining feature 1202, to pass through slot 1206. In some embodiments, the width of slot 1206 can be larger than the thickness of cover 1201. Thickness "t" of retaining feature 1202 can be chosen such that retaining feature 1202 cannot pass through slot 1206. The desired thickness "t" of retaining feature 1202 can be chosen to prevent retaining feature 1202 from passing through slot 1206, while allowing retaining feature 1202 to sit recessed in wedge 1216.

FIG. 12B shows cover 1203 having multiple folded sections of cover material that increase thickness "t" of retaining feature 1218. Although two folds are shown, any number of folds can be used to achieve a desired thickness "t" of retaining feature 1218. The increased thickness provided by multiple folded sections can decrease creep, or slippage of retaining feature 1218 within a slot in the tensioning mechanism. Folded layers can be secured using stitching or adhesive, or a combination of the two.

FIG. 12C shows cover 1205 having a retaining feature 1220, according to some embodiments. Retaining feature 1220 can include a removable enlarging element 1222, such as a pin. Pin 1222 can placed during an assembly process of cover 1205 to set the location of retaining feature 1220 relative to a reference datum, such as an opposing mounting location of cover 1205. A hem can be formed around pin 1222, forming retaining feature 1220. The hem can be secured using adhesive, stitching or any similar securing method. The use of a removable enlarging element 1222 allows retaining feature 1220 to be formed in a distinct and separate process from the assembly of cover 1205 and the tensioning mechanism.

Pin 1222 can be removed during assembly of cover 1205 to a tensioning mechanism. A slot in the tensioning mechanism can be sized to allow retaining feature 1220 without pin 1222 to pass through. Pin 1222 can then be installed in retaining feature 1220, expanding retaining feature 1220 such that retaining feature 1220 cannot pass back through the slot, thus locking retaining feature 1220 to the tensioning mechanism.

Figure 13:
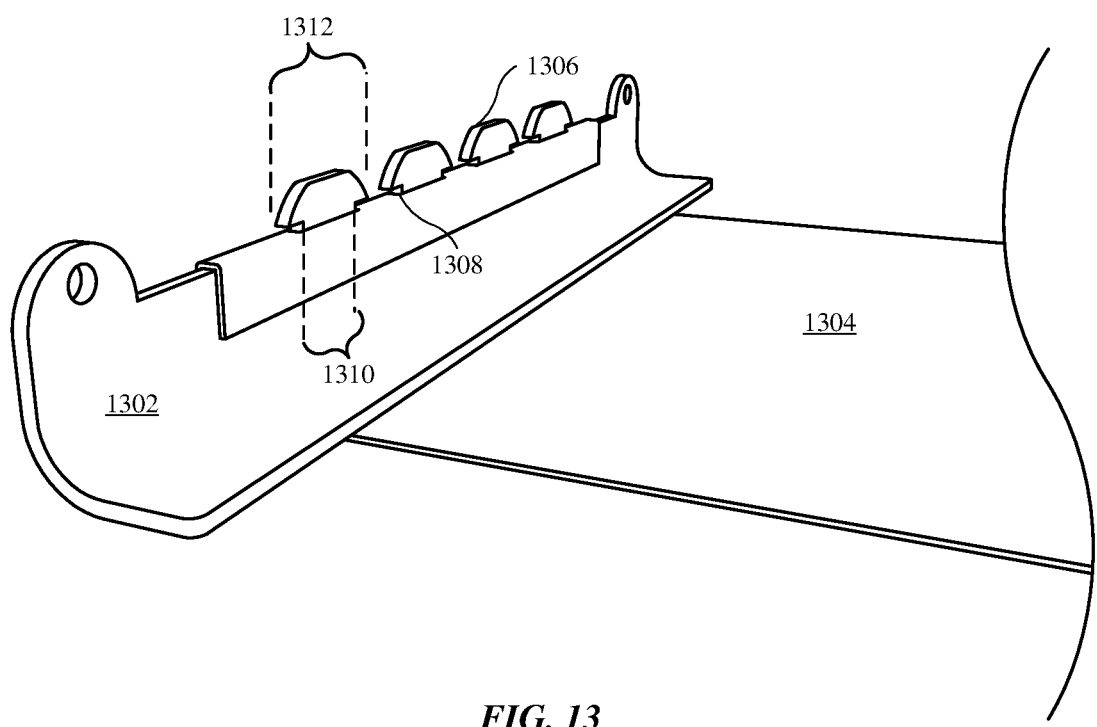
FIG. 13 shows a perspective view of an exemplary anchor for securing a cover, in accordance with some embodiments.

FIG. 13 shows a perspective view of an exemplary anchor 1302 used to secure cover 1304 opposite a tensioning mechanism. Anchor 1302 can secure cover 1304 to a lid portion of an electronic device, and provide an anchor for a tensioning mechanism located on an opposing side of cover 1304. Cover 1304 can be secured to anchor 1302 through adhesive, hooks, castellations or other mechanical interlocks. In some embodiments, anchor 1302 includes hooks 1306. Hooks 1306 can be arranged on anchor 1302 such that hooks 1306 protrude through slits 1308 in cover 1304, thus forming a mechanical interlock between cover 1304 to anchor 1302. Adhesive can be used in combination with hooks 1306 and located where cover 1304 contacts the surface of anchor 1302. Wrapping cover 1304 around anchor 1302 can increase a surface area available for adhesive to couple cover 1304 to anchor 1302. When using a high tensile strength material for cover 1304, the mechanical interlock between cover 1304 and anchor 1302 can provide sufficient strength to prevent cover 1304 from creeping, or slipping after installation. In some embodiments, the geometry of hooks 1306 can be chosen to resist bending under tension and balance ease of cover 1304 installation with resistance of cover 1304 to pull off of hooks 1306. Hooks 1306 can include slits 1308, forming castellations. Castellations can capture cover 1304 during installation, resisting cover 1304 from pulling off hooks 1306. A hook ratio, defined as the relationship between the neck 1310 of hook 1306 and width 1313 of hook 1306 can be chosen to balance the bending strength of hooks 1306 with ease of fabric installation and resistance of cover to pull off hooks 1306. Additionally, the height of castellation, or fabric thickness opening of castellations, can be chosen to accommodate variations in cover 1304 thickness.

Foreign Particle Handling Components of the Mandrel

FIGS. 14-17 refer to foreign particle handling components of the hinged electronic device, according to various embodiments.

Figure 14A:
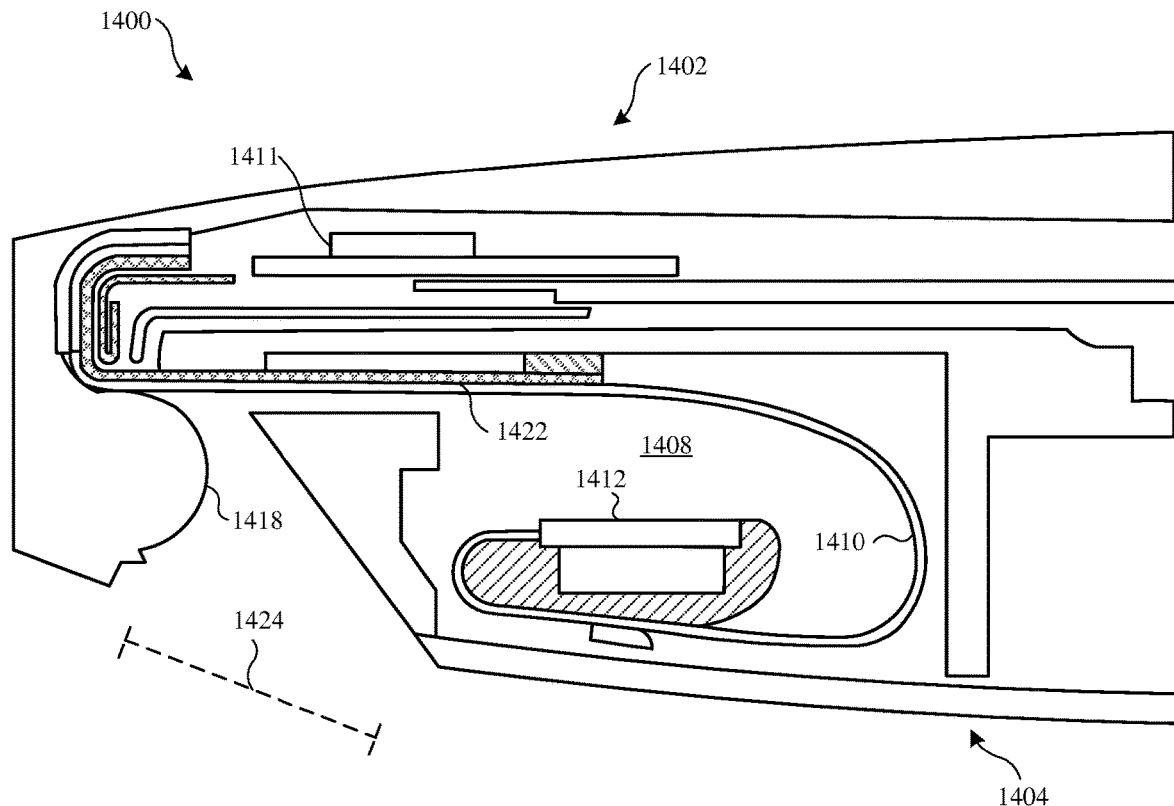
FIGS. 14A-14B shows a cross sectional view and a magnified cross sectional view of a hinged electronic device, in accordance with some embodiments.
Figure 14B:
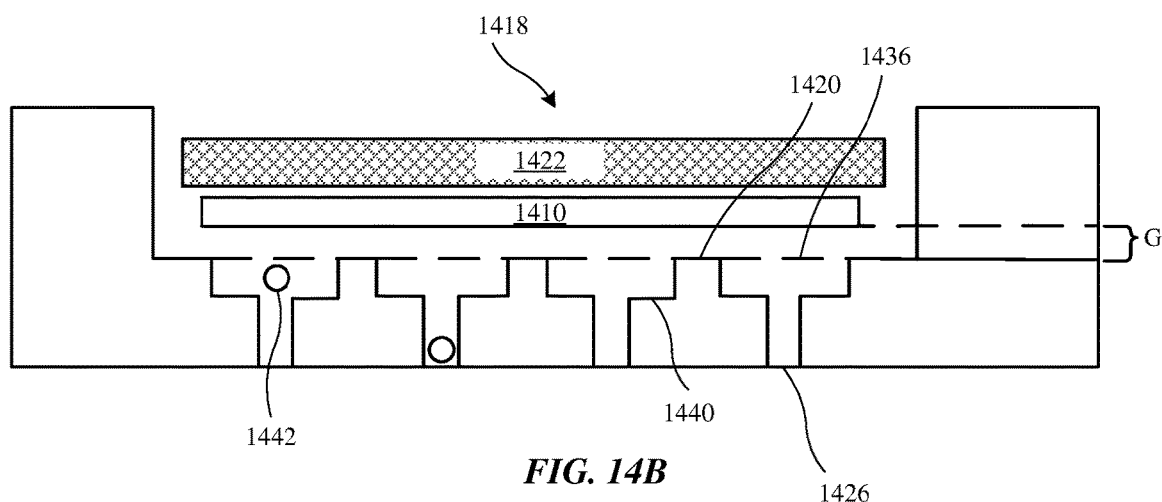

As discussed above with reference to FIGS. 3A-3B, a hinged electronic device can rotate from an open to a closed position. FIGS. 14A-14B show a cross sectional view of a hinged electronic device 1400 and an alternative cross sectional view of a portion of the mandrel of the hinged electronic device 1400, respectively, according to some embodiments.

FIG. 14A shows the hinged electronic device 1400 in a closed configuration. The hinged electronic device includes a first portion 1402 and a second portion 1404. A cable 1410 can take on a curved shape in accordance with the curved surface of a mandrel 1418 when the electronic device 1400 is rotated from an open configuration to a closed configuration. The cable 1410 can provide electrical connection between an electrical component 1411 of first portion 1402 and an electronic component 1412 of second portion 1404.

When electronic device 1400 is in an open configuration (as shown in FIG. 3B), foreign particles 1442 can become deposited between a bottom surface of the cover 1422 and a surface 1420 of a mandrel 1418 such that the particles 1442 become trapped or lodged. In some examples, the particles 1442 can become deposited between the cable 1410 and the upper surface of the mandrel 1418. In some examples, foreign particles 1442 can be introduced by way of a ventilation gap 1424 or crevices of the hinged electronic device 1400. Examples of particles 1442 can include sand, sugar, salts, debris, and other similar particles encountered during normal use of electronic device 1400. In some cases, particles 1442 have hard and sharp surfaces, and are generally not very deformable. In some cases, the particles 1442 can range in size between about 10 micrometers to about 1 millimeter in size. Having particles 1442 deposited between the cover 1422 and the cable 1410 and/or the mandrel 1418 can be undesirable in that the particles 1442 can damage cause damage to the hinged electronic device 1400 by piercing or gouging through the cover 1422 and the cable 1410. In some examples, when the hinged electronic device transitions from the closed configuration to the open configuration, the cable 1410 or cover 1422 can become tensioned as it wraps around the surface of the mandrel 1418. Accordingly, the hard and sharp surfaces of the particles 1442 which are lodged between the cover 1422 and the cable 1410 and/or mandrel 1418 surface will rub against these components causing premature failure and fraying of the cover 1422 and/or cable 1410. In addition, in some examples, frequent and repeated rotation between the first portion 1402 and the second portion 1404 of the hinged electronic device can further exacerbate the damage to the cover 1422 and the cable 1410 when the particles 1442 protrude against these components.

To address handling foreign particles 1442, FIG. 14B shows that the electronic device 1400 includes a mandrel 1418 that can include a channel or pathway or trough 1440 positioned along the outer surface 1420 of the mandrel 1418 (referring to FIG. 14B), according to some embodiments. The openings or inlets 1436 of the channels 1440 can be large enough to accommodate various sizes of different particles. In some examples, the average width of the inlets 1436 can be about 2 mm in width. In other examples, the average width of the inlets 1436 can be between 1 millimeter and 2 millimeters. In other examples, average width of the inlets 1436 can be between about 2 millimeters to about 3 millimeters.

In some embodiments, the surface 1420 of the mandrel 1418 can include an anti-static electricity coating or agent. The antistatic agent can reduce or eliminate buildup of static electricity on the mandrel 1418. By applying an antistatic agent on the surface 1420 of the mandrel 1418, can also facilitate a reduction in dust or dirt particles along the surface 1420.

A distance between an exterior surface of the hinged electronic device 1400 and the ventilation gap 1424 is represented by a distance "d" which spans a dimensional value of the mandrel 1418.

FIG. 14B shows an alternate cross sectional view of the mandrel 1418 adjacent to the cable 1410 and a flex cover 1422, according to some embodiments. As shown in FIG. 14B, the cable 1410 is drawn against a portion of the outer surface 1420 of the mandrel. Portions of the outer surface 1420 can be cut away to provide inlets 1436 for the channels 1440. In some embodiments, a lower surface of the cable 1410 does not obscure or block the inlets 1436 of the channels 1440. Accordingly, particles 1442 can more readily pass through the inlets 1436. In other embodiments, the particles 1442 can be forced into inlets 1436 by movement or a rubbing motion of the cable 1410 against the surface 1420. In some examples, when a particle 1442 is lodged between the cable 1410 and the outer surface 1420 of the mandrel 1418, a repeated rubbing motion between the cable 1410 and the mandrel 1418 can push or nudge the particle 1442 along the surface 1420 of the mandrel 1418 towards the inlets 1436. Accordingly, repeatedly transitioning the hinged electronic device between an open configuration and a closed configuration can facilitate in driving the particle 1442 towards an inlet 1436. In some embodiments, driving the particle 1442 towards the inlet 1436 can be intentional movement. In other embodiments, the driving mechanism can be random. Thereafter, the particles 1442 can pass through the pathways 1440 via gravity.

As shown in FIG. 14B, a gap "G" (or division) can separate the underlying surface of the cable 1410 and the outer surface 1420 of the mandrel 1418, according to some embodiments. The gap "G" can be sufficiently small such that particles 1442 are unable to be lodged between the cable 1410 and the outer surface 1420, but the gap "G" can also be large enough to prevent the cable 1410 from abrading or rubbing against the surface 1420 of the mandrel 1418. In some embodiments, the gap "G" between the cable 1410 and the outer surface 1420 of the mandrel 1418 can widen depending on the amount of slack or amount of tension in the cable 1410 while the hinged electronic device 1400 transitions between the open configuration and the closed configuration. In some embodiments, as the hinged electronic device 1400 is oriented progressively towards the open configuration, the gap "G" between the cable 1410 and the outer surface 1420 of the mandrel 1418 can progressively decrease due to the increased amount of tension in the cable 1410.

As shown in FIG. 14B, the channels 1440 are uniformly spaced apart along the surface 1420, according to some embodiments. In other embodiments, the channels 1440 can be spaced irregularly or in a non-uniform fashion along the surface 1420. Once particles are captured by the channels 1440, the particles 1442 can pass from the inlets 1436 and along the length of the channels 1440 until reaching an outlet 1426, which is positioned on another portion of the surface 1420. In some embodiments, the outlets 1426 may be positioned adjacent to the ventilation gap 1424 such that particles 1442 can fall through the ventilation gap 1424. In other embodiments, the particles 1442 can be aided by a fan on board the device or an air compressor to funnel particles 1442 through the channels 1440 of the mandrel 1418. That is, channels 1440 can be connected to a forced air source such that particles 1442 are flushed out of channels 1440 via outlets 1426.

Figure 15A:
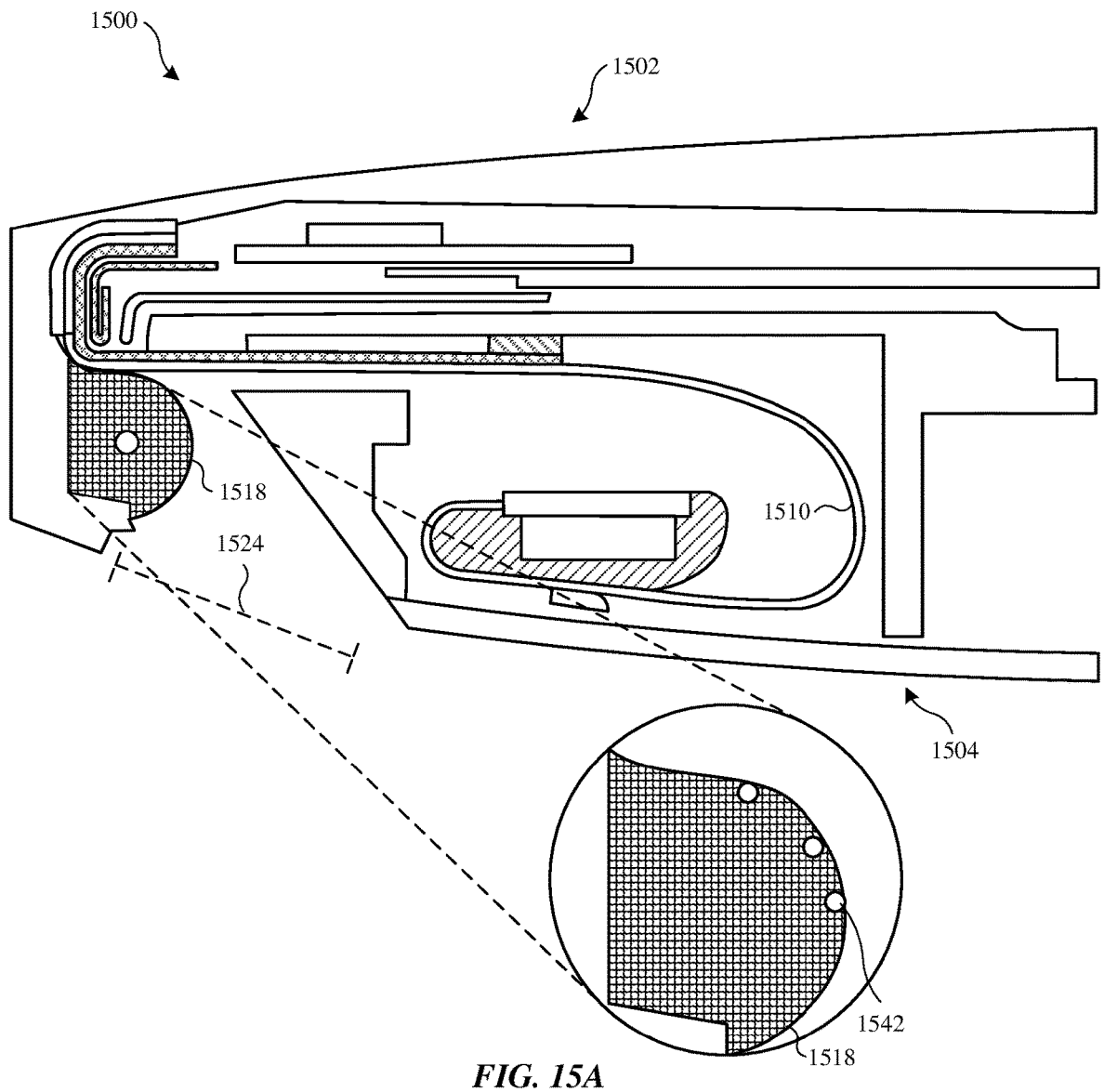
FIGS. 15A-15B shows a cross sectional view and a magnified cross sectional view of a hinged electronic device, in accordance with some embodiments.
Figure 15B:
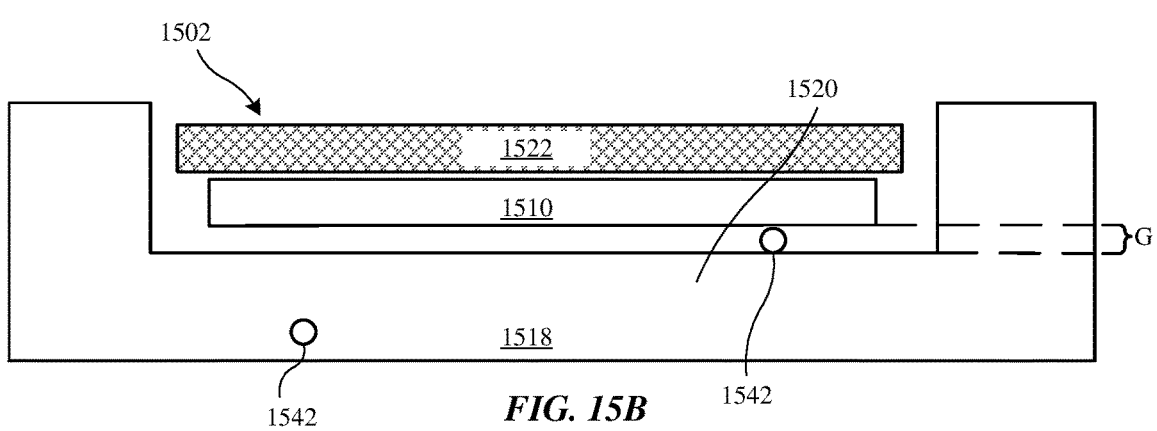

FIGS. 15A-15B illustrate another embodiment of a component for handling foreign particles deposited in a hinged electronic device 1500. FIGS. 15A-15B show a perspective view and a cross sectional view of a hinged electronic device 1500, respectively, in accordance with some embodiments. FIG. 15A illustrates the hinged electronic device 1500 in a closed configuration. The hinged electronic device 1500 can include a first portion 1502 and a second portion 1504. The hinged electronic device 1500 can include a cable 1510 that can provide electrical communication between the first portion 1502 and the second portion 1504. As shown in FIG. 15A, when the electronic device is in the closed configuration, the cable 1510 can be drawn over a curved surface of a mandrel 1518 to keep the cable 1510 from bucking or folding. Thus, a portion of the cable 1510 can take on a curved shape in accordance with the curved surface of the mandrel 1518. The mandrel 1518 can be positioned adjacent to a ventilation gap 1524.

The mandrel 1518 can be manufactured from a soft material having a high degree of compression and having a rebounding force, according to some embodiments. When the mandrel 1518 is exposed to stress or strain energy, the material of the mandrel 1518 is capable of substantially returning to its original shape or geometry when the source of the stress is removed. The composition of the mandrel 1518 can prevent the particle from contacting the cable 1510 and cause damage or premature failure to the cable 1510. The soft mandrel 1518 can distribute the compression forces or pressure of the particle 1542 applied against the mandrel 1518 evenly. In some embodiments, the material of the mandrel 1518 can exhibit a high degree of compression force when a particle 1542 is pressed against the surface 1520 of the mandrel 1518. In some examples, a particle 1542 can become lodged or trapped between an outer surface 1520 of the mandrel 1518 and an underlying surface of the cable 1510. As the particle 1542 is pressed or nudged against the surface 1520 of the mandrel 1518, the surface of the particle 1542 becomes substantially more flush with the surface 1520 of the mandrel 1518 such that a substantially minimal portion or no portion of the particle 1542 protrudes relative to the surface 1520 of the mandrel 1518. Accordingly, as the cable 1510 is drawn over the curved outer surface 1520 of the mandrel 1518, the lodged particle is compressed against the outer surface 1520 of the mandrel 1518 such that the lodged particle 1542 no longer protrudes or pierces against the underlying surface of the cable 1510.

In some examples, the soft material of the mandrel 1518 can have a Shore A scale of 20 for rubber hardness. The Shore A scale is one measure of a material's hardness or resistance to permanent indentation. A durometer can be used to measure Shore hardness. In one example, a durometer can measure the depth of an indentation in a material created by a given amount of force or pressure applied against the material. Generally, the Shore A scale can range between 0 to 100, where a Shore A value of 0 indicates that the material can be described generally as extra soft. In contrast, a Shore A value of 100 indicates that the material can be described generally as extra hard. By way of example, the material of the mandrel 1518 can be comprised of one or more elastomer-like compounds, including silicone rubber, polyurethane, ethylene propylene rubber, ethylene propylene diene rubber, and the like. According to some embodiments, the mandrel can be compression molded.

When the source of the pressure (e.g., particle 1542) applied against the mandrel 1518 is removed, the mandrel 1518 can be capable of "bouncing back" or "pushing back" against the pressure applied by the so that over time, the mandrel will return to substantially its original molded shape and/or form. In other embodiments, the mandrel 1518 can be made of a material which can progressively push the particle 1542 out and towards the ventilation gap 1524.

FIG. 15B shows a cross sectional view of the mandrel 1518 according to some embodiments. FIG. 15B illustrates a particle 1542 deposited along the outer surface 1520 of the mandrel 1518. As the particle is pushed against the outer surface 1520 of the mandrel 1518, the mandrel 1518 is compressed. As shown in FIG. 15B, the particles 1542 can be deposited along substantially across any portion of the outer surface 1520 of the mandrel 1518. The material of the mandrel 1518 can distribute the force/pressure applied by the particle 1542 in an equal amount across the surface of the mandrel 1518. As shown in FIG. 15B, a gap "G" can separate the underlying surface of the cable 1510 and the outer surface 1520 of the mandrel 1518, according to some embodiments. The gap "G" can be sufficiently small such that particles 1542 are unable to be lodged between the cable 1510 and the outer surface 1520, in some embodiments. In other embodiments, the gap "G" between the cable 1510 and the outer surface 1520 can accommodate a particle 1542. As the hinged electronic device 1500 transitions from a closed configuration to an open configuration, the cable 1510 can progressively wrap around the curved surface of the mandrel 1518. As the hinged electronic device 1500 is oriented progressively towards the open configuration, the gap "G" between the cable 1510 and the outer surface 1520 of the mandrel 1518 can progressively decrease due to the increased amount of tension in the cable 1510. As the gap "G" decreases, any foreign particles 1542 lodged in the gap "G" can be driven or nudged by the cable 1510 against the surface 1520 of the mandrel 1518. The particle 1542 can become compressed within the outer surface 1520 and surrounded by the material of the soft mandrel 1518. Accordingly, any repeated rubbing between the underlying surface of the cable 1510 and the mandrel 1518 will not cause the particle to pierce or gouge against the cable 1510. After a period of time, the soft material of the mandrel can "bounce back" or push the particle 1542 out such that the outer surface 1520 of the mandrel 1518 can resume its original molded shape, according to some embodiments.

Figure 16A:
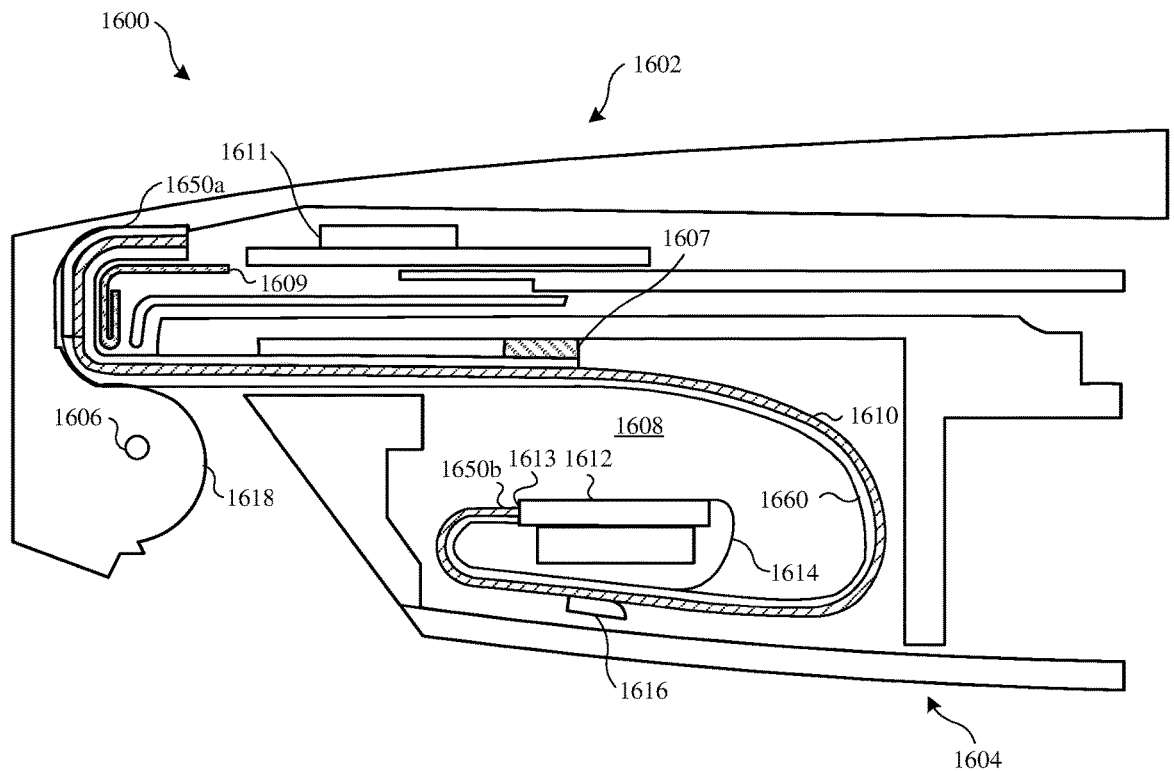
FIGS. 16A-16B shows a cross sectional view and a magnified cross sectional view of a hinged electronic device, in accordance with some embodiments.
Figure 16B:
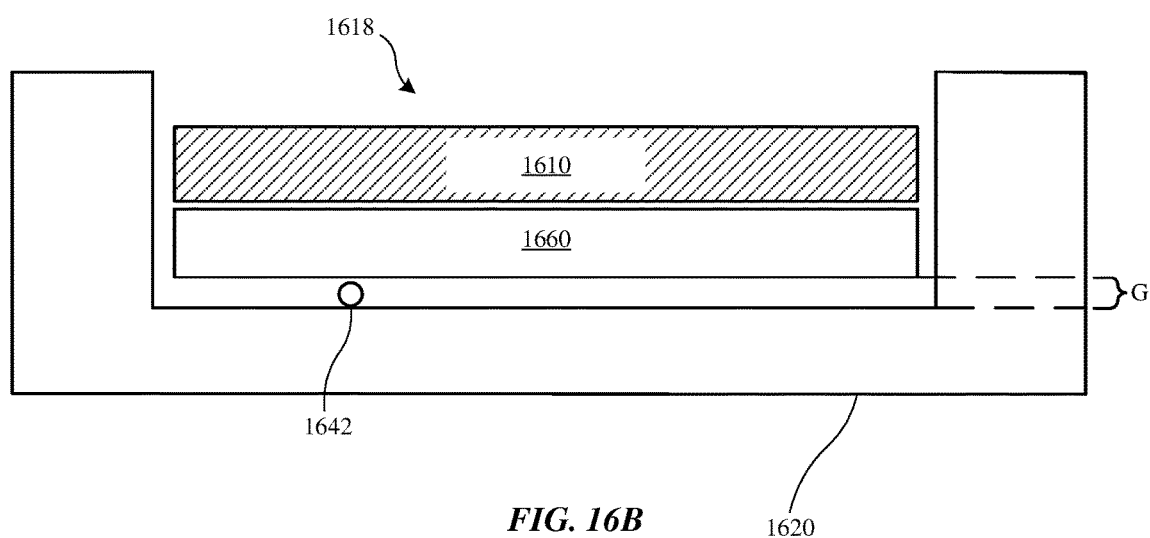

FIGS. 16A-16B illustrate another embodiment of a component for handling particles deposited in a hinged electronic device 1600. FIGS. 16A-16B show a perspective view and a cross sectional view of a hinged electronic device 1600, respectively, in accordance with some embodiments. FIG. 16A shows the hinged electronic device 1600 in a closed configuration. The electronic device 1600 includes a cable 1610, which provides electrical communication between the first portion 1602 and the second portion 1604. For example, the cable 1610 can provide electrical connection between electronic component 1611 of first portion 1602 and electronic component 1612 of the second portion 1604. The cable 1610 can be any suitable type of cable, including a cable, a flexible printed circuit board, or any suitable mechanism for transmitting an electrical signal between the portions 1602 and 1604. The cable 1610 can be bonded to a woven laminate layer 1660 so as to form a one-piece construction. In some embodiments, the upper surface of the woven laminate layer 1660 can be bonded to the underlying surface of the cable 1610 along select portions of the cable 1610 such that both the woven laminate layer 1660 and the cable 1610 move in parallel. In some examples, the parallel movement is demonstrated as the hinged electronic device 1600 is rotated about a hinge 1606 from a closed configuration to an open configuration such that the woven laminate layer 1660 can move in parallel with the cable 1610. In some embodiments, the woven laminate layer 1660 can extend the length of the cable such that the woven laminate layer 1660 is also tethered to a retention rib 1607 of the second portion 1604 and an anchor 1609 of the first portion 1602. In other embodiments, the woven laminate layer 1660 can be bonded to only a portion of the cable 1610 that can be likely to contact the mandrel 1618 (i.e., along the curved surface of the mandrel).

The dimensions of the woven laminate layer 1660 bonded to the cable 1610 can mirror the dimensions of the cable 1610, according to some embodiments. In some examples, the width and length of the woven laminate layer 1660 are sufficiently wide and long enough to provide a physical barrier for the entire underlying surface of the cable 1610. The woven laminate layer 1660 can be drawn over the mandrel 1618 and bend as a result when the hinged electronic device 1600 is provided in an open configuration. In some embodiments, bonding the woven laminate layer 1660 to the cable 1610 so as to form a one-piece configuration can impart increased rigidity and resistance to fraying to the cable 1610.

The woven laminate layer 1660 can have an inherent rigidity and resilience that generates resistance force when the woven laminate layer 1660 is bent over the mandrel 1618 when the electronic device 1600 is moved from a closed configuration to an open configuration. In some embodiments, as the woven laminate layer 1660 is bonded or coupled to the cable 1610, the woven laminate layer 1660 is also prevented from buckling or folding under tension during e.g., transitioning from the closed configuration to the open configuration.

The woven laminate layer 1660 can be constrained near the first end 1650*a* by a connection point 1613 to the electronic component 1612 and constrained near the second end 1650*b* by an anchor 1609. The connection point 1613 and the anchor 1609 act as retention features that keep the woven laminate layer 1660 from shifting out of place and keep the woven laminate layer in a fixed orientation relative to the cable 1610 when the electronic device 1600 rotates between closed configuration and open configuration. The second end 1650*b* can be coupled to an anchor 1609 using, for example, adhesive and/or fastener(s) such as one or more screws. In some embodiments, the anchor 1609 can be fabricated from a low friction material, such as a fluoropolymer material (e.g., polytetrafluoroethylene, Teflon®), that allows the woven laminate layer 1660 to slide freely along the anchor 1609 during the opening and closing of the electronic device 1600. The movement of the woven laminate layer 1660 with respect to the electronic component 1612 can also be important with respect to a design consideration. For example, during rotation of the first portion 1602 with respect to the second portion 1604, the movement of the woven laminate layer 1660 where the first end 1650*a* and the second end 1650*b* are coupled to the anchor 1609 and connection point 1613 can be minimized in order to prevent fatiguing of the woven laminate layer 1660.

The woven laminate layer 1660 should be abrasion resistant to be durable enough to withstand wear and tear that can be accompanied through direct exposure to the surface of the mandrel, external particles, or any other components of the electronic device that may come into contact with the woven laminate layer 1660. The woven laminate layer 1660 can be manufactured from a material which is substantially puncture-proof or substantially tear-proof. In some examples, the woven laminate layer 1660 can be composed of materials such as polytetrafluorethylene, Teflon®, glass, fiberglass, amide fibers, para-aramid synthetic fibers (Kevlar®), carbon fiber, ripstop woven nylon, polyurethane infused fiberglass, polyurethane infused aramid fibers, ripstop woven polyester, ripstop polypropylene, ripstop cotton, ripstop silk, and the like. In some embodiments, the woven laminate layer 1660 can be made from a non-electrically conductive material (or coated with a non-electrically conductive coating) such as to prevent the woven laminate layer 1660 from electrically interfering with internal components of the electronic device 1600.

In some examples, the woven laminate layer 1660 can be about 12 micrometers thick. In other examples, the woven laminate layer can be between about 2 micrometers to about 20 micrometers thick. In other examples, the woven laminate layer can be between about 5 micrometers to about 15 micrometers thick. To a certain extent, the thickness of the woven laminate layer is limited. For example, if the woven laminate layer 1660 is too thick relative to the cable 1610, it can stress copper wires of the cable 1610. Furthermore, making the woven laminate layer 1660 too thick relative to the thickness of the cable 1610 can affect the neutral axis of the cable 1610.

In some embodiments, a non-isolated section of the woven laminate layer 1660 between the retention rib 1607 and the connection point 1613 may be free to move when the first portion 1602 is rotated with respect to the second portion 1604. In some embodiments, since the woven laminate layer 1660 is routed around a support member 1614, the woven laminate layer 1660 can maintain a concave curvature, which prevents the woven laminate layer 1660 from bending between concave and convex curvatures, and prevents the woven laminate layer 1660 from bending below a prescribed radius, so as to reduce fatiguing of the woven laminate layer 1660. This wrapped configuration can allow for a relatively large length of the woven laminate layer 1660 for uptake during rotation of the electronic device 1600 while reducing the stress placed on the woven laminate layer 1660. That is, the woven laminate layer 1660 can be free to "float" within the cavity 1608. In addition, a clip 1616 can be provided to add support to the woven laminate layer 1660 and flex cable 1610.

FIG. 16B shows a cross sectional view of the woven laminate layer 1660 coupled (e.g., adhesively bonded) to the underlying surface of the cable 1610, according to some embodiments. As shown in FIG. 16B, the thickness of the woven laminate layer 1660 can be adjusted such that the woven laminate layer 1660 does not scrape or touch against the outer surface 1620 of the mandrel 1618, according to some embodiments. FIG. 16B shows a gap "G" between the underlying surface of the woven laminate layer 1660 and the outer surface 1620 of the mandrel 1618. In some embodiments, the gap "G" between the underlying surface of the woven laminate layer 1660 and the outer surface 1620 of the mandrel 1618 can be adjusted such that particles cannot be wedged or trapped against the outer surface 1620 of the mandrel 1618. However, in such embodiments, a minimal gap "G" can cause the woven laminate layer 1660 to abrade against the surface of the mandrel 1618. In other embodiments, the gap "G" can be sufficiently large enough to allow for particles 1642 to fit between the woven laminate layer 1660 and outer surface 1620 of the mandrel 1618. Although the particles 1642 can have sharp and hard surfaces or edges, the woven laminate layer 1660 can act as an obstacle to prevent the particle from gouging through the cable 1610.

Figure 17:
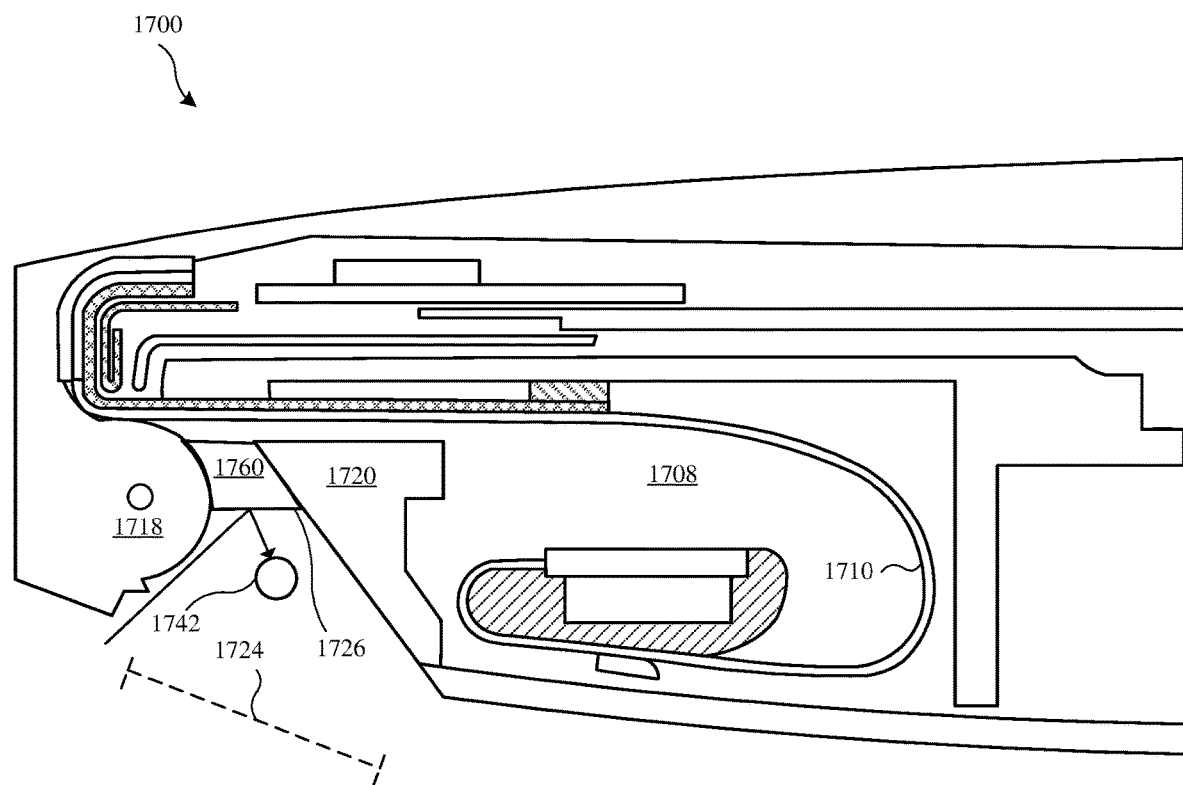
FIG. 17 shows a cross sectional view of a hinged electronic device, in accordance with some embodiments.

FIG. 17 illustrates another embodiment of a component for handling particles deposited in a hinged electronic device 1700. FIG. 17 shows a hinged electronic device 1700 having a barrier 1760, in accordance with some embodiments. FIG. 17 shows a hinged electronic device 1700 in a closed configuration, where the barrier 1760 is positioned in place of the ventilation gap (see ref. 324, FIG. 3) As shown in FIG. 17, the barrier 1760 can be in contact with the mandrel 1718 and the blocking member 1720. In some embodiments, a surface of the barrier 1760 may be positioned to be aligned flush against the surface of the mandrel 1718 and the blocking member 1720 such that there are no gaps between the barrier 1760 and either of the mandrel 1718 or blocking member 1720.

Although FIG. 17 shows the barrier 1760 is positioned in place of the ventilation gap 1724, in some embodiments. In other embodiments, the barrier 1760 can also be positioned in other regions of the hinged electronic device 1700 where gaps exist between different components, according to some embodiments. In other embodiments, the barrier 1760 can supplement the ventilation gap 1724. In other embodiments, a plurality of barriers 1760 can be positioned throughout the hinged electronic device 1700.

The barrier 1760 can act as a physical barrier to prevent or reduced foreign particles 1742 from coming into contact with the cable 1710, according to some embodiments. In other embodiments, the barrier 1760 can act as a physical barrier to prevent or reduce foreign particles from entering the cavity 1708. In some embodiments, the barrier 1760 can fill the space between the mandrel 1718 and the blocking member 1720 to prevent or reduce any particles, debris, liquids from entering the internal housing of the hinged electronic device 1700.

In some embodiments, the barrier 1760 can work in conjunction with an on-board fan or air compressor device to facilitate in funneling the particle 1742 through the opening 1726 of the barrier 1760.

In some embodiments, one or more pathways can be molded within the barrier 1760. In some embodiments, the pathway can be a "one-way" pathway such as to permit foreign particles 1742 to migrate from inside of the hinged electronic device 1700 to the outside, while also preventing foreign particles from entering the hinged electronic device 1700 via the barrier 1760. In some embodiments, the barrier 1760 can be in the form of a gasket that can provide a seal between blocking member 1720 and mandrel 1718 and be designed to prevent both foreign particles 1742 from migrating in and/or out of the cavity 1708 via the opening 1726. The barrier 1760 can be made of any suitable material. For example, barrier 1760 can be made of an elastomer material, such as a polymer material. In some embodiments, the gasket is combined with an elastomer material and foam, bristles, brush and/or felt. For example, barrier 1760 can be in the form of an elastomer gasket with a distal end having foam, bristles, brush or felt. In some embodiments, barrier 1760 is made of material having a low surface tension to repel and prevent liquids from entering the cavity 1708. The low friction material can also allow barrier 1760 to move freely against the mandrel 1718. In some embodiments, the barrier 1760 can include an anti-static electricity coating or agent. The antistatic agent can reduce or eliminate buildup of static electricity on the mandrel 1718 and/or cable 1710. By applying an antistatic agent on at least one of the inner pathway, inner surface, or opening 1726 of the barrier 1760, there can be a reduction in dust or dirt particles along those various surfaces.

In some embodiments, barrier 1760 is fixed in position between the mandrel 1718 and the blocking member 1720. This can prevent barrier 1760 from moving when the hinged electronic device 1700 is transitioned between the closed configuration and the open configuration.

Although FIGS. 14-17 illustrate hinged electronic devices according to various embodiments, two or more of these different embodiments illustrated can be combined into a single hinged electronic device housing design. For example, the physical barrier of the embodiment shown in FIG. 17 can be combined with the flex woven laminate layer of the embodiment shown in FIG. 16 to provide an increased measure of preventing damage to the components. In another example, the flex woven laminate layer of the embodiment shown in FIG. 16 can be combined with the soft mandrel of the embodiment shown in FIG. 15. In another example, the flex woven laminate layer of the embodiment shown in FIG. 16 can be combined with the mandrel including channels of the embodiment shown in FIG. 14. Combining the different embodiments shown in FIGS. 14-17 can provide an advantage of increasing the level of protection of the flex cable from being damaged by foreign particles relative to using only a single embodiment disclosed. In addition, any suitable combination of the various embodiments provided in FIGS. 14-17 can be combined with any of the other embodiments disclosed in other portions of this description, as suitable.

Over-Molded Anchor

Figure 18A:
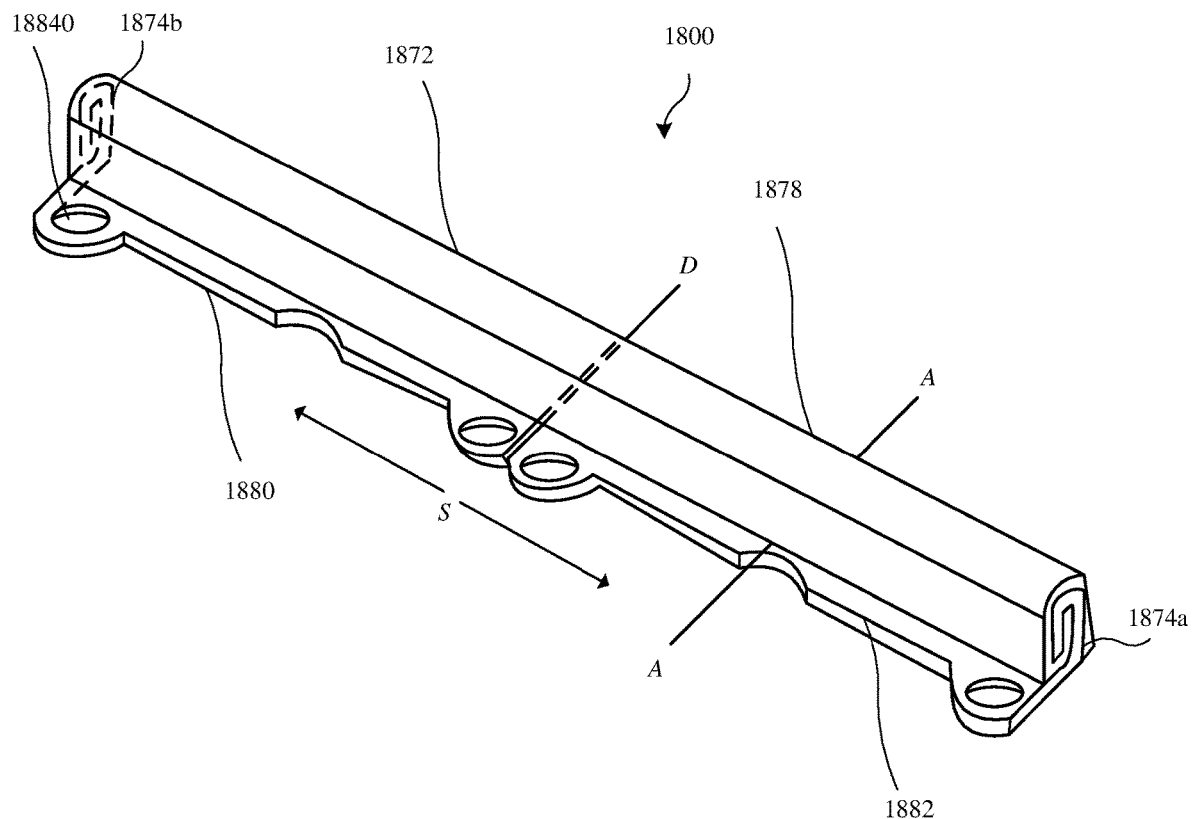
FIGS. 18A-18B show a perspective view and a cross sectional view of an exemplary anchor for securing a cover, in accordance with some embodiments.
Figure 18B:
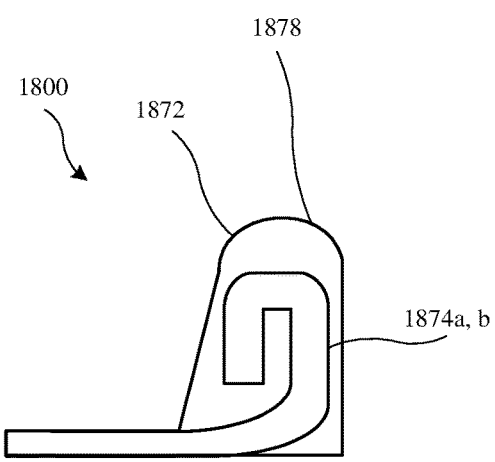

As discussed above with reference to FIG. 13, a hinged electronic device can include an anchor for retaining a flex cover. FIGS. 18A-18B show a perspective view and a cross sectional view of an exemplary anchor 1800 for securing cover (see ref. 1304, FIG. 13) opposite a tensioning mechanism, according to some embodiments. The anchor 1800 can secure the cover to a lid portion of an electronic device by anchoring the cover to a tensioning mechanism located on an opposing side of the cover. FIG. 18 shows that the anchor 1800 can include two anchor portions (1880, 1882) which are each of approximately equal length, according to some embodiments. In other embodiments, the two anchor portions (1880, 1882) may be of non-equal length. As shown in FIG. 18A, an over-molded assembly 1872 can be formed over the two anchor portions (1880, 1882). Loops 1884 can be positioned along the length of the anchor portions 1880, 1882 to couple to latches of a lid portion (see ref. 302, FIG. 3). As shown in FIG. 18B, the over-molded assembly 1872 can be formed over a hook 1874a, 1874b of the anchor portion 1880, 1882. By way of example, the over-molded assembly 1872 can be made from a generally flexible, resilient material. Examples of materials for the over-molded assembly include elastomers, rubber, silicone, and the like. In some embodiments, an adhesive or bonding agent can be used provide a more rigid hold between the hook 1874a, 1874b and the over-molded assembly 1872. In some embodiments, the bonding agent can be coated over only a portion of the hook 1874a, 1874b. In other embodiments, the bonding agent can be completely coated over the entire portion of the hook 1874a or 1874b. Accordingly, by bonding the hook 1874a and 1874b of the anchor portions 1880, 1882 to the over-mold, the anchor portions 1880, 1882 can move in conjunction with the over-molded assembly 1872.

As shown in FIG. 18A, first anchor portion 1880 includes an end adjacent, but not directly touching an end of the second anchor portion 1882. A gap or split "G" is indicated as separating or dividing the two anchor portions 1880, 1882 and their respective separated hooks 1874a, 1874b. The over-molded assembly 1872 is illustrated as extending along the entire length of both anchor portions 1880, 1882, while each of the anchor portions 1880, 1882 includes a distinct hook 1874a, 1874b. In some embodiments, the over-molded assembly 1872 can extend along the entire length of both anchor portions 1880, 1882. In other embodiments, the over-molded assembly 1872 can extend along only a portion of both anchor portions 1880, 1882. If polyurethane material is applied only over a small portion of the anchor portions (i.e., where the anchor portion ends meet), then the elastomer material of the over-molded assembly 1872 may not be sufficient to prevent unwanted "necking" or stretching of the plastic at the gap "G." The over-molded assembly 1872 can be aligned with a rail (not illustrated) extending along the length of the anchor portions 1880, 1882. The over-molded assembly 1872 can hide the gap or split "G" between the two anchor portions 1880, 1882, such that cosmetically, the over-molded assembly 1872 resembles a single integrated anchor portion. In other words, the over-mold can join two anchor portions 1880, 1882 to provide a degree of flexibility and stretch not previously capable.

In some examples, the flex "A" of the anchor 1800 in a horizontal axis can be about 1 millimeter in either direction. In other examples, the flex "A" can be between about 0.001 millimeters to about 2 millimeters. In some examples, the over-mold can be comprised of rubber, elastomer, polyurethane, and the like. In some examples, the over-molded assembly can flex in a vertical axis "S" such that the anchor 1800 stretches lengthwise at the gap "G." In some examples, the over-molded assembly can stretch (at the split) to extend the length of the anchor 1800 between 0.001 mm-2.0 mm in length.

As shown in FIG. 18B, the anchor 1800 can include a beveled or rounded top surface 1878. In some embodiments, the beveled top surface 1878 can facilitate in wrapping a cover (see ref. 1304, FIG. 13) around the beveled top surface 1878. Accordingly, the beveled top surface 1878 of the anchor 1800 can facilitate in providing an anchoring or tensioning mechanism for the cover. The hooks 1874a, 1874b can be surrounded by the over-molded material. In other embodiments, the beveled top surface 1878 can further include one or more hooks having castellations (see ref. 1306 of FIG. 13) on the beveled top surface. The hooks (see ref. 1306 of FIG. 13) can facilitate in providing an even more rigid "hold" of the cover to provide an anchoring or tensioning mechanism. In some embodiments, the castellations can hook to corresponding slits or incisions in the flex cover to facilitate the "hold" or "grab" of the cover.

The anchor 1800 can be applied in tolerance stackup analysis to provide allow for more variation or deviation with regard to the tolerance limits of the components. For example, the anchor 1800 can over-compensate for deviation in the manufacturing of components of the lid portion (see ref. 302, FIG. 3). Using the anchor 1800 can allow for the assembly to seal a gap seam between two components, even when there is a deviation in manufacturing (which exceeds the tolerance limits of manufacturing. By having two anchor portions 1880, 1882 which can float at a gap "G," the anchor portions can ensure that a cover (see e.g., ref. 1304, FIG. 13) is still able to anchor on or hook to the anchor portion to provide a sufficient tensioning mechanism. In other words, the over-molded assembly can provide a short tolerance loop. By having two anchor portions that can flex at a split or gap, the manufacturing process can bridge the gap in the tolerance loop by enabling the elastomer of the anchor 1800 to provide more coverage (via flex or stretch) than normally would be possible.

Although FIG. 18 illustrates that the exemplary anchor 1800 can include two anchor portions (1880, 1882) for use in securing a cover opposite a tensioning mechanism, the embodiments shown can also be applied towards other components of the electronic device to provide allow for more variation or deviation with regard to the tolerance limits of the components. For example, the exemplary anchor 1800 can be used to secure the mandrel cover 702 to a first portion and/or second portion of the electronic device. In another example, the exemplary anchor 1800 can be used for securing the cover to an end of the electronic device having the tensioning mechanism.

Figure 19:
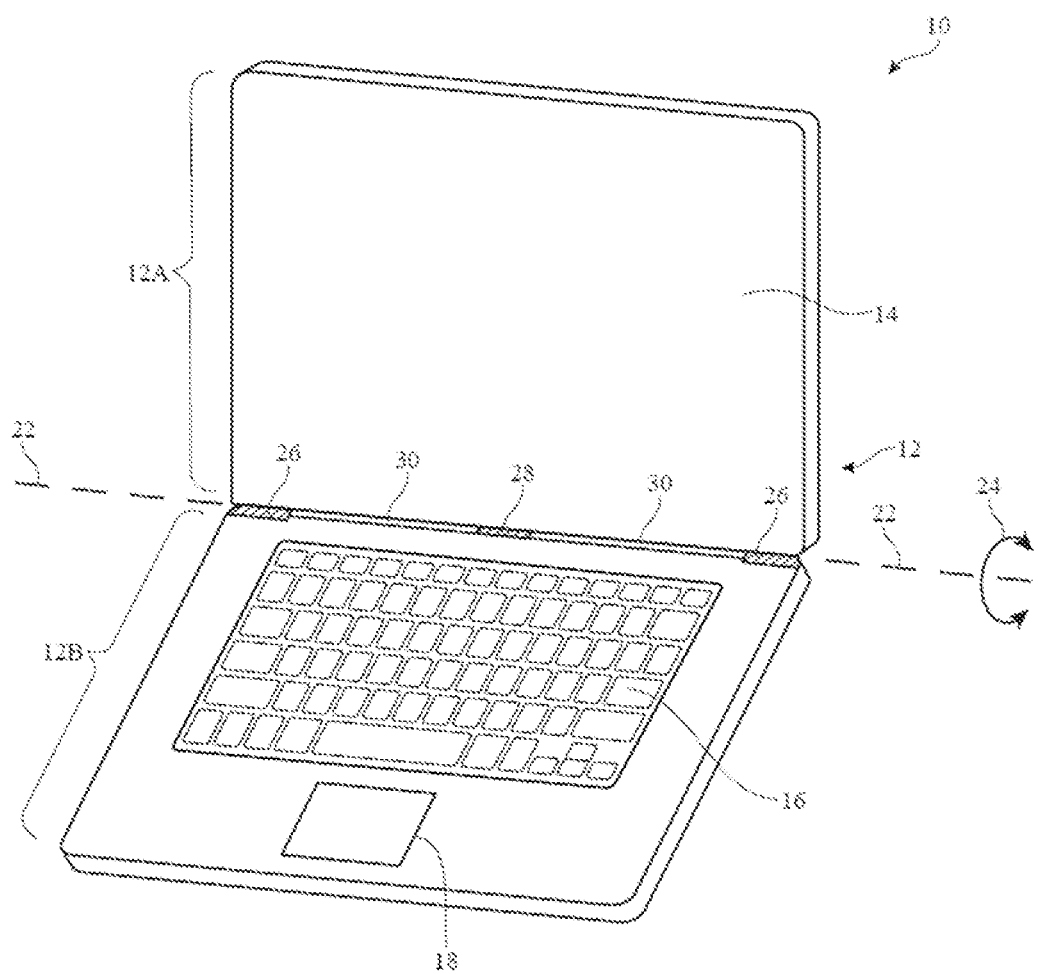
FIG. 19 is a perspective view of an illustrative electronic device such as a laptop computer having a lid in an open position, in accordance with some embodiments.

An electronic device such as electronic device 10 of FIG. 19 may have structures such as housing structures that move with respect to each other about a hinge axis. A gap in the housing structures may be fully or partly covered with a hinge gap cover. The hinge gap cover may be deployed using springs formed from spring-loaded shafts (e.g., shafts that rotate within pivots and that are biased by springs that are coupled to the shafts), springs that bias the hinge gap covers directly (e.g., springs that press against the hinge gap covers in configurations in which the covers are mounted to shafts that pivot within pivot structures so that the hinge gap covers open and close), or other biasing structures that allow the hinge gap cover to open and close as the housing structures are moved about the hinge axis.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, or may be other electronic equipment. Configurations in which device 10 has housing structures such as a housing lid and base that rotate with respect to each other about a hinge axis are sometimes described herein as an example. This is, however, merely illustrative. Device 10 may be any suitable electronic equipment.

As shown in the example of FIG. 19, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

As shown in FIG. 19, device 10 may have input-output devices such as track pad 18 and keyboard 16. Device 10 may also have components such as a camera, microphones, speakers, buttons, removable storage drives, status indicator lights, buzzers, sensors, and other input-output devices. These devices may be used to gather input for device 10 and may be used to supply a user of device 10 with output. Ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (i.e., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have housing portions that move with respect to each other. As shown in FIG. 19, for example, electronic device 10 may be a device such as a portable computer or other device that has a two-part housing including an upper housing portion such as upper housing 12A that moves with respect to a lower housing portion such as lower housing portion 12B. Upper housing 12A may include display 14 and may sometimes be referred to as a display housing or lid. Lower housing 12B may sometimes be referred to as a base housing or main housing.

Housings 12A and 12B may be connected to each other using hinge structures located along the junction between the upper edge of lower housing 12B and the opposing lower edge of upper housing 12A. For example, housings 12A and 12B may be coupled by hinges 26. Hinges 26 may be located at opposing left and right edges of housing 12 along hinge axis 22 or may be located at other locations along hinge axis 22 between housing portions 12A and 12B. A slot-shaped opening such as gap 30 may be formed between upper housing 12A and lower housing 12B and may be bordered on either end by hinges 26.

Gap 30 runs along hinge axis 22 and may therefore sometimes be referred to as a hinge gap. Hinges 26 may allow upper housing 12A to rotate about axis 22 in directions 24 relative to lower housing 12B. The plane of lid (upper housing) 12A and the plane of lower housing 12B may be separated by an angle that varies between 0° when the lid is closed to 90°, 140°, or more when the lid is fully opened.

Signal paths may extend between upper housing 12A and lower housing 12B. These signal paths may be formed by metal traces on a flexible printed circuit (e.g., a flexible printed circuit formed from a flexible layer of polyimide or a sheet of other flexible polymer substrate material), coaxial cables, wires, or other signal path structures. For example, signal paths formed from one or more flexible printed circuits 28 may bisect the slot formed from gap 30 as shown in FIG. 19 or may cross gap 30 at one or more other locations along the length of gap 30 (as examples).

Speakers may be located within housing 12. Housing 12 may have perforations such as circular holes or may use portions of gap 30 or other speaker openings to allow sound to exit the interior of device 10. Openings in housing 12 and/or gap 30 may also be used to vent heated air from the interior of device 10 and may serve as antenna apertures through which antenna signals pass during wireless communications.

Gap 30 may have portions that are exposed to the front of device 10 (i.e., the portion of gap 30 that is visible in FIG. 19) and portions that are exposed to the rear of device 10. The rear portion of hinge gap 30 and, if desired, front portions of gap 30 may be partly or fully covered with hinge gap cover structures. A hinge gap cover may be formed from a thin sheet of material that can help cover gap 30. When gap 30 is covered, potentially unsightly internal components may be hidden from view. The hinge gap cover may also help prevent intrusion of contaminants such as dust and moisture into the interior of device 10. The hinge gap cover may be a movable structure that covers gap 30 when device 10 is closed and that does not cover gap 30 when device 10 is opened (as an example).

Figure 20:
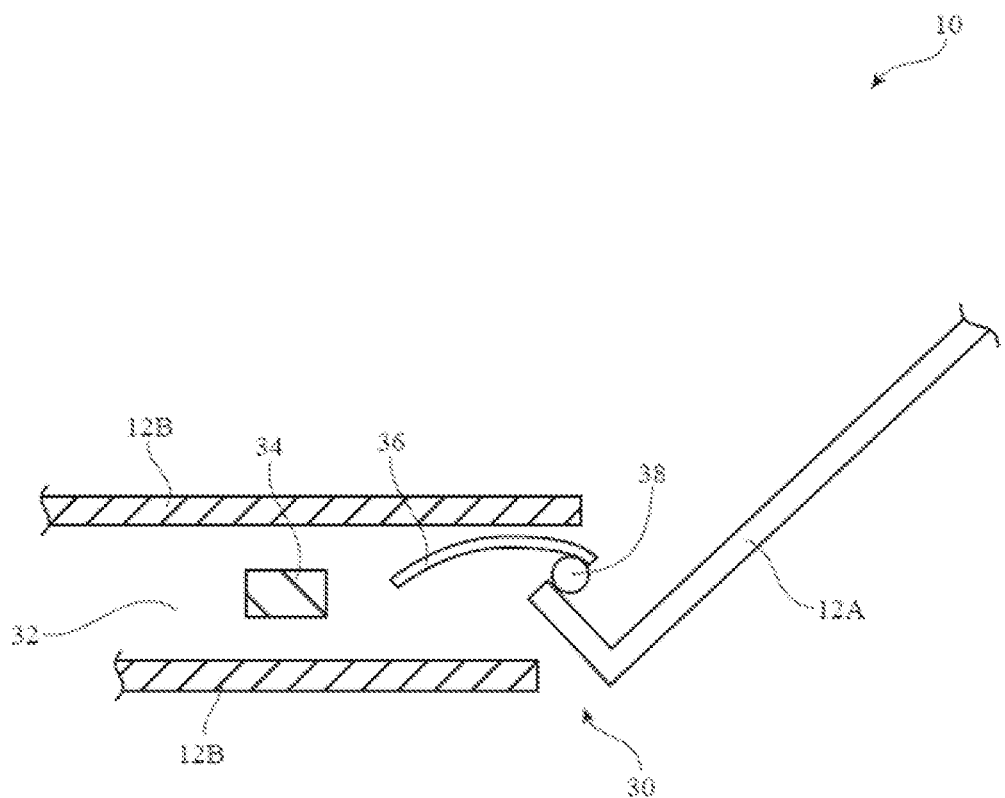
FIG. 20 is a cross-sectional side view of an illustrative electronic device in an open position, in accordance with some embodiments.

A cross-sectional side view of a portion of device 10 taken across gap 30 when device 10 is in an open position (i.e., when housing portion 12A is open) is shown in FIG. 20. As shown in FIG. 20, device 10 may have an interior region such as interior region 32. Components 34 may be mounted in interior region 32. Components 34 may include sensors, integrated circuits, wireless transceivers and other wireless circuitry, antenna structures (e.g., impedance matching circuits, dielectric support structures for antenna resonating elements, feed structures, tuning circuits, amplifiers, etc.), batteries, input-output devices, port connectors, printed circuits, and other electrical components. As an example, component 34 of FIG. 20 may be an antenna or part of an antenna that emits and receives antenna signals through gap 30 (e.g., a portion of gap 30 along the front of device 10 and/or a portion of gap 30 along the rear of device 10).

Hinge gap cover 36 may be used to cover gap 30. Hinge gap cover 36 may, for example, cover gap 30 when upper housing 12A is closed and may be pulled away from gap 30 as shown in FIG. 20 when housing 12B is in an opened position. When device 10 is open, gap 30 may be smaller due to the reduced size of the space between housing 12A and 12B and may not be visible to a user who is located in front of device 10 to view display 14. When closed, gap 30 may become larger due to an increased spacing between housing 12A and 12B and may be more visible to a user (e.g., when device 10 is placed upside down on a table). By using hinge gap cover 36, a user's view into the interior of device 10 may be fully or at least partly blocked when device 10 is in its closed position.

In the illustrative configuration of FIG. 20, hinge gap cover 36 has been mounted to upper housing 12A using spring 38. Spring 38 may be, for example, a torsion spring, or other flexible coupling member that causes an edge of cover 36 to press against housing 12B when upper housing 12A is in a closed position. Hinge gap cover 36 may be rotatably mounted to housing 12A (e.g., by mounting hinge gap cover 36 to a shaft that rotates within pivot structures attached to housing 12A or by mounting hinge gap cover 36 to a pivot structures that receive a shaft that is mounted to housing 12A). In these types of arrangements, spring 38 may be a spring structure that includes a flexible sheet metal spring or other spring to bias hinge gap cover 36 directly (e.g., spring 38 may press hinge gap cover 36 into its closed position when housing 12A is closed). If desired, spring 38 may be a spring structure with a shaft that is biased with a spring (i.e., spring 38 may be a spring-loaded shaft or other rotatable structure that is mounted to housing 12A using pivot structures and which is rotated by a torsion spring or other spring that loads the shaft). In a spring-loaded shaft configuration, cover 36 may be attached to the spring-loaded shaft with welds, adhesive, or other fastening structures and may be rotatably coupled to housing 12A by mounting the shaft in pivot structures attached to housing 12A. Rotation of the shaft by the spring may rotate cover 36 against housing 12B (e.g., the shaft of spring 38 may be loaded by a torsion spring element or other spring structure so that cover 36 is biased against housing 12B and thereby effectively seals gap 30 to prevent intrusion of contaminants and block interior portions of device 10 from view). If desired, other types of mounting arrangement may be used. For example, cover 36 may be mounted on lower housing 12B, may have portions that are mounted respectively on upper housing 12A and lower housing 12B, may be mounted to housing 12 using welds, fasteners, adhesive, or other attachment mechanisms in addition to spring 38 or instead of spring 38, etc. The arrangement of FIG. 20 in which hinge gap cover 36 is mounted to upper housing 12A using spring 38 is merely illustrative.

Figure 21:
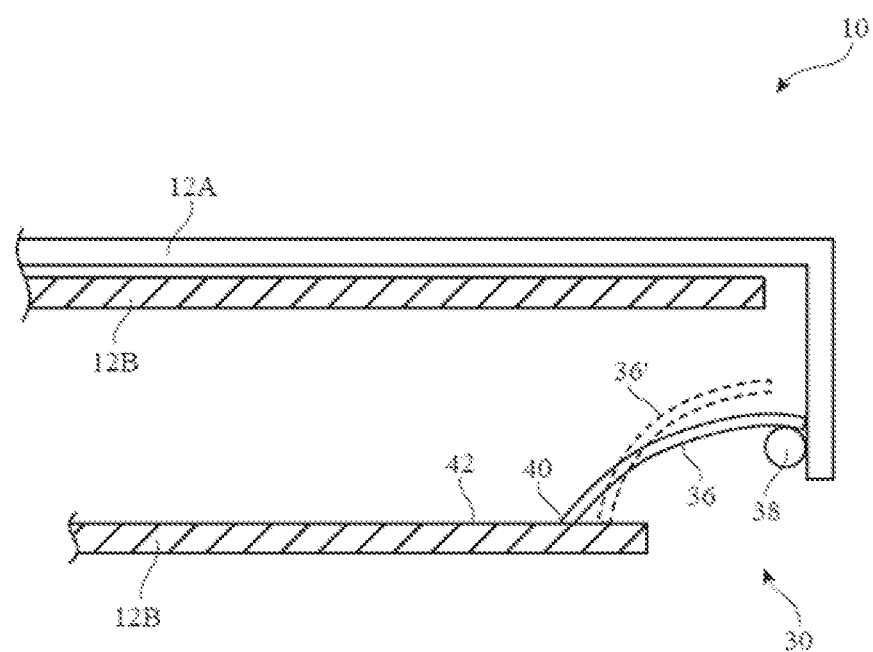
FIG. 21 is a cross-sectional side view of the illustrative electronic device of FIG. 20 in a closed position, in accordance with some embodiments.

FIG. 21 is a cross-sectional side view of device 10 in a configuration in which upper housing 12A has been rotated into a closed position. Just before closing, the hinge gap cover may be in position 36' and may begin to contact lower housing 12B. As housing 12A is rotated into its final closed position, spring 38 allows the hinge gap cover 36 to rotate about the axis of spring 38, so that outer edge 40 of hinge gap cover 36 will contact inner surface 42 of the lower wall of housing portion 12B. The flexibility of spring 38 may prevent hinge gap cover 36 from being overly stressed from this contact (i.e., spring 38 allows cover 36 to "give" as needed to prevent detachment of cover 36 from housing 12A). If desired, hinge gap cover 36 may also be flexible and may deflect slightly when contacting lower housing 12B.

Hinge gap cover 36 may be formed from metal, plastic, glass, ceramic, carbon-fiber composites, fiberglass, and other fiber-based composites, other material, or combinations of these materials. With one suitable arrangement, hinge gap cover 36 is formed from a thin sheet of material (e.g., material with a thickness of less than 4 mm, less than 2 mm, less than 1 mm, or less than 0.5 mm) such as fiberglass or plastic that is radio transparent. By using a material that is radio-transparent (e.g., a material that is a dielectric rather than a conductor), antenna signals may pass through gap 30 even when gap 30 is covered with cover 36. For example, component 34 (e.g., an antenna) may transmit and receive radio-frequency signals that pass through cover 36. Configurations in which hinge gap cover 36 or portions of hinge gap cover 36 are formed from thin sheets of metal (e.g., stainless steel or other metal having a thickness of 4 mm, less than 2 mm, less than 1 mm, or less than 0.5 mm, etc.) may also be used.

Figure 22:
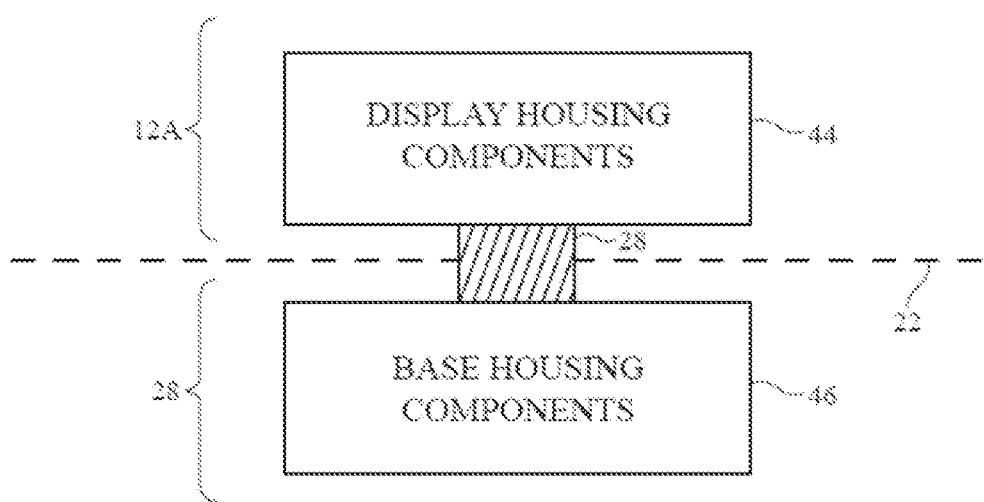
FIG. 22 is a diagram of illustrative circuitry in an electronic device that is coupled together using a flexible signal path that crosses a hinge axis between housing structures, in accordance with some embodiments.

As shown in FIG. 22, components in upper housing 12A such as display housing components 44 may be coupled to components in lower housing 12B such as base housing components 46 by one or more flexible printed circuits such as flexible printed circuit 28 or other flexible signal paths. Display housing components 44 may include components such as a camera, display 14, a touch sensor (e.g., a touch sensor built into display 14), an ambient light sensor, a light-emitting diode or other device that serves as a status indicator, and other electrical components. Base housing components 46 may include processor circuits, memory circuits, and other control circuitry, communications ports, sensors, input-output devices, track pad 18, keyboard 16, etc. During operation of device 10, upper housing 12A and lower housing 12B may rotate relative to each other about hinge axis 22, causing flexible printed circuit 28 to bend. To ensure that metal traces on flexible printed circuits 28 do not experience excessive stress, flexible printed circuit 28 may be provided with a looped portion that allows flexible printed circuit 28 to move back and forth to accommodate opening and closing of device 10.

In configurations of the type shown in FIG. 22 in which a signal path formed from flexible printed circuit 28 bridges hinge axis 22 (and gap 30), it may be desirable to mount hinge gap cover 36 in a position that overlaps flexible printed circuit 28 and thereby blocks flexible printed circuit 28 from view. As shown in the rear perspective view of device 10 in FIG. 23, for example, hinge gap cover 36 may be mounted in device 10 so that hinge gap cover 36 overlaps and covers flexible printed circuit 28. In the illustrative arrangement of FIG. 23, hinge gap cover 36 overlaps only parts of gap 30, so that end portions of gap 30 that are not covered by hinge gap cover 36 can serve as ports for device 10 (e.g., to permit air to flow between the interior of device 10 and the exterior of device 10).

Hinge gap cover 36 may have an elongated rectangular shape that extends along the rear edge of device 10 parallel to hinge axis 22. Springs 38 may be located at opposing ends of hinge gap cover 36 or may be attached elsewhere along the length of cover 36. There is one hinge gap cover 36 in the example of FIG. 23. If desired, there may be multiple hinge gap covers 36 in device 10 each of which covers a respective portion of gap 30. In the FIG. 23 configuration, hinge gap cover 36 is centered along the length of gap 30, but cover 36 may be placed closer to one end of gap 30 than the other. Housing 12B may have extended portions 12B'. Hinges 26 (FIG. 1) may be covered by portions 12B' and gap 30 may extend between portions 12B'. If desired, housing 12B may have a centrally located extended portion that covers flexible printed circuit 28 or may have other extended housing portions.

Figure 23:
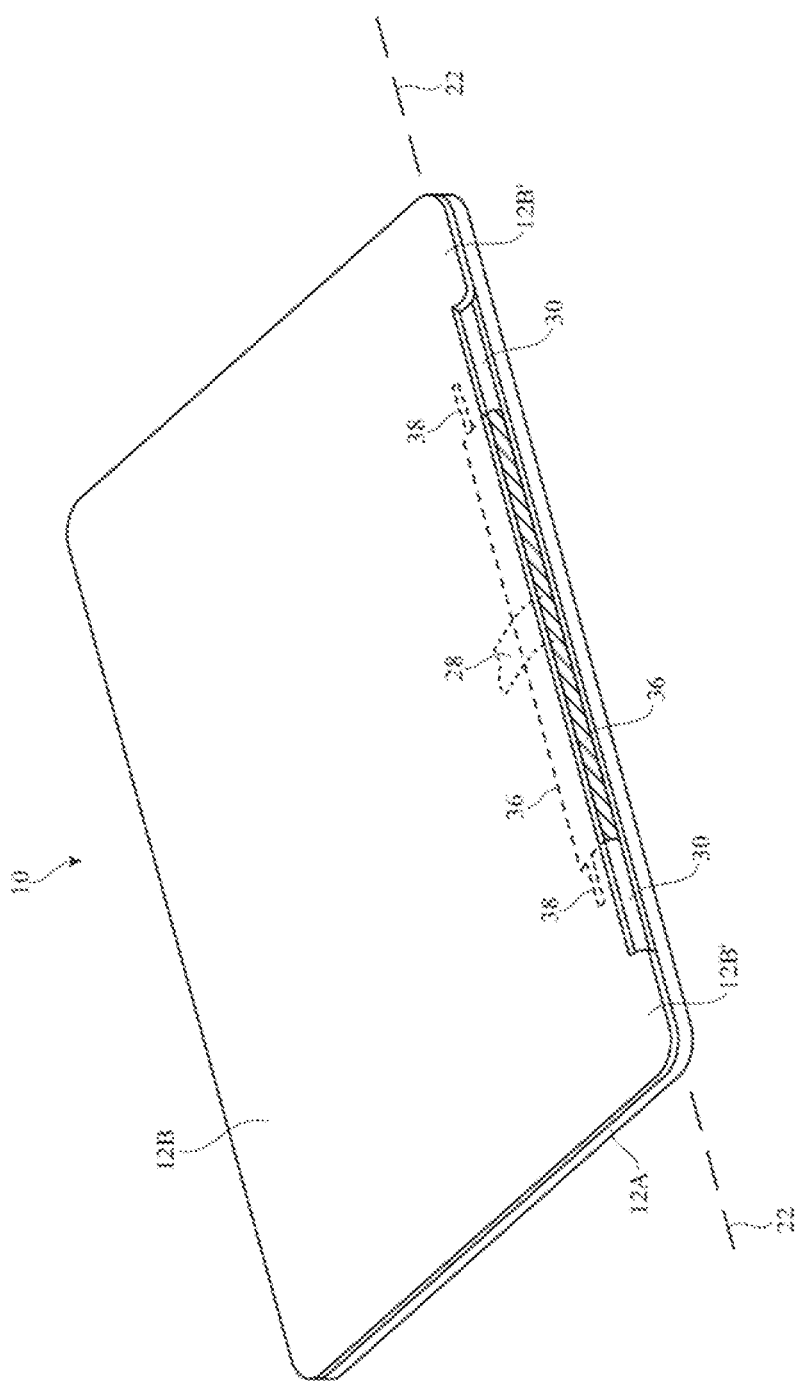
FIG. 23 is rear perspective view of an illustrative electronic device such as the laptop computer of FIG. 19 showing how a gap between upper and lower housings may be at least partly covered using a hinge gap cover, in accordance with some embodiments.
Figure 24:
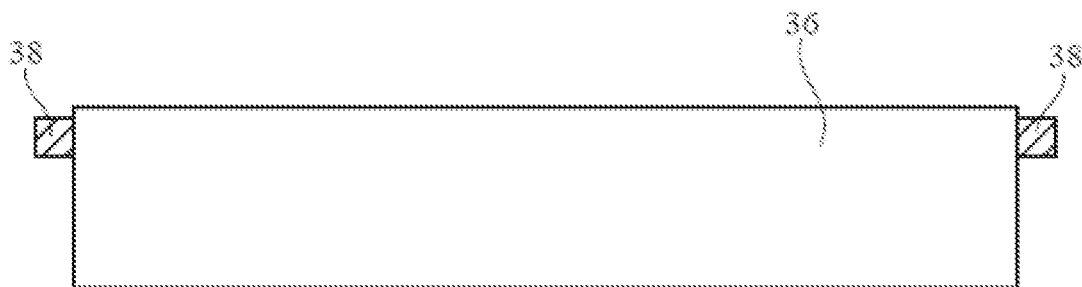
FIG. 24 is a diagram of an illustrative solid hinge gap cover, in accordance with some embodiments.
Figure 25:
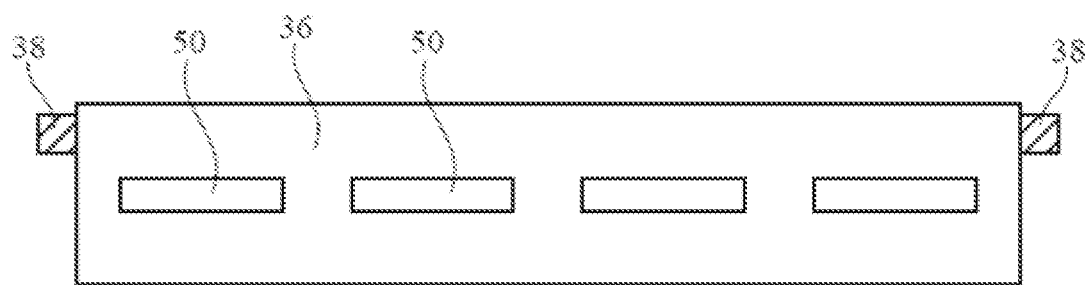
FIG. 25 is a diagram of an illustrative hinge gap cover with openings, in accordance with some embodiments.
Figure 26:
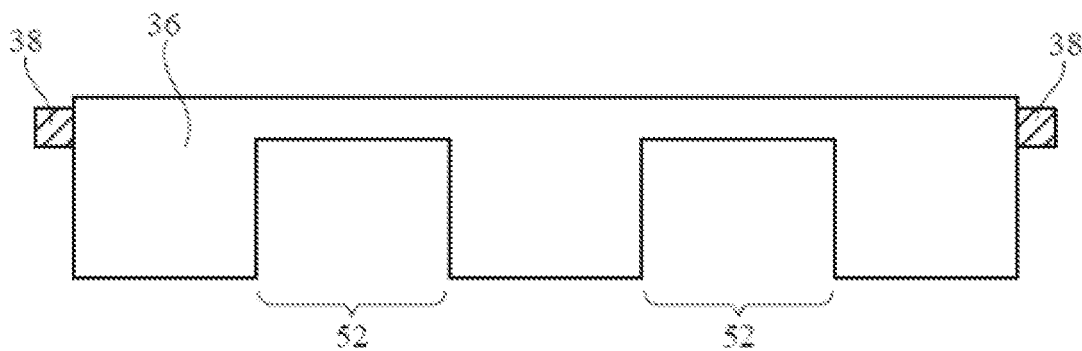
FIG. 26 is a diagram of an illustrative hinge gap cover with slot-shaped openings, in accordance with some embodiments.

Hinge gap cover 36 may have an elongated rectangular shape as shown in FIG. 24. In this type of configuration, the ends of cover 36 may be recessed from hinges 26 and extended housing portions 12B', as shown in FIG. 23. If desired, cover 36 may have openings such as openings 50 of FIG. 25. Openings 50 may run along the length of cover 36 (i.e., cover 36 may have a longitudinal axis that runs parallel to hinge axis 22 and openings 50 may include a set of rectangular openings or openings 50 of other shape that extend along the longitudinal axis). When cover 36 of FIG. 25 is installed within device 10, openings 50 may overlap gap 30, so that air can flow through openings 50. As shown in the illustrative configuration of FIG. 26, hinge gap cover 36 may have openings such as recesses (notches) 52. Recesses 52 may be distributed along the length of cover 36 and may overlap gap 30 to provide air passages between the interior of device 10 and the exterior of device 10. The illustrative configurations for hinge gap cover 36 of FIGS. 24, 25, and 26 are merely illustrative. Cover 36 may have outlines of other shapes and/or may have openings of other shapes.

Figure 27:
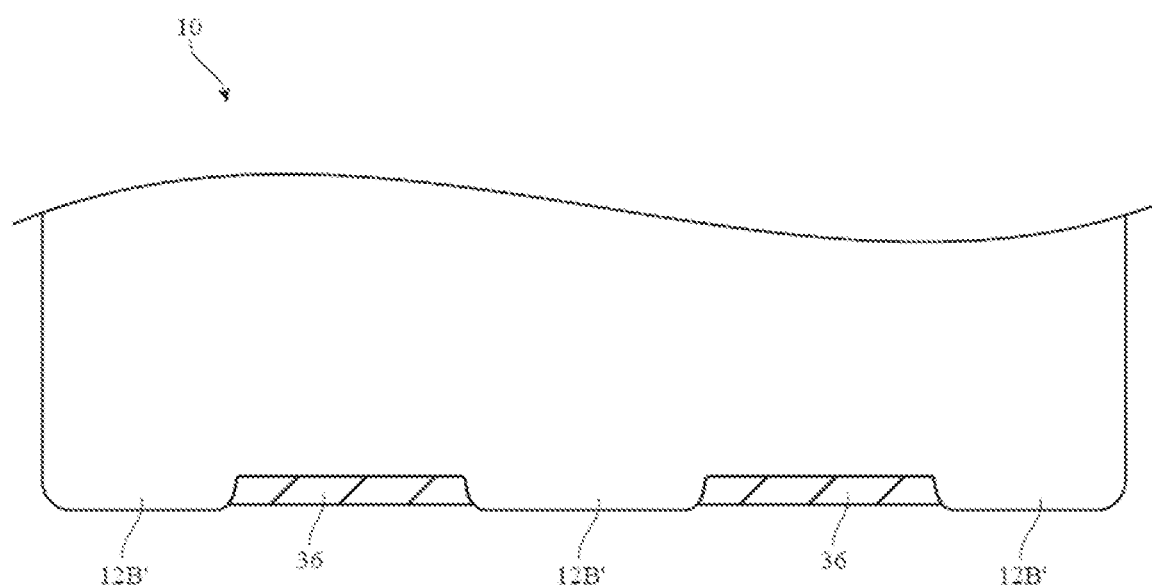
FIG. 27 is a rear view of an illustrative electronic device such as a laptop computer showing how a protruding portion of the lower housing of the device may cover part of a hinge gap, in accordance with some embodiments.

As shown in the illustrative rear view of device 10 of FIG. 27, housing 12B may have extended portions 12B' at the left and right edges of device 10 and a central extended portion 12B' that is centered along the rear edge of housing 12B between the left and right extended portions 12B'. Gap 30 may have uncovered portions or may be covered with hinge gap cover 36 as shown in FIG. 27.

Figure 28:
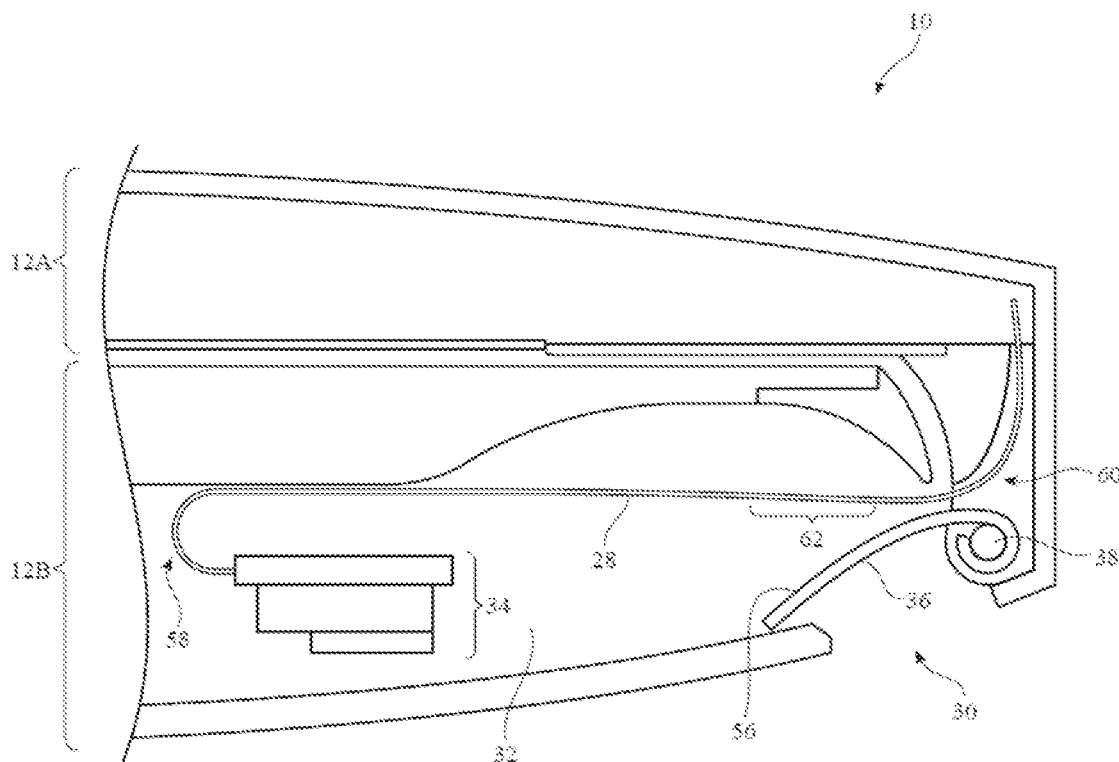
FIG. 28 is a cross-sectional side view of an illustrative laptop computer in a closed position in which a hinge gap cover is used in covering a housing gap, in accordance with some embodiments.
Figure 29:
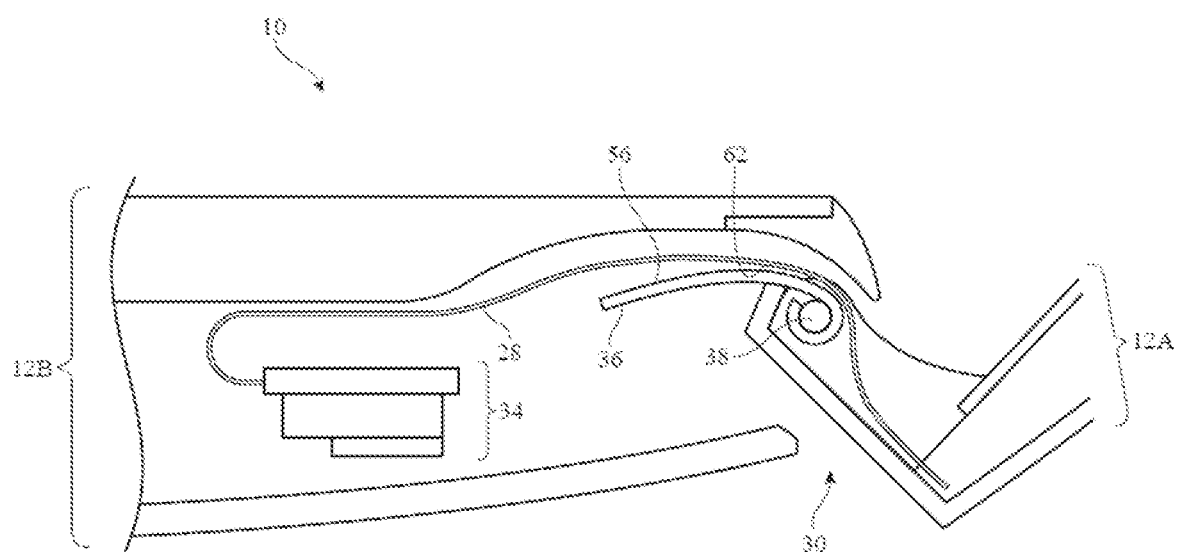
FIG. 29 is a cross-sectional side view of the illustrative laptop computer of FIG. 28 in an open position, in accordance with some embodiments.

Hinge gap cover 36 may have a curved profile that helps accommodate flexible printed circuit 28 without damaging flexible printed circuit 28. A cross-sectional side view of device 10 in an illustrative configuration in which hinge gap cover 36 has a curved (bent) shape is shown in FIG. 28. As shown in FIG. 28, internal components 34 may be coupled to flexible printed circuit 28 within interior of device 10. Flexible printed circuit 28 may have bends such as bend 58 and bend 60. During movement of upper housing 12A relative to lower housing 12B, flexible printed circuit 28 may flex at bends 58 and 60. Inner surface 56 of hinge gap cover 36 may have a convexly curved surface. With this arrangement, hinge gap cover 36 bows inwardly towards flexible printed circuit 28. The curved shape of surface 56 may help reduce wear and sharp bends in flexible printed circuit 28 when flexible printed circuit 28 bears against convexly curved surface 56 of hinge gap cover 36, as shown in FIG. 29 (i.e., when housing 12A has been opened so that flexible printed circuit 28 rests adjacent to hinge gap cover 36). If desired, hinge gap cover 36 may have other shapes (e.g., planar shapes, shapes that are bowed outwardly towards gap 30 rather than inwardly away from gap 30 towards the interior of device 10, etc.). The configuration of FIGS. 28 and 29 in which hinge gap cover 36 is curved inwardly and presents a convexly curved surface 56 to adjacent structures such as flexible printed circuit 28 is merely illustrative.

FIGS. 30, 31, 32, 33, 34, and 35 are cross-sectional side views of the housing of device 10 in various different hinge gap cover configurations.

Figure 30:
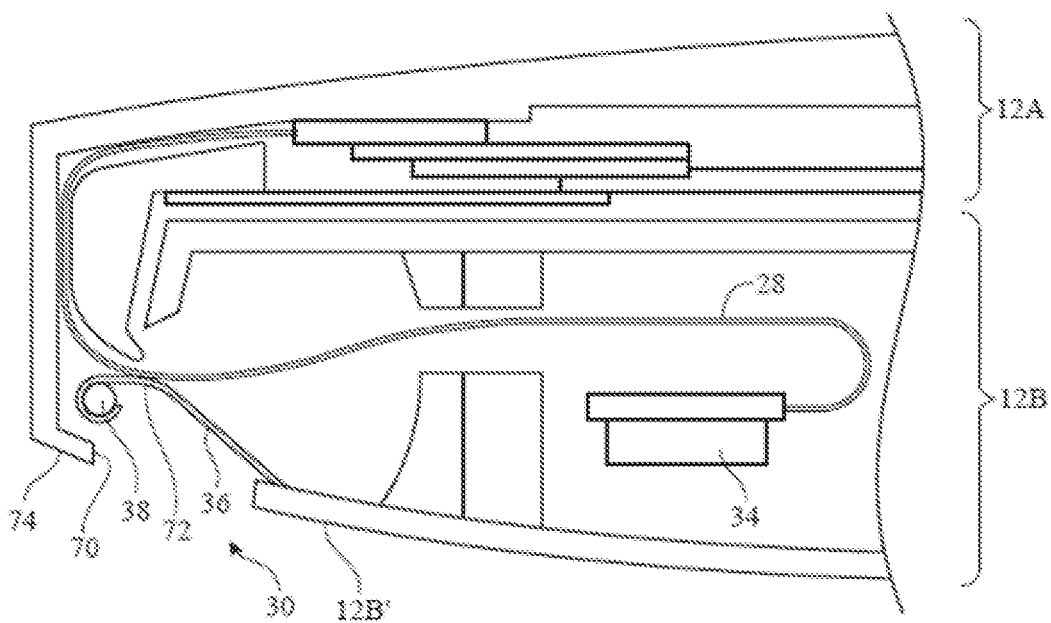
FIG. 30 is a cross-sectional side view of an illustrative laptop computer that in a closed position, in accordance with some embodiments.

The cross-sectional side view of FIG. 30 shows how housing 12B may have an extended portion 12B' that helps reduce the size of gap 30. In the configuration of FIG. 30, device 10 is in its closed position and hinge gap cover 36 is covering gap 30. Cover 36 may be bowed inwardly so that flexible printed circuit 28 is not exposed to excess wear when upper housing 12A is rotated to place device 10 in its open position (FIG. 31).

Housing 12A may have a stop feature that contacts hinge gap cover 36 as device 10 is placed in its open position. As shown in FIG. 30, for example, portion 74 of housing 12A may form stop surface 70. When housing 12A is closed, stop surface 70 is not in contact with contact (or mating) surface 72 of hinge gap cover 36. When housing 12A is opened, stop surface 70 will come into contact with surface 72 and will lift hinge gap cover 36 away from lower housing 12B (i.e., cover 36 will be raised away from extended portion 12B' of housing 12B, as shown in FIG. 31).

Figure 31:
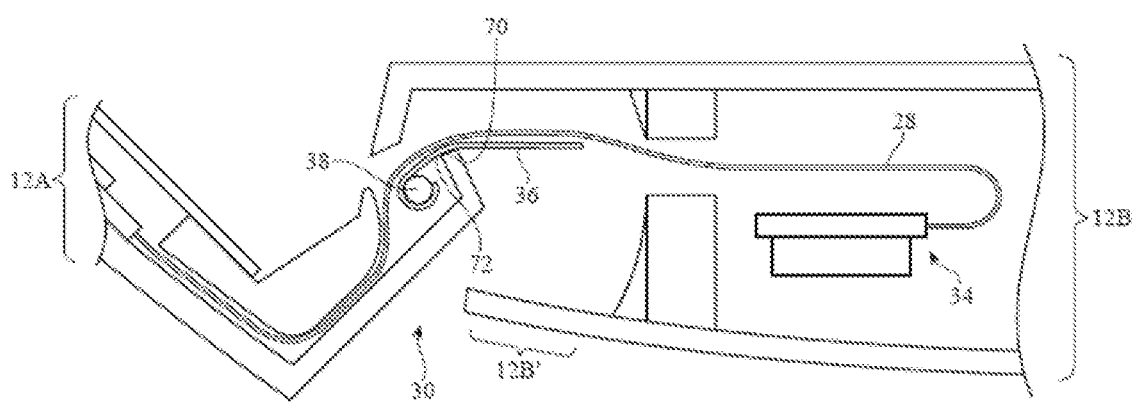
FIG. 31 is a cross-sectional side view of the illustrative laptop computer of FIG. 30 in an open position, in accordance with some embodiments.
Figure 32:
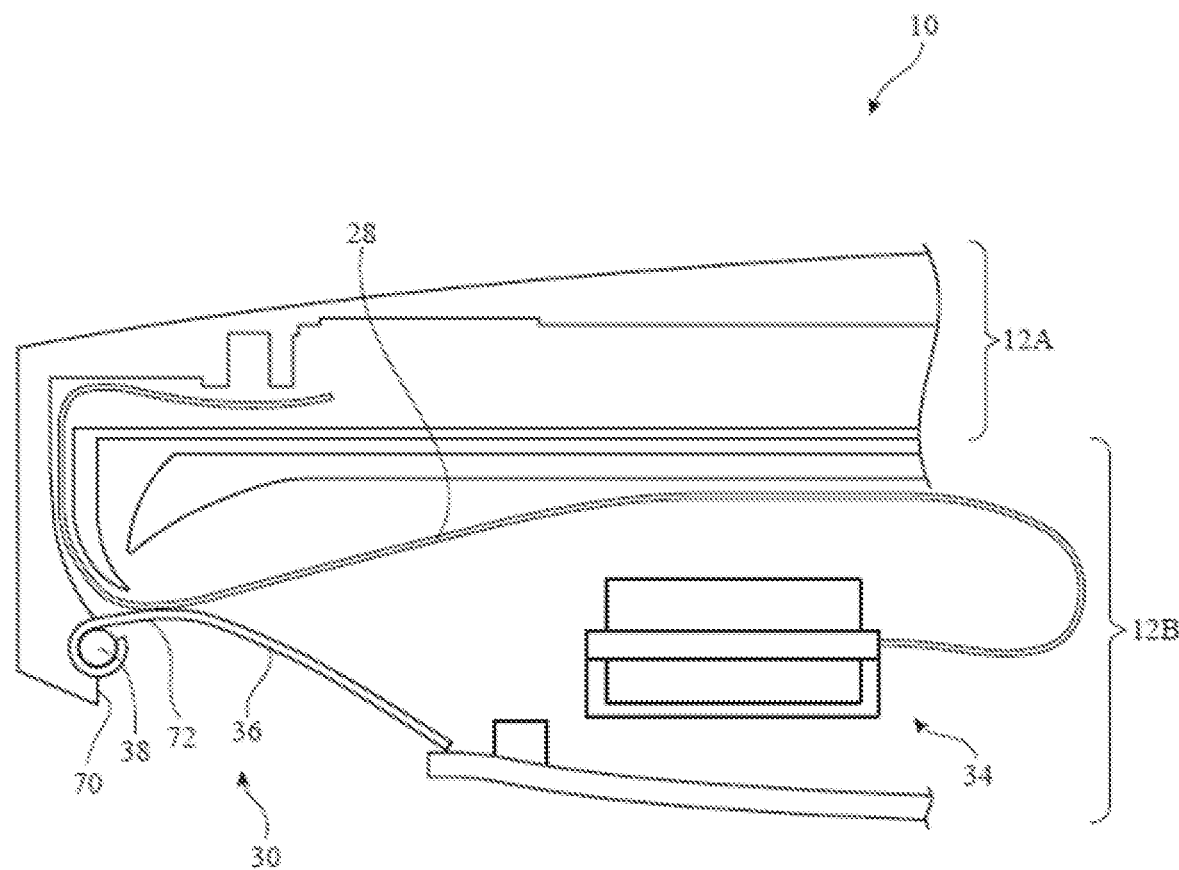
FIG. 32 is a cross-sectional side view of an illustrative laptop computer with a hinge cover that covers a relatively large gap, in accordance with some embodiments.
Figure 33:
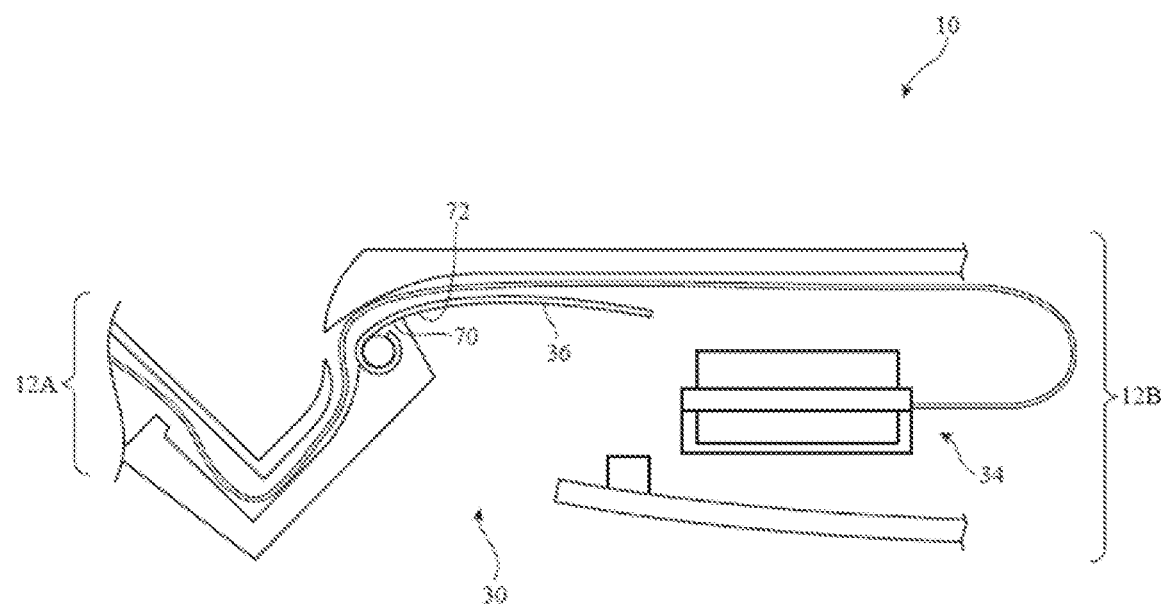
FIG. 33 is a cross-sectional side view of the illustrative laptop computer of FIG. 32 in an open position, in accordance with some embodiments.

The cross-sectional side view of FIG. 32 shows how gap 30 may be somewhat wider in a configuration in which rear housing extended portion 12B' of FIGS. 30 and 31 is not present. In the configuration of FIG. 32, device 10 is in its closed position and hinge gap cover 36 is covering gap 30. In the closed position, stop surface 70 is not in contact with surface 72 of hinge gap cover 36 (i.e., the portion of cover 36 adjacent to spring 38). As with cover 36 of FIGS. 30 and 31, cover 36 of device 10 in FIG. 32 may be bowed inwardly so that flexible printed circuit 28 is not exposed to excess wear when upper housing 12A is rotated to place device 10 in its open position (FIG. 33). When housing 12A is opened, stop surface 70 of housing 12A may contact surface 72 of hinge gap cover 36 and may lift hinge gap cover 36 away from housing 12B, as shown in FIG. 33.

Figure 34:
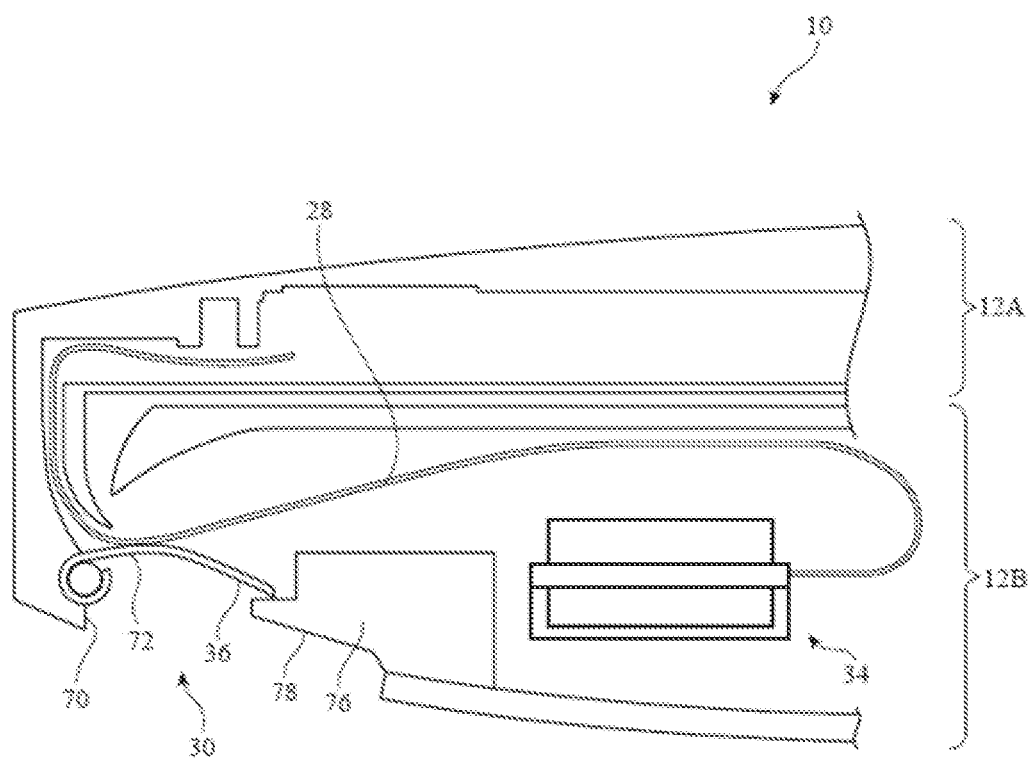
FIG. 34 is a cross-sectional side view of an illustrative laptop computer that has an internal housing wall that allows a hinge gap cover to be reduced in size, in accordance with some embodiments.

The cross-sectional side view of illustrative device 10 of FIG. 34 shows how gap 30 may be reduced in size when lower housing 12B is provided with an internal wall member such as member or structure 76. Member 76 may be used to help hide internal components 34 from view. Member 76 may have a surface such as surface 78 that is exposed within gap 30. Surface 78 may be recessed relative to adjacent surfaces of housing 12B to help reduce the visibility of surface 78. In the configuration of FIG. 34, device 10 is in its closed position and hinge gap cover 36 is covering gap 30. Stop surface 70 is not in contact with contact surface 72 of hinge gap cover 36. Cover 36 may be bowed inwardly, so that flexible printed circuit 28 is not exposed to excess wear when upper housing 12A is rotated into its open position (FIG. 35) to cause stop surface 70 to contact surface 72 of cover 36 and move cover 36 away from lower housing 12B (and thereby uncover gap 30), as shown in FIG. 35.

Figure 35:
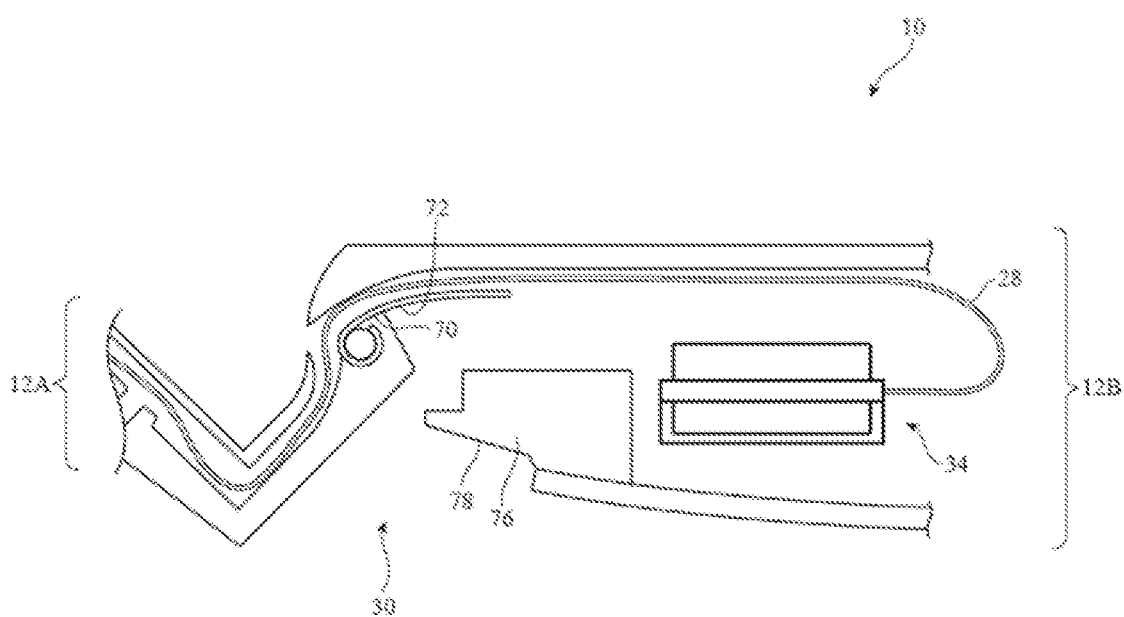
FIG. 35 is a cross-sectional side view of the illustrative laptop computer of FIG. 34 in an open position, in accordance with some embodiments.

Internal structures such as structure 76 of FIGS. 34 and 35 that help partly cover gap 30 may be formed from metal (e.g., the same metal that is used in forming lower housing 12B or a different metal) or may be formed from dielectric materials. As an example, structure 76 may be a plastic member that helps hide internal components from view through gap 30 while allowing antenna signals associated with an antenna in device 10 (e.g., component 34) to pass through the plastic member. Conductive antennas structures may, if desired, be supported by internal wall structures such as structures 76 or other internal structures adjacent to gap 30.

In accordance with some embodiments, the portable computing device includes a flex circuit configured to electrically couple a first electrical component attached to a first portion and a second electrical component attached to a second portion, a hinge mechanism having a curved surface, wherein the flex circuit is configured to bend over the curved surface, and a flex circuit cover at least partially in contact with a surface of the flex circuit and having a first end secured to the first portion so that the flex circuit cover is free to move with respect to the second portion when the first and second portions rotate with respect to each other about a pivot axis associated with the hinge mechanism.

In accordance with some embodiments, the flex circuit cover of the portable computing device hides the flex circuit from view when the first and the second portions rotate with respect to each other.

In accordance with some embodiments, the flex circuit cover of the portable computing device is composed of a material selected from the group consisting of: glass, polyurethane, fiberglass, aramid fibers, and a composite fiber.

In accordance with some embodiments, wherein the flex circuit cover includes a structural layer that is bonded between an outer layer and an abrasion resistant layer.

In accordance with some embodiments, the hinge mechanism of the portable computing device includes one or more clutch mechanisms to provide a predetermined amount of resistance when the first and second portions rotate about the pivot axis associated with the hinge mechanism.

In accordance with some embodiments, the flex circuit cover of the portable computing device hides a portion of the curved surface of the hinge mechanism when the first and the second portions are rotated with respect to each other.

In accordance with some embodiments, the flex circuit cover of the portable computing device is coupled to a tensioning mechanism of the second portion and the tensioning mechanism is configured to exert a return force on the flex circuit cover.

In accordance with some embodiments, a method of covering a cable routed between a first portion and a second portion of an electronic device, the first portion pivotally coupled with the second portion at a hinge mechanism, the method includes electrically coupling the first portion and the second portion with the cable, the cable drawn over a curved surface of the hinge mechanism when the electronic device is rotated from a closed state to an open state and covering an exposed surface of the cable with a cover, the cover drawn over the cable and the curved surface of the hinge mechanism when the electronic device is rotated from the closed state to the open state.

In accordance with some embodiments, wherein the cover is mechanically captured by the second portion.

In accordance with some embodiments, the cover hides the cable from view when the electronic device is in the open state.

In accordance with some embodiments, the cover is comprised of at least one of glass, polyurethane, fiberglass, aramid fibers, or a composite fiber.

In accordance with some embodiments, wherein the cover includes a structural layer that is bonded between an outer layer and an abrasion resistant layer.

In accordance with some embodiments, the cover is drawn over a greater amount of the curved surface of the hinge mechanism during the open state relative to the closed state.

In accordance with some embodiments, the tensioning mechanism is configured to exert a return force on the cover when the cover is coupled to the first portion and a tensioning mechanism of the second portion.

In accordance with some embodiments, a hinge cover for an electronic device having a first portion pivotally coupled to a second portion via a hinge mechanism, the hinge cover includes a first side positioned proximate to a cable, the cable electrically connecting the first portion to the second portion, wherein the cable is configured to bend over a curved surface of the hinge mechanism and a second side opposite the first side, wherein the second side is exposed at the hinge mechanism when the electronic device is in an open state.

In accordance with some embodiments, the hinge cover of the electronic device is configured to conceal the curved surface of the hinge mechanism and the cable from being exposed to a user when the first portion is pivoted with respect to the second portion.

In accordance with some embodiments, the hinge cover of the electronic device is comprised of a flexible material.

In accordance with some embodiments, one or more slits are provided along the hinge cover of the electronic device such that a first section of the hinge cover flexes independently of a second section of the hinge cover.

In accordance with some embodiments, the first section of the hinge cover is configured to flex freely from the curved surface of the hinge mechanism of the electronic device while the second section is adhered to the curved surface of the hinge mechanism.

In accordance with some embodiments, the hinge cover is manufactured from a single layer of a laminated material or a woven material.

In accordance with some embodiments, the hinge mechanism includes one or more clutch mechanisms to provide a predetermined amount of resistance while transitioning the electronic device from the open state to a closed state.

In accordance with some embodiments, the hinge cover substantially conceals the entire curved surface of the hinge mechanism.

In accordance with some embodiments, the hinge cover is manufactured from a plurality of bonded layers manufactured from a laminated material or a woven material.

In accordance with some embodiments, a segment of the hinge cover remains statically fixed to the curved surface of the hinge mechanism while the electronic device transitions between the open state and a closed state.

In accordance with some embodiments, a housing for an electronic device, includes a first portion pivotally coupled to a second portion via a hinge mechanism, wherein the hinge mechanism includes a curved surface and a flex cover coupled to the first portion and a tensioning mechanism of the second portion, wherein the tensioning mechanism is configured to exert a return force on the flex cover upon the electronic device transitioning from an open configuration to a closed configuration.

In accordance with some embodiments, a flex circuit of the housing is configured to bend over the curved surface of the hinge mechanism and electrically couple a first electrical component of the first portion and a second electrical component of the second portion.

In accordance with some embodiments, the tensioning mechanism of the housing is one of an elastic section, a spiral torsion spring, a coil spring, or a leaf spring.

In accordance with some embodiments, the tensioning mechanism of the housing is an integrated tension mechanism assembly that is configured to be fully assembled prior to being provided within an interior cavity of the second portion.

In accordance with some embodiments, the integrated tension mechanism assembly of the housing includes a frame having a plurality of cut-outs that have a size and shape for receiving a spring and shaft.

In accordance with some embodiments, the spring of the housing includes two independent spring coils that are coupled to each other.

In accordance with some embodiments, the tensioning mechanism of the housing includes a cylindrical shaft coupled to a retraction spring and the retraction spring is positioned perpendicular to the flex cover.

In accordance with some embodiments, the retraction spring of the tensioning mechanism is configured to exert rotational torque on the cylindrical shaft such as to provide tension on the flex cover.

In accordance with some embodiments, the tensioning mechanism of the housing includes a curved outer surface and is configured to draw the flex cover over the curved outer surface as the electronic device transitions from the open configuration to the closed configuration.

In accordance with some embodiments, the flex cover of the housing includes an engagement feature that is configured to fit within a recess of the tensioning mechanism.

In accordance with some embodiments, the flex cover of the housing includes a retaining feature characterized by a first thickness such that when the flex cover is fitted within the recess of the tensioning mechanism, the retaining feature of the flex cover cannot be extracted from within the recess of the tensioning mechanism.

In accordance with some embodiments, the retaining feature of the flex cover includes a first section of the flex cover that is folded over and secured to a second section of the flex cover such that the retaining feature is characterized by a second thickness greater than the first thickness.

In accordance with some embodiments, a first section of the flex cover of the housing is secured to a second section of the flex cover via at least one of an adhesive or a stitch.

In accordance with some embodiments, the recess of the tensioning mechanism of the housing is characterized as having a wedged area that is configured to produce a compressive force on the retaining feature when the flex cover is directed towards the hinge mechanism.

In accordance with some embodiments, the retaining feature of the flex cover includes a removable enlarging element such that the retaining feature is characterized by a second thickness greater than the first thickness.

In accordance with some embodiments, the flex cover is coupled to an anchor of the first portion of the housing that is opposite the tensioning mechanism of the second portion.

In accordance with some embodiments, the flex cover is coupled to the anchor via at least one of adhesives, hooks, castellations, or a mechanical interlock In accordance with some embodiments, the flex cover is configured to be wrapped around the anchor of the first portion of the housing.

In accordance with some embodiments, a portable computing device, including a first portion having a first electrical component and a second portion having a second electrical component and a hinge mechanism having a curved surface that pivotally couples the first and second portions, wherein a flex cable is configured to bend over the curved surface to electrically couple the first and second electrical components.

In accordance with some embodiments, the curved surface of the hinge mechanism of the portable computing device includes one or more pathways having a shape and size for receiving one or more foreign particles.

In accordance with some embodiments, the one or more pathways of the curved surface of the hinge mechanism include an inlet and an outlet configured to pass the one or more foreign particles from an interior cavity of the portable computing device to outside the portable computing device.

In accordance with some embodiments, a portion of the hinge mechanism of the portable computing device is comprised of an elastomeric material.

In accordance with some embodiments, a woven laminate layer is bonded to an underlying surface of the flex cable of the hinge mechanism of the portable computing device and is configured to shield the underlying surface from damage by foreign particles.

In accordance with some embodiments, a barrier is positioned at a ventilation gap that is disposed between the first portion and the second portion of the hinge mechanism of the portable computing device such that the barrier is configured to prevent foreign particles from entering an interior cavity of the portable computing device.

In accordance with some embodiments, a housing for an electronic device, including a hinge mechanism having a curved surface that pivotally couples between a first portion of the housing and a second portion of the housing, wherein at least one of the first portion or the second portion includes a plurality of components that are separated by a gap and an anchor assembly having a size and a shape to fit within the gap, the anchor assembly including a first anchor portion that is pivotally coupled to a second anchor portion.

In accordance with some embodiments, the anchor assembly includes a flexible mold that is configured to flex at a division corresponding to where the first anchor portion is separated from the second anchor portion.

In accordance with some embodiments, an enclosure for a portable computing device having a first portion and a second portion, including a hinge mechanism having a curved surface that pivotally couples the first portion and the second portion, wherein the first portion and the second portion are separated by a gap that provides access to an interior cavity of the second portion and a hinge gap cover pivotally coupled to the first portion, wherein the hinge gap cover is configured to reduce a size of the gap when the enclosure transitions from an open configuration to a closed configuration.

In accordance with some embodiments, the hinge gap cover of the enclosure is formed from radio-transparent material.

In accordance with some embodiments, the hinge gap cover of the enclosure is configured to rotate about an axis associated with the hinge mechanism.

In accordance with some embodiments, the second portion of the enclosure includes a stopping surface that is configured to contact against a mating surface of the hinge gap cover such as to inhibit rotation of the hinge gap cover towards the second portion.

In accordance with some embodiments, the stopping surface of the second portion is free of contact from the mating surface when the enclosure is in the closed configuration.

In accordance with some embodiments, the hinge gap cover of the enclosure is substantially convex shaped and is bowed inwardly towards an interior cavity of the enclosure.

In accordance with some embodiments, wherein a flex circuit is configured to electrically couple a first electrical component attached to the first portion and a second electrical component attached to the second portion, wherein the hinge gap cover is characterized as having a curved profile, and wherein the curved profile of the hinge gap cover mirrors a bend of the flex circuit.

In accordance with some embodiments, the first portion of the enclosure comprises a plurality of protruded extensions that are configured to reduce the size of the gap.

In accordance with some embodiments, one or more recesses are provided along a length of the hinge gap cover and are configured to funnel air between an interior cavity of the enclosure and outside of the enclosure.

In accordance with some embodiments, a spring is coupled to the hinge gap cover such as to bias the hinge gap cover towards the second portion.

In accordance with some embodiments, a method for exerting tension on a flex cover of an electronic device, the electronic device having a first portion pivotally coupled to a second portion via a hinge mechanism, including coupling the first portion to the second portion with a flex cover, wherein flex cover is drawn over a curved surface of the hinge mechanism, and wherein the flex cover is coupled to a tensioning mechanism of the second portion that is configured to exert a return force on the flex cover.

In accordance with some embodiments, the method further includes electrically coupling the first portion and the second portion with a cable, wherein the cable is drawn over the curved surface.

In accordance with some embodiments, the tensioning mechanism is one of an elastic section, a spiral torsion spring, a coil spring, or a leaf spring.

In accordance with some embodiments, the tensioning mechanism is an integrated tension mechanism assembly that is configured to be fully assembled prior to being provided within an interior cavity of the second portion.

In accordance with some embodiments, the flex cover is coupled to an anchor of the first portion that is opposite the tensioning mechanism of the second portion.

In accordance with some embodiments, a method for covering a gap that provides access to an interior cavity between a first portion and a second portion of a portable computing device enclosure, the first portion being pivotally coupled to the second portion via a hinge mechanism, includes coupling a rotatable hinge gap cover to the hinge mechanism, wherein the hinge mechanism includes a curved surface, and wherein the hinge gap cover is configured to rotate towards the second portion such as to reduce a size of the gap when the enclosure transitions from an open configuration to a closed configuration.

In accordance with some embodiments, the method further includes electrically coupling the first portion to the second portion with a flex circuit, wherein the flex circuit is drawn over the curved surface of the hinge mechanism.

In accordance with some embodiments, the hinge gap cover is substantially convex shaped and is bowed inwardly towards an interior cavity of the enclosure.

In accordance with some embodiments, the hinge gap cover is characterized as having a curved profile, and wherein the curved profile of the hinge gap cover mirrors a bend of the flex circuit.

In accordance with some embodiments, the first portion comprises a plurality of protruded extensions that are configured to reduce the size of the gap.

In accordance with some embodiments, an enclosure for a portable computing device, comprises a first enclosure portion having a first electrical component, a second enclosure portion having a second electrical component, wherein the first portion and the second portion are separated by a ventilation gap that provides access to an interior cavity of the second portion, a flex circuit configured to electrically couple the first electrical component attached to the first portion and the second electrical component attached to the second portion, a hinge mechanism having a curved surface, wherein the first portion is configured to pivot relative to the second portion via the hinge mechanism, and wherein the flex circuit is configured to be drawn over the curved surface, a hinge gap cover pivotally coupled to the first portion, wherein the hinge gap cover is configured to reduce a size of the ventilation gap when the enclosure transitions from an open configuration to a closed configuration, and a flex circuit cover that is configured to be drawn over the flex circuit and that is coupled between the first portion and a tensioning mechanism of the second portion, wherein the tensioning mechanism is positioned within the interior cavity and is configured to exert a return force on the flex circuit cover upon the enclosure transitioning from the open configuration to the closed configuration.

In accordance with some embodiments, the hinge gap cover of the enclosure includes one or more slits that separates a first section from a second section such that a first section of the hinge gap cover flexes independently of a second section of the hinge gap cover.

In accordance with some embodiments, wherein a flex circuit is configured to electrically couple a first electrical component attached to the first portion and a second electrical component attached to the second portion, wherein the hinge gap cover is characterized as having a curved profile, and wherein the curved profile of the hinge gap cover mirrors a bend of the flex circuit.

In accordance with some embodiments, a woven laminate layer is bonded to an underlying surface of the flex circuit and is configured to shield the flex circuit from damage by foreign particles.

In accordance with some embodiments, a stopping surface is provided on the second portion that is configured to contact a mating surface of the hinge gap cover such as to inhibit rotation of the hinge gap cover towards the second portion.

In accordance with some embodiments, a housing for an electronic device comprises a first housing portion having a first electrical component, a second housing portion having a second electrical component wherein the first portion is configured to pivot relative to the second portion, a hinge mechanism having a curved surface and providing a pivot axis for the first and second housing portions, wherein the curved surface of the hinge mechanism is comprised of elastomeric material, a ventilation gap that is disposed proximate to the hinge mechanism and is positioned between the first and second housing portions, wherein the ventilation gap provides access to an interior cavity of the second portion, a barrier positioned within the ventilation gap and having a size and shape that reduces an opening of the ventilation gap, a flex circuit cable configured to electrically couple the first electrical component of the first portion and the second electrical component of the second portion, wherein the flex circuit cable is configured to be drawn over the curved surface and the flex circuit is characterized as having a bend that is associated with the curved surface, a woven laminate layer bonded to an underlying surface of the flex circuit cable, wherein the woven laminate layer is configured to protect the flex circuit cable from foreign particles, a hinge gap cover having a curved profile that is pivotally coupled to the first portion and is configured to rotate about the pivot axis associated with the hinge mechanism, wherein the hinge gap cover is configured to reduce a size of the ventilation gap when the housing transitions from an open configuration to a closed configuration, a stopping surface provided on the second portion that is configured to contact a mating surface of the hinge gap cover such as to inhibit rotation of the hinge gap cover towards the second portion, a flex circuit cover that is configured to be drawn over the flex circuit and that is coupled between an anchor portion of the first portion and a spring-based tensioning mechanism of the second portion, wherein the anchor portion is an over-molded anchor assembly that includes a molded first anchor portion that is pivotally coupled to a second anchor portion, wherein the spring-based tensioning mechanism is positioned within the interior cavity and is configured to exert a return force on the flex circuit cover upon the housing transitioning from the open configuration to the closed configuration, and a hinge mechanism cover configured to conceal the curved surface of the hinge mechanism and the flex circuit cable from being exposed to a user when the first portion is pivoted with respect to the second portion.

In accordance with some embodiments, the spring-based tensioning mechanism of the housing is part of a tension mechanism assembly that is configured to be fully assembled prior to being provided within an interior cavity of the second portion.

In accordance with some embodiments, the flex circuit cover of the housing is coupled to the anchor portion via at least one of adhesives, hooks, castellations, or a mechanical interlock.

In accordance with some embodiments, a spring is coupled to the hinge gap cover of the housing such as to bias the hinge gap cover towards the second portion.

In accordance with some embodiments, the hinge gap cover of the housing includes one or more slits that separates a first section from a second section such that a first section of the hinge gap cover flexes independently of a second section of the hinge gap cover.

In accordance with some embodiments, a housing for an electronic device includes a flex circuit configured to electrically couple a first electrical component attached to a first portion and a second electrical component attached to a second portion and a hinge mechanism having a curved surface that pivotally couples between the first portion and the second portion of the housing, wherein a section of the flex circuit that is drawn over the curved surface is characterized as having a bend that is associated with the curved surface.

In accordance with some embodiments, a radius of the curved surface dictates a minimal bend radius of the flex circuit.

In accordance with some embodiments, the curved surface is configured to impart the section of the flex circuit to bend in a first direction while being inhibited from bending in a second direction that is opposite the first direction.

In accordance with some embodiments, the curved surface is configured to impart the section of the flex circuit to bend further along the first direction subsequent to the housing transitioning from an open configuration to a closed configuration.

In accordance with some embodiments, the curved surface subjects the flex circuit to minimal stress while bending.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device, comprising:
   a first housing;
   a second housing;
   a cable routed from the first housing to the second housing;
   a hinge coupling the first housing and the second housing, the hinge having a mandrel surface at least partially covered by the cable;
   a cover disposed over a portion of the cable, the cover having a first end, a retaining feature formed on the first end, and a second end, the second end being affixed to the first housing; and
   a tensioning mechanism disposed within the second housing, the retaining feature engaging the tensioning mechanism to couple the tensioning mechanism to the cover.

2. The electronic device of claim 1, wherein the retaining feature comprises:
   a first section of the cover; and
   a second section of the cover, the first section folded over the second section and affixed to the second section to form a hem.

3. The electronic device of claim 1, wherein the cover extends through a slot within the tensioning mechanism and a thickness of the retaining feature is configured to prevent retraction of the retaining feature from the slot.

4. The electronic device of claim 3, wherein the thickness of the retaining feature is greater than a width of the slot.

5. The electronic device of claim 3 wherein the slot includes a wedge area, the retaining feature being disposed within the wedge area.

6. The electronic device of claim 1, further comprising a biasing element configured to bias the tensioning mechanism to rotate while the first housing is displaced from the second housing.

7. The electronic device of claim 1, wherein:
   the cover extends through a slot within the tensioning mechanism;
   the retaining feature forms a hem configured to receive a removable enlarging element; and
   a size of the removable enlarging element is greater than a width of the slot to prevent retraction of the retaining feature from the slot.

8. The electronic device of claim 1, wherein the cover tapers such that a first width of the cover at the first end is less than a second width of the cover at the second end.

9. A portable computing device, comprising:
   a housing having a lid portion and a base portion;
   a cable routed from the lid portion to the base portion;
   a hinge coupling the lid portion and the base portion;
   a cover disposed over a portion of the cable;
   an anchor disposed within the lid portion and affixing the cover to the lid portion; and
   a tensioning mechanism disposed within the base portion, the cover having a retaining feature engaging the tensioning mechanism to couple the tensioning mechanism to the cover.

10. The portable computing device of claim 9, wherein the anchor comprises a hook receivable within a slit of the cover to form a mechanical interlock between the anchor and the cover.

11. The portable computing device of claim 9, wherein the cover is at least partially wrapped around the anchor to contact a surface of the anchor, the cover being adhered to the surface of the anchor.

12. The portable computing device of claim 9, wherein the anchor comprises:
   a first anchor portion having a first hook;
   a second anchor portion having a second hook; and an over-molded assembly formed over the first anchor portion and the second anchor portion.

13. The portable computing device of claim 12, wherein the first anchor portion is displaced from the second anchor portion to form a gap between the first hook and the second hook.

14. A portable electronic device, comprising: a first housing including a mandrel surface; a second housing; a cable routed from the first housing to the second housing; a hinge coupling the first housing and the second housing, the mandrel surface being located at the hinge; a cover comprising an abrasion resistant layer disposed between the cable and the mandrel surface, the abrasion resistant layer being configured to reduce stress applied to the cable by a particle positioned between the mandrel surface and an inner surface of the cable, the abrasion resistant layer being bendable to furl and unfurl relative to the mandrel surface; wherein a portion of the mandrel surface is compressible from a first shape to a second shape while the particle is positioned between the mandrel surface and an inner surface of the cable.

15. The portable electronic device of claim 14, wherein the abrasion resistant layer comprises a material that prevents puncturing or tearing of the abrasion resistant layer.

16. The portable electronic device of claim 14, further comprising a barrier positioned between the mandrel surface and the second housing, the barrier configured to limit ingress of contaminants within a cavity at least partially formed by the second housing.

17. The portable electronic device of claim 16, wherein the barrier comprises an elastomer material.

\* \* \* \* \*